(12) United States Patent
Wang

(10) Patent No.: US 12,549,281 B2
(45) Date of Patent: Feb. 10, 2026

(54) OPERATION METHOD FOR ELECTRONIC DEVICE AND ELECTRONIC DEVICE CAPABLE OF PERFORMING ADVANCED LINE ENCODING

(71) Applicant: SK hynix Inc., Icheon-si (KR)

(72) Inventor: LanFeng Wang, Zhubei (TW)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/735,678

(22) Filed: Jun. 6, 2024

(65) Prior Publication Data

US 2025/0343622 A1   Nov. 6, 2025

(30) Foreign Application Priority Data

May 6, 2024   (TW) ................................ 113116681

(51) Int. Cl.
    *H04L 1/00*   (2006.01)
(52) U.S. Cl.
    CPC .......... *H04L 1/0041* (2013.01); *H04L 1/0058* (2013.01); *H04L 1/0072* (2013.01)
(58) Field of Classification Search
    None
    See application file for complete search history.

(56) References Cited

U.S. PATENT DOCUMENTS

| | | | | |
|---|---|---|---|---|
| 7,187,307 | B1* | 3/2007 | Schmidt | H04L 25/4908 |
| | | | | 341/51 |
| 9,432,298 | B1* | 8/2016 | Smith | H04L 49/9057 |
| 2007/0260965 | A1* | 11/2007 | Schmidt | H04L 1/0045 |
| | | | | 714/799 |
| 2019/0205492 | A1* | 7/2019 | Roberts | H01L 25/18 |
| 2019/0207744 | A1* | 7/2019 | Reinhardt | H04L 12/40 |
| 2024/0077781 | A1* | 3/2024 | Nahmias | G06F 13/1657 |
| 2024/0079081 | A1* | 3/2024 | Baker | G11C 29/765 |

FOREIGN PATENT DOCUMENTS

| | | |
|---|---|---|
| WO | 2022078426 A1 | 4/2022 |
| WO | 2022100515 A1 | 5/2022 |

\* cited by examiner

*Primary Examiner* — Mujtaba M Chaudry
(74) *Attorney, Agent, or Firm* — WILLIAM PARK AND ASSOCIATES LTD.

(57) ABSTRACT

Electronic device and method for an electronic device are provided. The method comprises: generating, at a data link layer of a link controller of the electronic device, a plurality of data items to be transmitted; generating, at the link controller of the electronic device, an advanced line encoding (ALE) block according to an advanced line encoding scheme, the ALE block including a data field, an error detection portion based on the data field, and an error correction portion corresponding to the data field and the error detection portion, the data field being generated by using one or more of the plurality of data items selectively based on a threshold value of block length for data item; and transmitting, at the link controller of the electronic device, the ALE block.

14 Claims, 48 Drawing Sheets

| 7 | 6 | 5 | 4 | 3 | 2 | 1 | 0 |
|---|---|---|---|---|---|---|---|
| Data_Byte0 ||||||||
| Data_Byte1 ||||||||
| Data_Byte2 ||||||||
| ... ||||||||
| Data_Byte241 ||||||||
| CRC_Byte0 ||||||||
| CRC_Byte1 ||||||||
| CRC_Byte2 ||||||||
| CRC_Byte3 ||||||||
| CRC_Byte4 ||||||||
| CRC_Byte5 ||||||||
| CRC_Byte6 ||||||||
| CRC_Byte7 ||||||||
| ECC_Byte0 ||||||||
| ECC_Byte1 ||||||||
| ECC_Byte2 ||||||||
| ECC_Byte3 ||||||||
| ECC_Byte4 ||||||||
| ECC_Byte5 ||||||||

FIG. 4

| 7 | 6 | 5 | 4 | 3 | 2 | 1 | 0 |
|---|---|---|---|---|---|---|---|
| | ESC_DL = 8'b0000_0001 |||||||
| AFC ||| TC ||| CReq | Rsvd |
| Frame Sequence Number |||| Reserved ||||
| Credit Value ||||||||

FIG. 11

| 7 | 6 | 5 | 4 | 3 | 2 | 1 | 0 |
|---|---|---|---|---|---|---|---|
| | ESC_DL = 8'b0000_0001 |||||||
| NAC ||| Reserved |||| RReq |

FIG. 12

| 7 | 6 | 5 | 4 | 3 | 2 | 1 | 0 |
|---|---|---|---|---|---|---|---|
| ESC_DL = 8'b0000_0001 ||||||||
| SOF ||| TC ||| Reserved ||
| Block_Length (in bytes) ||||||||

FIG. 13A

| 7 | 6 | 5 | 4 | 3 | 2 | 1 | 0 |
|---|---|---|---|---|---|---|---|
| ESC_DL = 8'b0000_0001 ||||||||
| EOF ||| Sequence Number |||||

FIG. 13B

| 7 | 6 | 5 | 4 | 3 | 2 | 1 | 0 |
|---|---|---|---|---|---|---|---|
| ESC_DL = 8'b0000_0001 ||||||||
| COF ||| TC ||| Reserved ||
| Block_Length (in bytes) ||||||||

FIG. 13C

| 7 | 6 | 5 | 4 | 3 | 2 | 1 | 0 |
|---|---|---|---|---|---|---|---|
| DL_SDU-Byte 0 ||||||||
| DL_SDU-Byte 1 ||||||||
| ... ||||||||
| DL_SDU-Byte N-1 ||||||||

FIG. 13D

| 7 | 6 | 5 | 4 | 3 | 2 | 1 | 0 |
|---|---|---|---|---|---|---|---|
| | ESC_DL = 8'b0000_0001 |||||||
| colspan=3 | SOF || colspan=2 | TC=x || colspan=3 | Reserved |||
| | Block_Length = N |||||||
| | DL_SDU-Byte 0 |||||||
| | DL_SDU-Byte 1 |||||||
| | ... |||||||
| | DL_SDU-Byte N-1 |||||||
| | ESC_DL |||||||
| colspan=3 | EOF || colspan=5 | Sequence Number |||||

FIG. 14

| 7 | 6 | 5 | 4 | 3 | 2 | 1 | 0 |
|---|---|---|---|---|---|---|---|
| | ESC_DL = 8'b0000_0001 |||||||
| colspan=3 | SOF | colspan=2 | TC=x | colspan=3 | Reserved |||||||
| | Block_Length = N |||||||
| | DL_SDU-Byte 0 |||||||
| | DL_SDU-Byte 1 |||||||
| | ... |||||||
| | DL_SDU-Byte N-1 |||||||
| | ESC_DL = 8'b0000_0001 |||||||
| colspan=3 | COF | colspan=2 | TC=x | colspan=3 | Reserved |||||||
| | Block_Length = M |||||||
| | DL_SDU-Byte 0 |||||||
| | DL_SDU-Byte 1 |||||||
| | ... |||||||
| | DL_SDU-Byte M-1 |||||||
| | ESC_DL = 8'b0000_0001 |||||||
| colspan=3 | EOF | colspan=5 | Sequence Number |||||||

FIG. 15

| 7 | 6 | 5 | 4 | 3 | 2 | 1 | 0 |
|---|---|---|---|---|---|---|---|
| | ESC_DL = 8'b0000_0001 |||||||
| colspan=3 | SOF | colspan=2 | TC=x | colspan=3 | Reserved |||||
| | Block_Length = N |||||||
| | DL_SDU-Byte 0 |||||||
| | DL_SDU-Byte 1 |||||||
| | ... |||||||
| | DL_SDU-Byte N-1 |||||||
| | ESC_DL = 8'b0000_0001 |||||||
| colspan=3 | AFC | colspan=2 | TC=y | colspan=2 | CReq | Rsvd |
| colspan=4 | Frame Seq. Number | colspan=4 | Reserved |||||
| | Credit Value |||||||
| | ESC_DL = 8'b0000_0001 |||||||
| colspan=3 | COF | colspan=2 | TC=x | colspan=3 | Reserved |||||
| | Block_Length = M |||||||
| | DL_SDU-Byte 0 |||||||
| | DL_SDU-Byte 1 |||||||
| | ... |||||||
| | DL_SDU-Byte M-1 |||||||
| | ESC_DL = 8'b0000_0001 |||||||
| colspan=3 | EOF | colspan=5 | Sequence Number |||||

FIG. 16

| 7 | 6 | 5 | 4 | 3 | 2 | 1 | 0 |
|---|---|---|---|---|---|---|---|
| | ESC_PA = 8'b1111_1110 ||||||||
| | EscParam_PA = PACP_BEGIN = 8'h01 ||||||||
| | PACP_FunctionID[15:8] = 8'h01 ||||||||
| | PACP_FunctionID[7:0] = 8'h0E ||||||||
| | DevID ||||||||
| colspan=2 | Adapt || colspan=6 | Flags ||||||
| colspan=3 | TxMode ||| colspan=3 | TxLane ||| colspan=2 | TxGear ||
| colspan=3 | RxMode ||| colspan=3 | RxLane ||| colspan=2 | RxGear ||
| | PaPowerModeUserData[0][15:8] ||||||||
| | PaPowerModeUserData[0][7:0] ||||||||
| | PaPowerModeUserData[1][15:8] ||||||||
| | PaPowerModeUserData[1][7:0] ||||||||
| | PaPowerModeUserData[2][15:8] ||||||||
| | PaPowerModeUserData[2][7:0] ||||||||
| | PaPowerModeUserData[3][15:8] ||||||||
| | PaPowerModeUserData[3][7:0] ||||||||
| | PaPowerModeUserData[4][15:8] ||||||||
| | PaPowerModeUserData[4][7:0] ||||||||
| | PaPowerModeUserData[5][15:8] ||||||||
| | PaPowerModeUserData[5][7:0] ||||||||
| | PaPowerModeUserData[6][15:8] ||||||||
| | PaPowerModeUserData[6][7:0] ||||||||
| | PaPowerModeUserData[7][15:8] ||||||||
| | PaPowerModeUserData[7][7:0] ||||||||
| | PaPowerModeUserData[8][15:8] ||||||||
| | PaPowerModeUserData[8][7:0] ||||||||
| | PaPowerModeUserData[9][15:8] ||||||||
| | PaPowerModeUserData[9][7:0] ||||||||
| | PaPowerModeUserData[10][15:8] ||||||||
| | PaPowerModeUserData[10][7:0] ||||||||
| | PaPowerModeUserData[11][15:8] ||||||||
| | PaPowerModeUserData[11][7:0] ||||||||

FIG. 17

| 7 | 6 | 5 | 4 | 3 | 2 | 1 | 0 |
|---|---|---|---|---|---|---|---|
| | ESC_PA = 8'b1111_1110 ||||||||
| | EscParam_PA = PACP_BEGIN = 8'h01 ||||||||
| | PACP_FunctionID[15:8] = 8'h02 ||||||||
| | PACP_FunctionID[7:0] = 8'h0D ||||||||
| colspan=7 | Reserved ||||||| FC |
| | Status ||||||||
| | PaPowerModeUserData[0][15:8] ||||||||
| | PaPowerModeUserData[0][7:0] ||||||||
| | PaPowerModeUserData[1][15:8] ||||||||
| | PaPowerModeUserData[1][7:0] ||||||||
| | PaPowerModeUserData[2][15:8] ||||||||
| | PaPowerModeUserData[2][7:0] ||||||||
| | PaPowerModeUserData[3][15:8] ||||||||
| | PaPowerModeUserData[3][7:0] ||||||||
| | PaPowerModeUserData[4][15:8] ||||||||
| | PaPowerModeUserData[4][7:0] ||||||||
| | PaPowerModeUserData[5][15:8] ||||||||
| | PaPowerModeUserData[5][7:0] ||||||||
| | PaPowerModeUserData[6][15:8] ||||||||
| | PaPowerModeUserData[6][7:0] ||||||||
| | PaPowerModeUserData[7][15:8] ||||||||
| | PaPowerModeUserData[7][7:0] ||||||||
| | PaPowerModeUserData[8][15:8] ||||||||
| | PaPowerModeUserData[8][7:0] ||||||||
| | PaPowerModeUserData[9][15:8] ||||||||
| | PaPowerModeUserData[9][7:0] ||||||||
| | DevID ||||||||
| colspan=2 | Adapt || colspan=6 | Flags ||||||
| colspan=2 | TxMode || colspan=3 | TxLane ||| colspan=3 | TxGear |||
| colspan=2 | RxMode || colspan=3 | RxLane ||| colspan=3 | RxGear |||

FIG. 18

| 7 | 6 | 5 | 4 | 3 | 2 | 1 | 0 |
|---|---|---|---|---|---|---|---|
| | ESC_PA = 8'b1111_1110 |||||||
| | EscParam_PA = PACP_BEGIN = 8'h01 |||||||
| | PACP_FunctionID[15:8] = 8'h08 |||||||
| | PACP_FunctionID[7:0] = 8'h05 |||||||
| Cnf | T | colspan=6 | Reserved ||||||
| | Reserved |||||||
| | MIBattribute[15:8] |||||||
| | MIBattribute[7:0] |||||||
| | GenSelectorIndex[15:8] |||||||
| | GenSelectorIndex[7:0] |||||||
| | MIBvalue[31:24] |||||||
| | MIBvalue[23:16] |||||||
| | MIBvalue[15:8] |||||||
| | MIBvalue[7:0] |||||||

FIG. 19

| 7 | 6 | 5 | 4 | 3 | 2 | 1 | 0 |
|---|---|---|---|---|---|---|---|
| ESC_PA = 8'b1111_1110 ||||||||
| EscParam_PA = PACP_BEGIN = 8'h01 ||||||||
| PACP_FunctionID[15:8] = 8'h09 ||||||||
| PACP_FunctionID[7:0] = 8'h01 ||||||||
| ConfigResultCode ||||||||
| Reserved ||||||||

FIG. 20

| 7 | 6 | 5 | 4 | 3 | 2 | 1 | 0 |
|---|---|---|---|---|---|---|---|
| ESC_PA = 8'b1111_1110 ||||||||
| EscParam_PA = PACP_BEGIN = 8'h01 ||||||||
| PACP_FunctionID[15:8] = 8'h06 ||||||||
| PACP_FunctionID[7:0] = 8'h02 ||||||||
| MIBattribute[15:8] ||||||||
| MIBattribute[7:0] ||||||||
| GenSelectorIndex[15:8] ||||||||
| GenSelectorIndex[7:0] ||||||||

FIG. 21

| 7 | 6 | 5 | 4 | 3 | 2 | 1 | 0 |
|---|---|---|---|---|---|---|---|
| ESC_PA = 8'b1111_1110 ||||||||
| EscParam_PA = PACP_BEGIN = 8'h01 ||||||||
| PACP_FunctionID[15:8] = 8'h07 ||||||||
| PACP_FunctionID[7:0] = 8'h03 ||||||||
| ConfigResultCode ||||||||
| Reserved ||||||||
| MIBvalue[31:24] ||||||||
| MIBvalue[23:16] ||||||||
| MIBvalue[15:8] ||||||||
| MIBvalue[7:0] ||||||||

FIG. 22

| 7 | 6 | 5 | 4 | 3 | 2 | 1 | 0 |
|---|---|---|---|---|---|---|---|
| ESC_PA = 8'b1111_1110 ||||||||
| EscParam_PA = PACP_BEGIN = 8'h01 ||||||||
| PACP_FunctionID[15:8] = 8'h04 ||||||||
| PACP_FunctionID[7:0] = 8'h00 ||||||||

FIG. 23

OPERATION METHOD FOR ELECTRONIC DEVICE AND ELECTRONIC DEVICE CAPABLE OF PERFORMING ADVANCED LINE ENCODING

CROSS-REFERENCE TO RELATED APPLICATION

The present application claims priority under 35 U.S.C. § 119(a) to Taiwanese patent application number 113116681 filed on May 6, 2024, in the Taiwanese Intellectual Property Office, the entire disclosure of which application is incorporated by reference herein.

BACKGROUND OF THE INVENTION

Field of the Invention

The present disclosure relates to an electronic device and a method therefor, and in particular to methods for an interconnection protocol with an advanced line encoding, a controller therefor, and an electronic device such as a host device or a storage device.

Description of the Related Art

The Mobile Industry Processor Interface (MIPI) alliance developed interconnection protocol technology, for example, MIPI M-PHY specification associated with a physical layer and MIPI UniPro specification associated with a Unified Protocol (UniPro), for interconnection from one chip to another inside the mobile devices or those affected by the mobile devices in order to implement higher transmission speeds and low power consumption operations. On the other hand, the Joint Electron Device Engineering Council (JEDEC), using the MIPI M-PHY specification and the MIPI UniPro specification, launched a high-performance non-volatile memory standard that is referred to as Universal Flash Storage (UFS). The UFS standard realizes gigabit-level high-speed transmissions and low-power operations, and provides the functionality and expandability required for advanced mobile systems (for example, computing devices such as smartphones, tablet computers, multimedia devices, and wearable devices) to facilitate rapid adoption by the industry.

A system implemented according to the UFS standard includes a local host and a remote device, wherein the local host may be a computing device and the remote device may be a storage device implemented by a non-volatile memory, for example. A bidirectional link is established between the host and the device, and this link in between can be configured with multiple lanes in either of the transmission directions. Each of the host and the device can be implemented with a physical interface according to the M-PHY specification and a link controller according to the UniPro specification.

For all M-PHY symbols transmitted over the link, the physical interface is required to apply a specified line coding (or symbol coding) technique referred to as "8b10b" or "8b/10b" coding defined in the M-PHY specification for DC balance. The link controller also utilizes the symbol encoding technique that UniPro requires for M-PHY correspondingly. In this well-known 8b10b coding scheme, every byte is converted to ten bits and the 8b10b coding has 20% overhead accordingly.

BRIEF SUMMARY OF THE INVENTION

In the present disclosure, technologies for facilitating an interconnection protocol capable of performing an advanced line encoding scheme to improve effective data rate are provided, and are suitable for an electronic device capable of linking to another electronic device according to the interconnection protocol.

Embodiments of an method for an electronic device are provided. The method comprising: generating, at a data link layer of a link controller of the electronic device, a plurality of data items to be transmitted; generating, at the link controller of the electronic device, an advanced line encoding (ALE) block according to an advanced line encoding scheme, the ALE block including a data field, an error detection portion based on the data field, and an error correction portion corresponding to the data field and the error detection portion, the data field being generated by using one or more of the plurality of data items selectively based on a threshold value of block length for data item; and transmitting, at the link controller of the electronic device, the ALE block.

Embodiments of an electronic device configured to communicate with another electronic device are provided. The electronic device can be implemented as a host device or storage device. The electronic device comprises an interconnection controller which includes a physical layer circuit for signal transmission and a link controller coupled to the physical layer circuit for data transmission. The interconnection controller performs a plurality of operating including: generating a plurality of data items to be transmitted; generating an advanced line encoding (ALE) block according to an advanced line encoding scheme, the ALE block including a data field, an error detection portion based on the data field, and an error correction portion corresponding to the data field and the error detection portion, the data field being generated by using one or more of the plurality of data items selectively based on a threshold value of block length for data item; and transmitting the ALE block.

In some embodiments of the method or the electronic device, the data field is generated by using one or more of the plurality of data items selectively based on the threshold value of block length for data item, number of remaining data of a particular data item to be transmitted, and number of available space of the data field at a current arbitration location which indicates a location of the data field for data item insertion.

In some embodiments of the method or the electronic device, the ALE block includes the data items only from a data link layer of the electronic device.

In some embodiments of the method or the electronic device, the ALE block includes the data items only from a physical adapter layer of the electronic device.

In some embodiments of the method or the electronic device, the ALE block is transmitted through a link using an n-level pulse amplitude modulation signaling scheme, wherein n is greater than two.

BRIEF DESCRIPTION OF THE DRAWINGS

FIG. 4 is an embodiment of an ALE block based on FIG. 3.

FIG. 11 is a schematic diagram showing an example of an AFC frame.

FIG. 12 is a schematic diagram showing an example of a NAC frame.

FIG. 13A is a schematic diagram showing an example of an SOF symbol structure.

FIG. 13B is a schematic diagram showing an example of an EOF symbol structure.

FIG. 13C is a schematic diagram showing an example of a COF symbol structure.

FIG. 13D is a schematic diagram showing an example of a data bytes structure.

FIG. 14 is a schematic diagram showing an example of a data frame structure.

FIG. 15 is a schematic diagram showing an example of a data frame structure, including a COF symbol with N+M bytes in length.

FIG. 16 is a schematic diagram showing an example of a data frame structure, with N+M Bytes in length which is separated by an AFC frame and is continued by a COF symbol.

FIG. 17 is a schematic diagram showing an example of a PACP_PWR_req frame structure.

FIG. 18 is a schematic diagram showing an example of a PACP_PWR_cnf frame structure.

FIG. 19 is a schematic diagram showing an example of a PACP_SET_req frame structure.

FIG. 20 is a schematic diagram showing an example of a PACP_SET_cnf frame structure.

FIG. 21 is a schematic diagram showing an example of a PACP_GET_req frame structure.

FIG. 22 is a schematic diagram showing an example of a PACP_GET_cnf frame structure.

FIG. 23 is a schematic diagram showing an example of a PACP_EPR_ind frame structure.

DETAILED DESCRIPTION OF THE INVENTION

Figure 1:
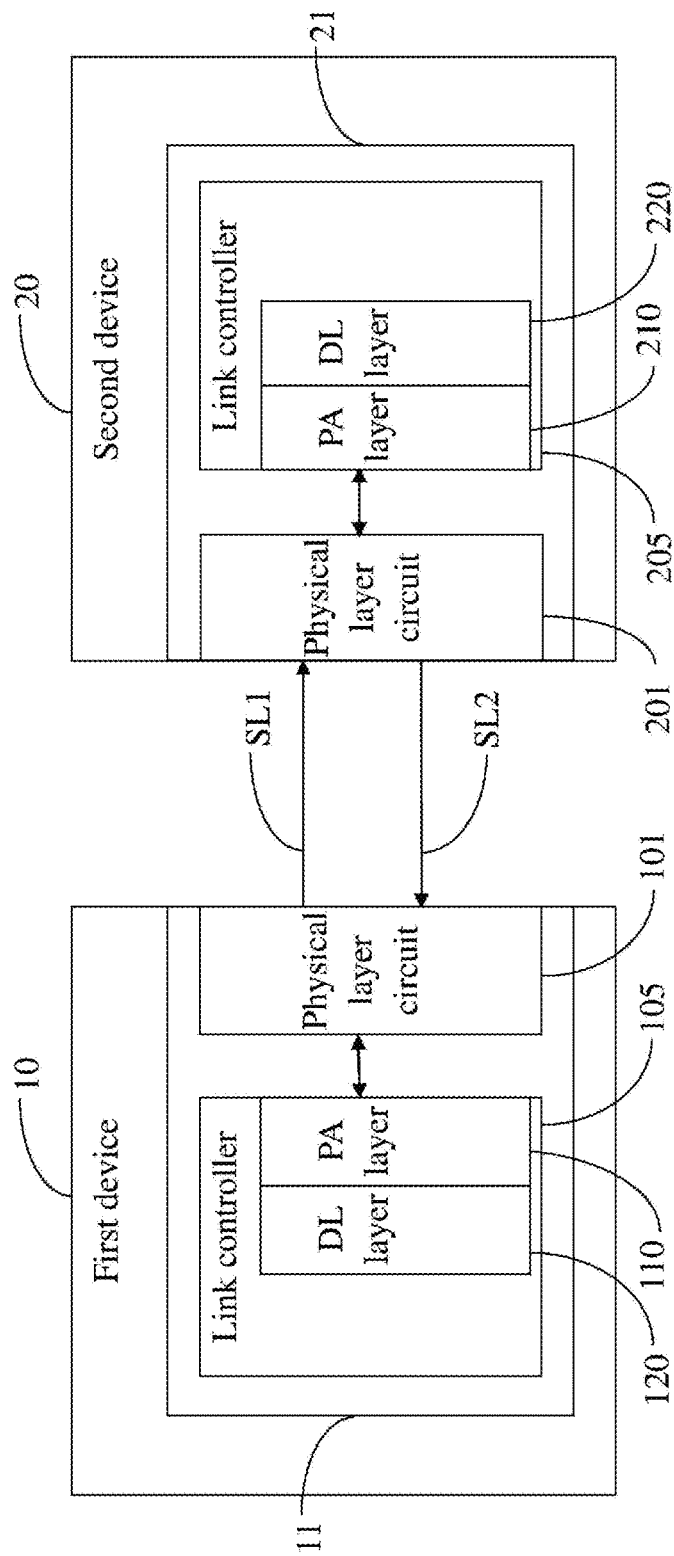
FIG. 1 is a block diagram illustrating an embodiment of a communication system capable of communication according to an interconnection protocol.

To facilitate understanding of the object, characteristics and effects of this present disclosure, embodiments together with the attached drawings for the detailed description of the present disclosure are provided.

In the present disclosure, embodiments of an interconnection protocol with an advanced line encoding scheme are provided. The advanced line encoding (ALE) scheme hereafter indicates a 1b/1b coding scheme having an effective data rate larger than an effective data rate of 8b/10b coding scheme. In addition, embodiments of a new data structure for data transmission for an ALE scheme, referred to as an ALE block, for the interconnection protocol are provided to conduct or realize the ALE scheme for improved data throughput. In addition, a forward error correction (FEC) scheme can be adopted in the ALE frame for implementations of the interconnection protocol in conjunction with an advanced signaling scheme such as a pulse amplitude modulation with n levels (PAM-n) signaling (where n>2).

In some embodiments, the interconnection protocol can be derived from the UFS standard. The interconnection protocol can also be regarded as a proposed or enhanced version of the UFS standard in the future. The advanced line encoding scheme can be implemented in the interconnection protocol as an advanced operation mode, or referred to as an advanced line encoding (ALE) mode, which indicates that an electronic device compliant with the interconnection protocol operating in this mode is capable of data transmission by using an ALE scheme.

In some embodiments, an advanced signaling scheme for bits transmission different from conventional signaling schemes, such as Non-Return-to-Zero (NRZ) or Pulse Width Modulation (PWM), available in the current M-PHY specification, may be further adopted in conjunction with the ALE scheme to enhance overall data throughput. For example, a signaling scheme for bits transmission such as a pulse amplitude modulation with n level (PAM-n, where n>2) can be adopted together with the ALE scheme, wherein n is an integer such as 3, 4, 5, 6, 8, or 16.

Various embodiments are provided below for facilitating the interconnection protocol, and are suitable for an electronic device capable of communicating with another electronic device according to the interconnection protocol.

As mentioned above, the interconnection protocol can be derived from the UniPro specification or UFS standard. For example, a conventional UFS system includes a UFS host and a UFS device. The UFS host and the UFS device communicate each other through respective UFS Interconnect (UIC) layer including UniPro and M-PHY. Accordingly, the interconnection protocol can be implemented and derived from architecture of the conventional UFS system by using a modified UFS system implementing a modified version of UniPro and a modified version of M-PHY for the ALE. Further, the interconnection protocol can also be implemented in a communication system including a host and a device each having respective link layer (such as a modified version of UniPro) and respective physical layer (such as a modified version of M-PHY) both compliant.

Further, in the present disclosure, technologies for facilitating control frame transmission are provided, and are suitable for an electronic device capable of communicating with another electronic device according to the interconnection protocol. By using the technologies, control frame transmission can be performed effectively and more efficiently, thereby reducing latency in control frame transmission and enhancing performance. Embodiments of a device and a method for facilitating control frame transmission are provided.

FIG. 1 is a block diagram illustrating an embodiment of a communication system capable of communication according to the interconnection protocol. The interconnection protocol, for example, is based on a modified UniPro specification, a modified UFS system, or other related communication protocols or specifications, and so on, whenever appropriate. The communication system, for example, includes a first device 10 and a second device 20, which can be a local host and a remote device respectively, or vice versa. In FIG. 1, the first device 10 includes a link controller 100 and a physical layer circuit 105 for signal transmission, which can be implemented as an interconnection controller 11. Likewise, the second device 20 includes a link controller 200 and a physical layer circuit 205 for signal transmission, which can be implemented as an interconnection controller 21. The link controller 100 of the first device 10 for example implements a protocol layer of the interconnection protocol (or "link layer," with respect to the physical layer such as M-PHY) such as a modified UniPro layer including such as a physical adapter (PA) layer 110, a data link (DL) layer 120, and so on; and likewise, the link controller 200 of the second device 20 for example also implements the protocol layer (or "link layer") such as a modified UniPro layer including such as a physical adapter (PA) layer 210, a data link (DL) layer 220, and so on. The first device 10 is capable of communicating with the second device 20 through a link including at least one data lane SL1 and at least one data lane SL2, which are bidirectional, according to the interconnect protocol. For example, the interconnection protocol is applicable to a wide range of device types (e.g., for first device or second device) such as application processors, co-processors, modems, storage subsystems including non-volatile memory modules, displays, camera sensors, 3D graphics and multimedia accelerators, chips, and so on. It is also applicable to different types of data traffic such as control messages, bulk data transfer and packetized streaming. Other related MIPI alliance specifications or other related specifications can also be used for implementation of the physical layer or application layer, whenever appropriate.

Figure 2:
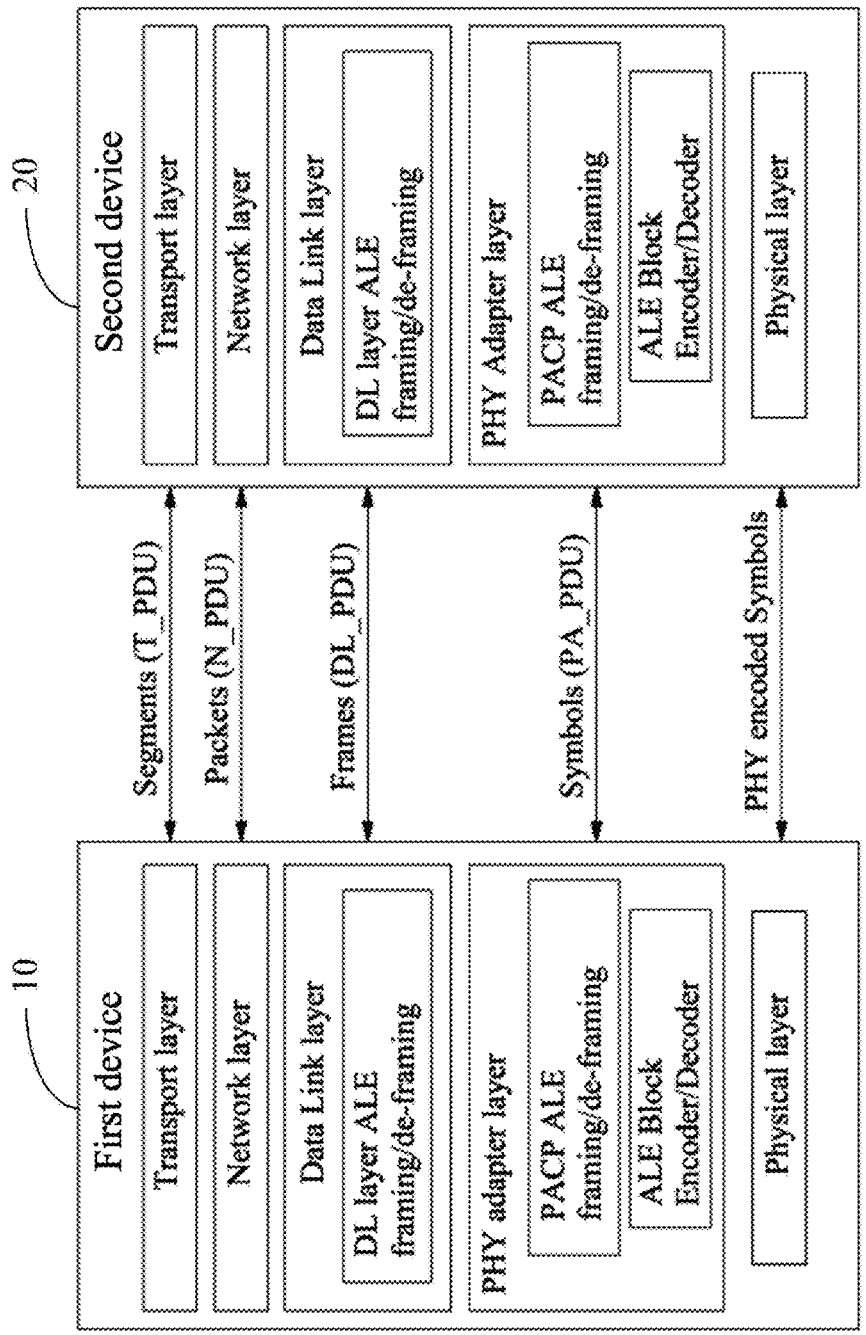
FIG. 2 is a schematic diagram illustrating an embodiment of a system capable of performing an ALE scheme.

FIG. 2 is a schematic diagram illustrating an embodiment of a system capable of performing an advanced line encoding (ALE) scheme. In this embodiment as shown in FIG. 2, either the host or device of a modified UFS system has new functionality for the ALE scheme. The layers as shown in FIG. 2, such as data link layer and PA layer, can be regarded as an embodiment of the corresponding layers as shown in FIG. 1. In FIG. 2, the data link layer includes functionality for DL layer ALE framing/de-framing and thus a data link layer frame can be generated for a transmitting side in a new data format, which can be derived from the data format used in a UniPro specification. The PA layer includes functionality for physical adapter control protocol (PACP) ALE framing/de-framing and thus a PACP frame can be generated for a transmitting side in a new data format, which can be derived from the data format used in a UniPro specification. The PA layer further includes functionality for ALE block encoder/decoder and thus the data link layer frame and the PACP frame can be encoded as ALE blocks. An ALE block is a unit of data transmission under the ALE scheme and is output to the physical layer for signal transmission (or bits transmission) under an advanced signaling scheme (e.g., PAM-n, where n>2 such as 3, 4, 5, 6, 8, or 16).

As illustrated in FIG. 2, on one side (e.g., first device 10) of the communication system, the layers of the UniPro, such as the transport layer, network layer, data link layer, PA layer, and the PHY layer communicate with their counterparts on the peer side (e.g., second device 20) by using their respective protocol data units (e.g., segments (T_PDU), packets (N_PDU), frames (DL_PDU), symbols (PA_PDU), and PHY encoded symbols), wherein the data link layer, PA layer, and PHY layer are configured to support the ALE scheme. To implement an ALE scheme, on a transmitting side, one or more ALE blocks are generated in the PA layer for transmission to a peer side, wherein each ALE block includes a plurality of symbols or protocol data units (PDUs) from the DL or PA layer. On a receiving side, ALE blocks received from the transmitting side are decoded to output DL layer frames or PA layer frames to the DL layer or PA layer, respectively.

Figure 3:
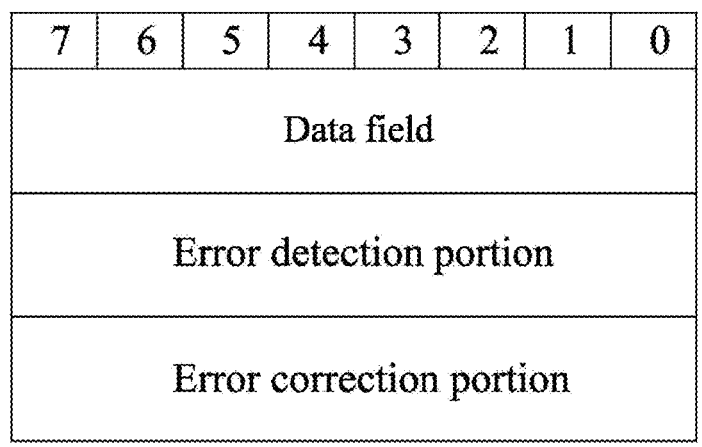
FIG. 3 is a diagram illustrating an embodiment of an ALE block.

FIG. 3 is a diagram illustrating an embodiment of an ALE block. As shown in FIG. 3, an ALE block includes a data field, an error detection portion, and an error correction portion. The data field of an ALE block may include either at least one data link layer frame or a PACP frame. The error detection portion may be error detection codes such as cyclic redundancy codes (CRC) to protect the data field. The error correction portion may be error correction codes (ECC) such as forward error correction (FEC) codes to protect the data field and the error detection portion. Any CRC and/or ECC, whenever appropriate, may be applied to the implementation of ALE blocks in a communication system based on FIG. 1 or FIG. 2. For example, the error detection portion can be generated based on 64-bit cyclic redundancy codes using CRC-64 algorithm, such as CRC-64-ISO with a CRC generator polynomial of $X^{64}+X^4+X^3+X+1$. For example, the error correction portion can be generated based on a 3-way interleaved ECC for accommodating the Decision Feedback Equalization (DFE) features used by M-PHY. In an example, 3-way interleaved Reed-Solomon coding may be used for the error correction mechanism to fix the error occurs on the data field and CRC field of the ALE block. Certainly, the implementation of the ALE block is not limited to the examples.

FIG. 4 is an embodiment of an ALE block based on FIG. 3. As shown in FIG. 4, the ALE block has a data structure with 256 bytes in length. The ALE block is constructed by 3 fields: a data field, a cyclic redundancy checking (CRC) field as an embodiment of the error detection portion, and an error correction code (ECC) field. The data field keeps the information bytes to be transported between the host and associated device. The CRC field is the CRC checksum for the data field of the ALE block. The value of CRC field is used to secure the integrity of content on the data field. The value of the ECC field is the error correction code used to perform the limited error correction to the content on the data field and CRC field. As exemplified in FIG. 4, the length of data field has 242 data bytes (denoted by Data_Byte0 to Data_Byte241), the CRC field has 8 CRC bytes (denoted by CRC_Byte0 to CRC_Byte7) and the ECC field has 6 ECC bytes (denoted by ECC_Byte0 to ECC_Byte5). Either DL layer frames or PACP frames can be deployed on the data field of respective ALE blocks. For example, the CRC bytes of the CRC field can be derived from an associated CRC polynomial and the ECC bytes of the ECC field can be generated based on a Reed-Solomon coding or other FEC coding, whenever appropriate. Further, certainly, the implementation of an ALE block is not limited to the examples, and any size of each of the fields of the ALE block such as the data field, CRC field, and ECC field can be taken whenever appropriate.

Figure 5:
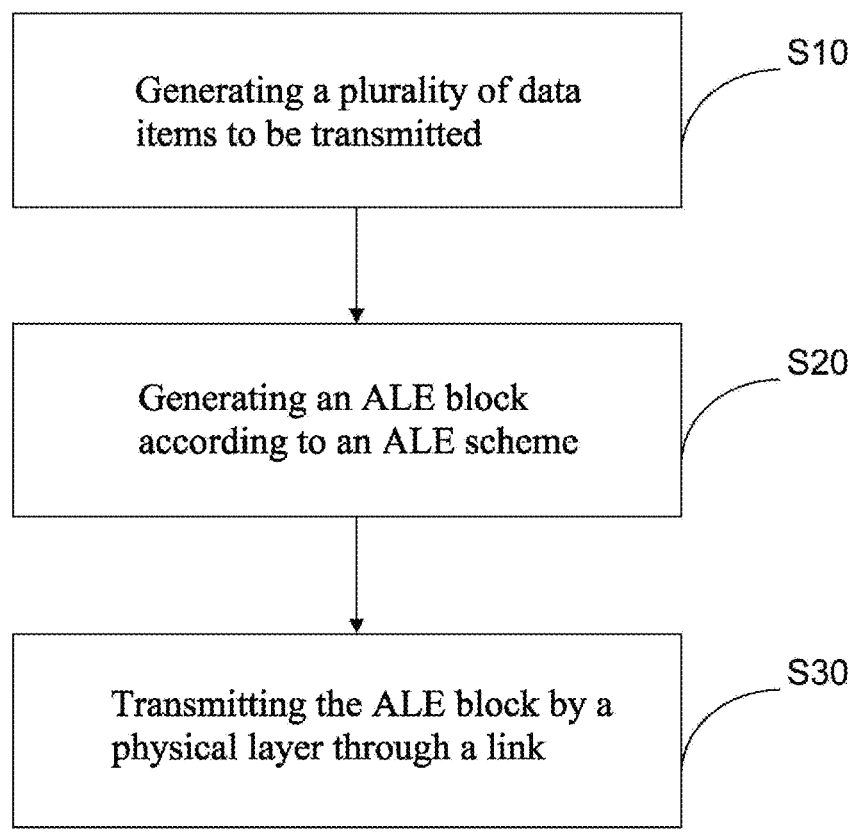
FIG. 5 is a flowchart illustrating an embodiment of a method for facilitating frame transmission.

FIG. 5 is a flowchart illustrating an embodiment of a method for facilitating frame transmission. The method can be performed on an interconnection controller of an electronic device (e.g., first device 10 or second device 20) to communicate with another electronic device. The method includes steps S10 to S30.

In step S10, a plurality of data items to be transmitted is generated. In an example, the data items are generated by a data link layer of the link controller of the interconnection controller. In another example, the data items can be generated by a physical adapter layer of the link controller of the interconnection controller.

In step S20, an ALE block is generated according to an ALE scheme. The ALE block includes a data field, an error detection portion corresponding to the data field, and an error correction portion corresponding to the data field and the error detection portion, as shown in FIG. 3 or FIG. 4. The data field of the ALE block may include either at least one data link layer frames or a PACP frame, but not both. For an ALE block, data link layer frames and the PACP frames are mutually exclusive. In addition, the data link layer frame can be a DL layer data frame or a DL layer control frame (e.g., AFC or NAC frames).

In step S30, the ALE block is transmitted by the physical layer through a link. For example, the physical layer circuit of the interconnection controller transmits the ALE block by using an advanced signaling scheme. For example, the advanced signaling scheme is PAM-n, where n>2 such as 3, 4, 5, 6, 8, or 16.

In an embodiment of step S20, for data items from the DL layer, the data field can be generated by using one or more of the plurality of data items selectively based on criteria for facilitating DL layer frame transmission. The data items can be obtained from a DL layer data frame (e.g., data items for an SOF or EOF control symbol, payload data) or a DL layer control frame (e.g., AFC or NAC frames). The criteria can be designed to facilitate control frame transmission, such as a criterion of a block length threshold to limit a data item inserted into the data field to be not greater than that the block length threshold. A DL layer data frame may have a data length less than, equal to, or greater than the block length threshold. In an example that a DL layer data frame has a data length greater than the block length threshold and is followed by a DL layer control frame, the DL layer data frame can be preempted by the DL layer control frame so that a first portion of the DL layer data frame and the DL layer control frame can be inserted into the data field of an ALE block, thereby facilitating earlier transmission of control frames.

Figure 6:
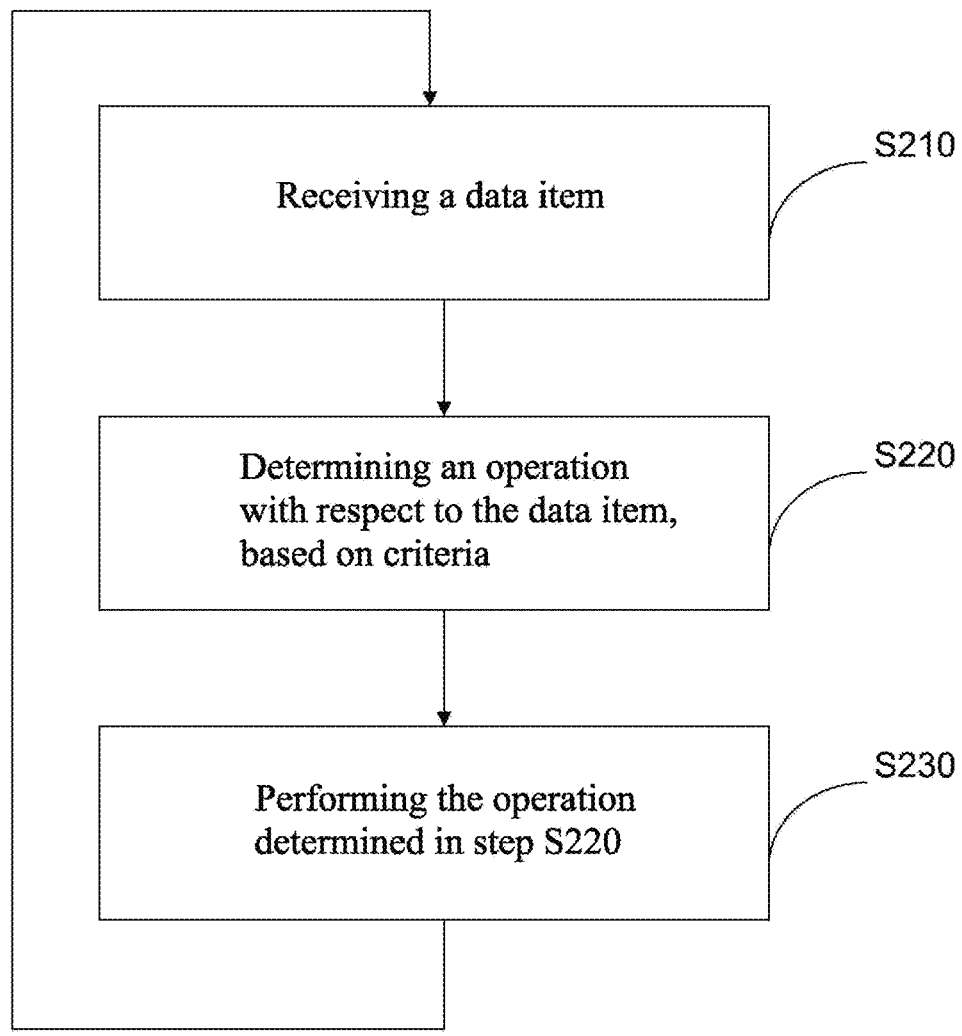
FIG. 6 is a flowchart illustrating a method for data item insertion according to an embodiment.

FIG. 6 is a flowchart illustrating a method for data item insertion according to an embodiment, which can be regarded as a method for facilitating control frame transmission. In FIG. 6, the method includes steps S210 to S230.

In step S210, a data item is received.

In step S220, an operation is determined with respect to the data item, based on criteria.

In step S230, the operation determined in step S220 is performed.

In an embodiment of step S220, the criteria include number of remaining data of a particular data item to be transmitted, number of available space of a data field at a current arbitration location, and a block length threshold value for data item. An arbitration location is a location in a data field of an ALE block where a data item can be inserted into.

For example, the link controller (e.g., 105 or 205) performs the method for facilitating frame transmission of FIG. 5 by dynamically using the method for facilitating control frame transmission based on FIG. 6 (repeating step S210 to S230). When a criterion is (or more criteria are) satisfied (for example, as determined in step S220), the link controller (e.g., 105 or 205) determines a specific operation such as a specific data item insertion operation (corresponding to step S220) in response to the criterion being satisfied. The specific operation is then performed to insert a data item into a data field of an ALE block. After a number of rounds of repeating step S210 to S230, the data field of the ALE block will be fully filled. After the error detection field of the ALE block corresponding to the data field and the error correction field of the ALE block corresponding to the data field and the error detection field are completed, the ALE block can be output to the physical layer for signal transmission.

Figure 7:
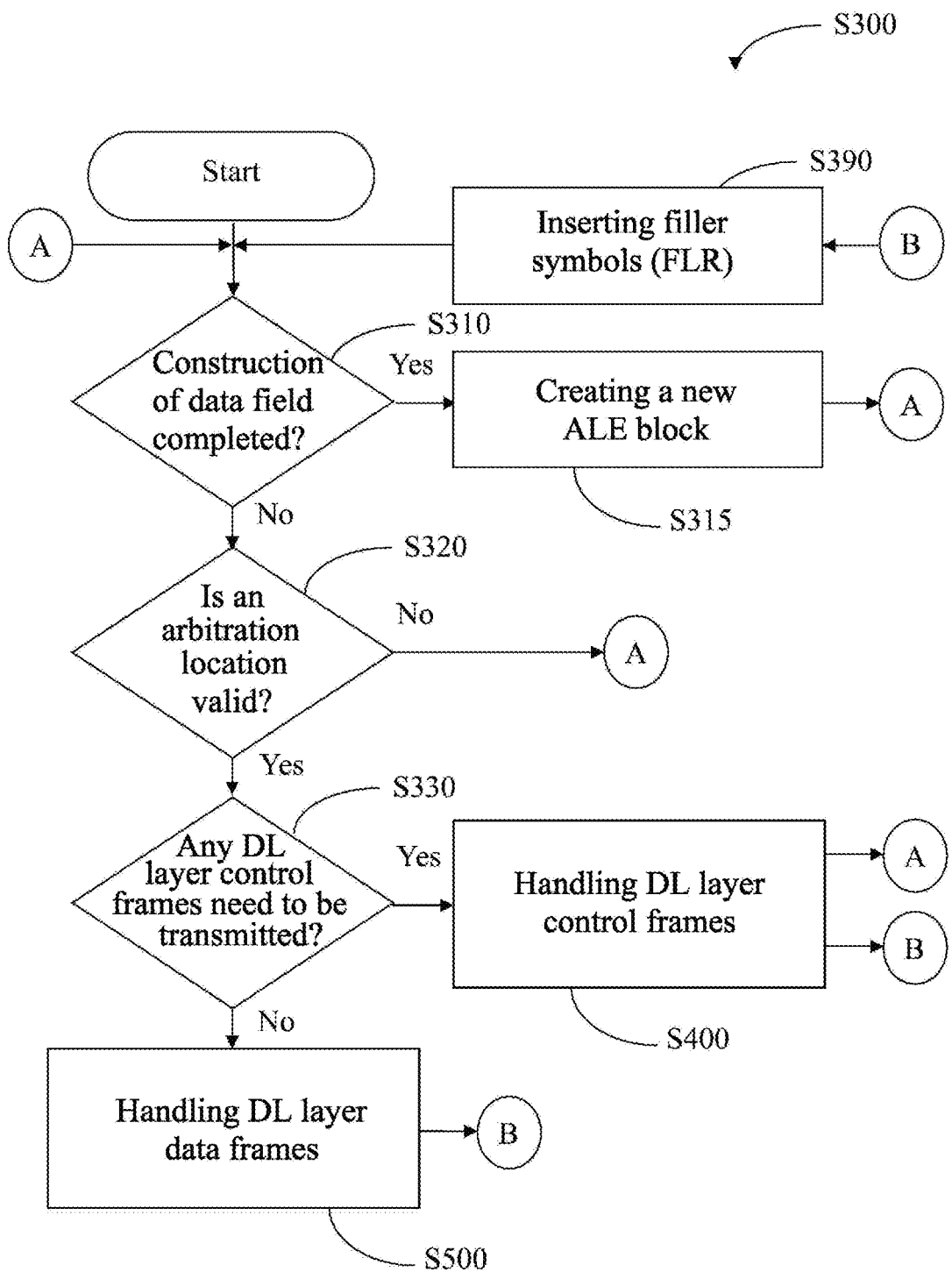
FIG. 7 is a flowchart illustrating an embodiment of a method for data item insertion based on FIG. 6.
Figure 10A:
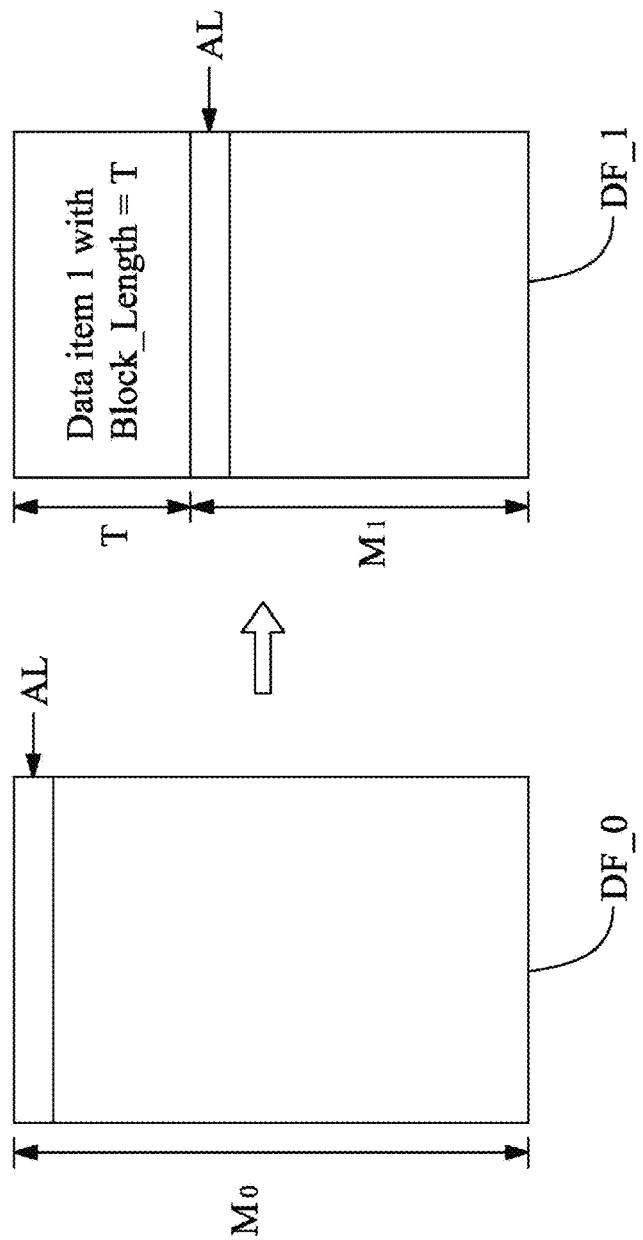
FIG. 10A is a schematic diagram illustrating examples of performing data item insertion.

FIG. 7 illustrates an embodiment of a method for data item insertion, which can be regarded as a method for facilitating control frame transmission. The embodiment of FIG. 7 can also be regarded as an embodiment based on FIG. 6. In the embodiment for step S20, the criteria include number of remaining data of a particular data item (e.g., a DL layer data frame or a portion thereof) to be transmitted (denoted by NR), number of available space of a data field of an ALE block (denoted by MA) at a current arbitration location (denoted by AL), and a block length threshold value (denoted by T) for a DL layer data frame for a specific traffic class. An arbitration location AL is a location in a data field of an ALE block where a data item can be inserted into. As illustrated in FIG. 10A, a data field (denoted by DF_0) which is blank in an initial state with the number of available space of $M_0$ (in bytes) and an arbitration location AL indicating the beginning of the data field DF_0. As illustrated in FIG. 10A, the data field after insertion of a data item 1 with a block length of T (indicated by Block_Length=T) is denoted by DF_1 with the number of available space of $M_1$ (in bytes) and an arbitration location AL indicated after the end (or boundary) of the data item 1.

In step S310, it is determined whether construction of a current ALE block's data field is completed. If the current ALE block's data field is completed (e.g., which can be expressed by a criterion of MA=0), step S315 is performed. In step S315, a new ALE block is created, wherein MA is set to a value (e.g., 242 (bytes) corresponding to the ALE block in FIG. 4) and then the method proceeds to step S310 again. If the current ALE block's data field is not completed (e.g., which can be expressed by a criterion of MA>0), step S320 is performed.

In step S320, it is determined whether an arbitration location is valid, for example, whether an arbitration location AL is detected to indicate a location within the data field of the current ALE block. If so, step S330 is performed; otherwise, the method proceeds to step S310 again.

In step S330, it is determined whether any DL layer control frames (e.g., AFC or NAC frames) need to be transmitted. If so, step S400 is performed and then the method proceeds to step S310 or step S390. If not, step S500 is performed and then the method proceeds to step S390.

In step S390, filler symbols (denoted by FLR) are inserted into the data field at the current arbitration location AL. The FLR symbol is a specific byte which is used to fill in the gap space or unused space inside the ALE block. For example, the un-used data field space or the gap space between the DL layer control frames insides the ALE block which conveys the data link layer frames (e.g., FIG. 37). The major purpose of the use of FLR symbol is to provide the flexibility and efficiency for the generation of the ALE block for DL layer frames. For example, the construction of an ALE block may take several cycles (e.g., depending on the design of bus width and data buffer logic). The introduction of the FLR symbol provide the possibility to insert the DL layer control frame on the fly into the constructing ALE block, which make the message exchange through these DL control frame can be more instantly (in real time) and efficient. In this present disclosure, there is no specific limitation for the value of the FLR symbol, and the value can be set to 8'h00, 8'hFF or the same value of FILLER (8'b1000_0000) defined by current M-PHY specification, wherein the FILLER is a data symbol rather than control symbol in the embodiments of the interconnection protocol. On the other hand, the FLR symbol can also be used to fill in the un-used data field space if an ALE block conveys the PACP frame (e.g., FIG. 39).

Figure 8:
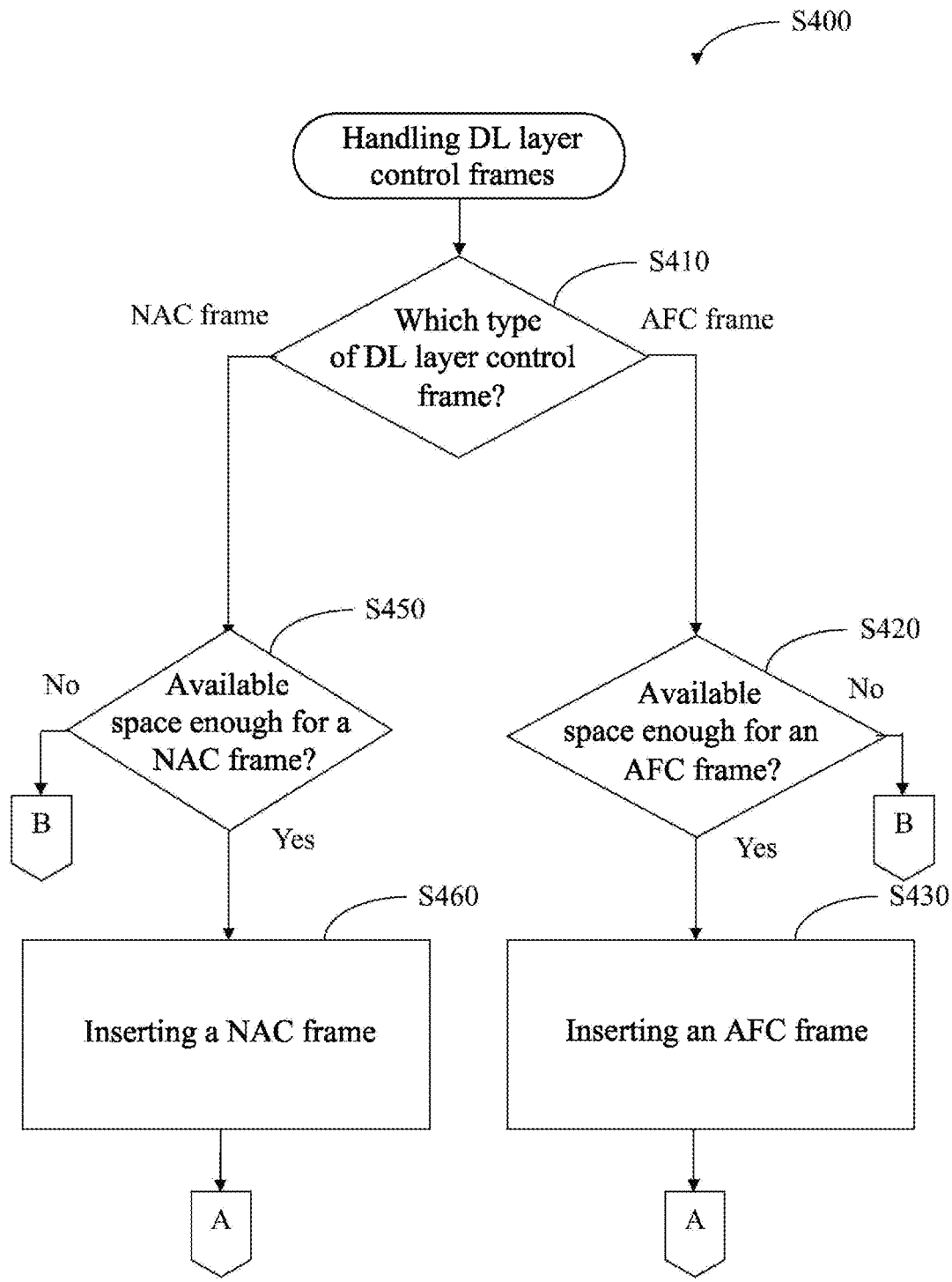
FIG. 8 is a flowchart illustrating an embodiment of handling DL layer control frames of step S400.

Referring to FIG. 8, an embodiment of step S400 includes operations (or referred to as steps) for handling DL layer control frames. In step S410, it is determined which type of DL layer control frame (e.g., AFC or NAC frame) needs to be transmitted. If an AFC frame is to be transmitted, step S420 is performed to check whether the available space (e.g., MA) is enough for an AFC frame. For example, in step S420, it is checked whether the available space (e.g., MA) is greater than or equal to the data bytes of an AFC frame (e.g., which can be expressed by a criterion of MA≥4, an AFC frame has 4 bytes). If not, the method proceeds to step S390 as shown in FIG. 7. If so, step S430 is performed to insert the AFC frame into the data field and the number of available space of the current data field (MA) is decreased by the number of data bytes of an AFC frame (e.g., which can be expressed by an assignment statement MA=MA−4), and then the method proceeds to step S310 shown in FIG. 7.

For step S410, if a NAC frame is to be transmitted, step S450 is performed to check whether the available space (e.g., MA) is enough for a NAC frame. For example, in step S450, it is checked whether the available space (e.g., MA) for the data field is greater than or equal to the data bytes of a NAC frame (e.g., which can be expressed by a criterion of MA≥2; a NAC frame has 2 bytes). If so, step S460 is performed to insert the NAC frame into the data field, and then the method proceeds to step S310 as shown in FIG. 7. If not, the method proceeds to step S390 as shown in FIG. 7.

Figure 9A:
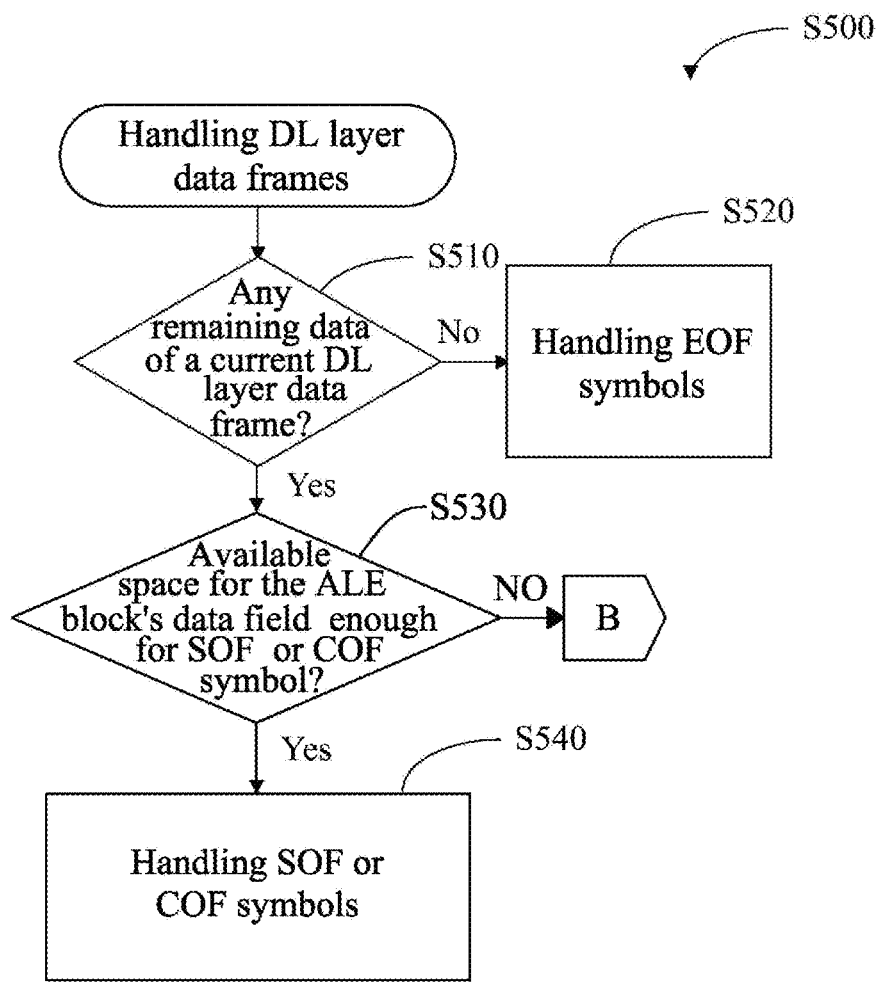
FIG. 9A is a flowchart illustrating an embodiment of handling DL layer data frames of step S500.

Referring to FIG. 9A, an embodiment of step S500 includes operations (or referred to as steps) for handling DL layer data frames. In step S510, it is determined whether there is any remaining data of a current DL layer data frame to be transmitted. For example, in step S510, it is checked whether the number of remaining data (e.g., NR) is greater than zero. If not (e.g., NR=0), step S520 is performed. If so (e.g., NR>0), step S530 is performed to check whether the available space (e.g., MA) for the ALE block's data field is enough for start-of-frame (SOF) or continuation of preempted frame (COF) symbol (e.g., which can be expressed by a criterion of MA≥4). If so, step S540 is performed. If not, the method proceeds to step S390 as shown in FIGS. 9A and 7.

Figure 9B:
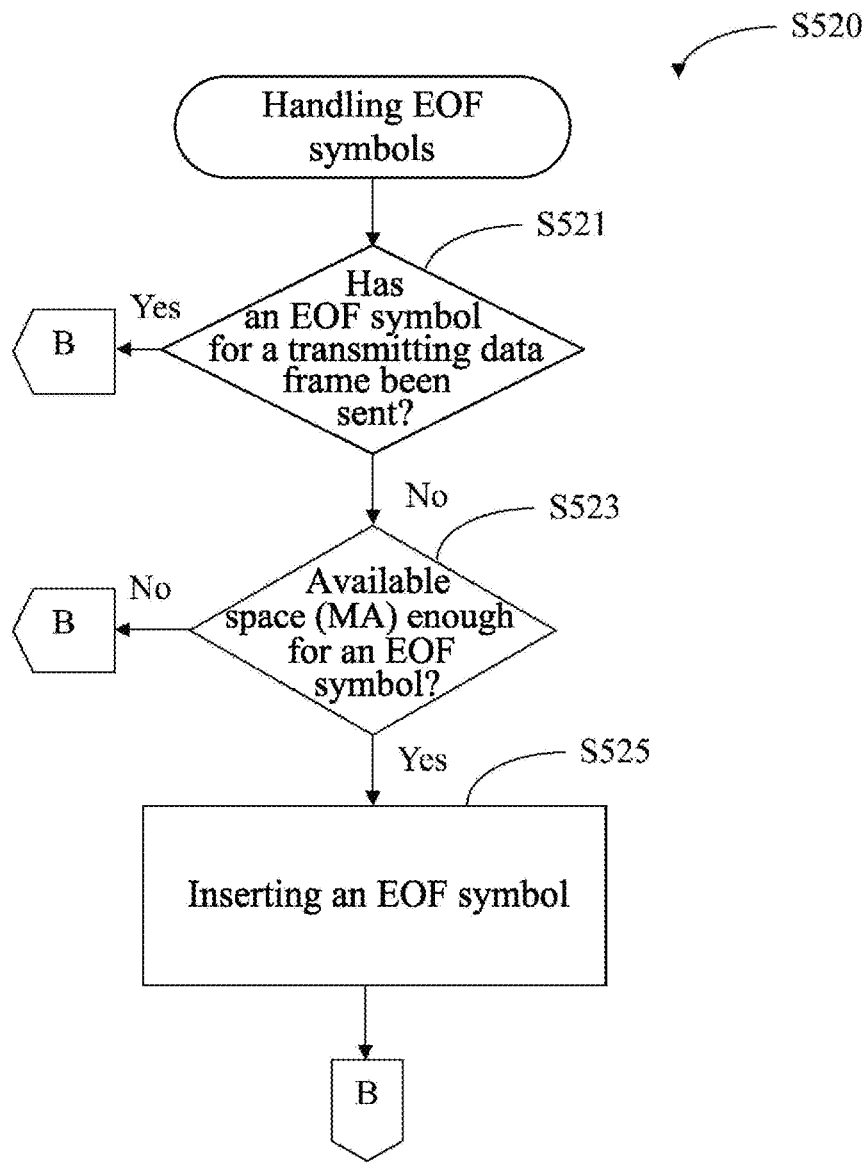
FIG. 9B is a flowchart illustrating an embodiment of handling EOF symbols of step S520.

Referring to FIG. 9B, an embodiment of step S520 includes operations (or referred to as steps) for handling end-of-frame (EOF) symbols. In step S521, it is determined whether an EOF symbol for a transmitting data frame has been sent. For example, in step S521, it is checked whether an EOF symbol for an associated data frame has been inserted. If so, the method proceeds to step S390 as shown in FIGS. 9B and 7. If not, step S523 is performed to check whether the available space (e.g., MA) is enough for an EOF symbol (e.g., which can be expressed by a criterion of MA≥2; an EOF symbol has 2 bytes). If so, step S525 is performed. If not, the method proceeds to step S390 as shown in FIGS. 9B and 7. In step S525, an EOF symbol is inserted into the data field, an indicator such as a flag or so on is set to a specific value to indicate that an EOF symbol has been inserted for the associated DL layer data frame, and the number of available space of the current data field (MA) is decreased by two (e.g., which can be expressed by an assignment statement MA=MA−2). After that, the method proceeds to step S390 as shown in FIGS. 9B and 7.

Figure 9C:
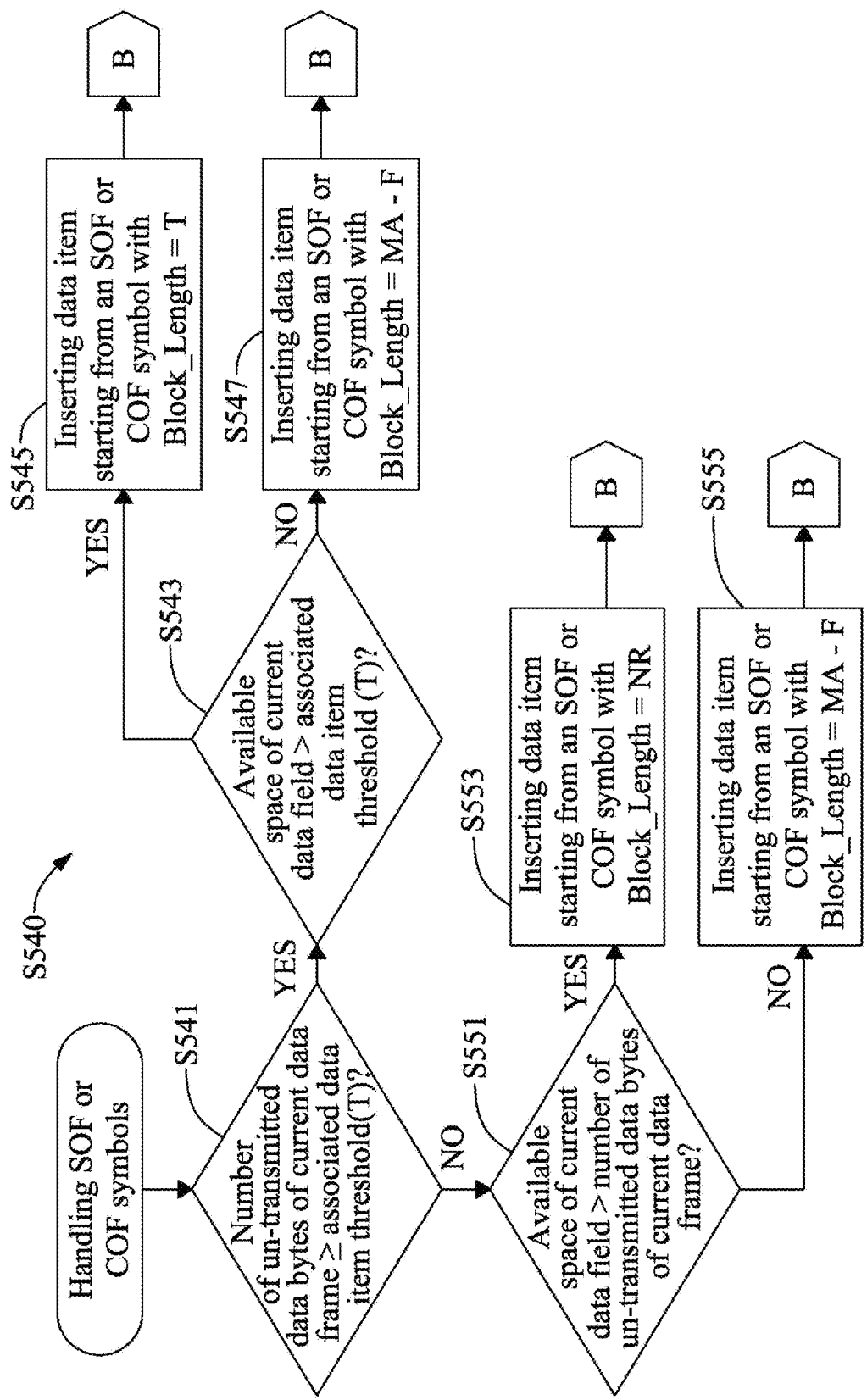
FIG. 9C is a flowchart illustrating an embodiment of handling SOF or COF symbols of step S540.

Referring FIG. 9C, an embodiment of step S540 includes operations (or referred to as steps) for handling SOF or COF symbols. In step S541, it is determined whether the number of un-transmitted data bytes of the current data frame (NR) is greater than or equal to an associated data item threshold (e.g., the block length threshold value T), for example, which can be expressed by a criterion of NR≥T. If so, step S543 is performed. If not, step S551 is performed.

In step S543, it is checked whether the available space of the current ALE block's data field (MA) is greater than the associated data item threshold (e.g., T), for example, expressed by a criterion of MA≥(T+F), where F indicates number of data bytes for an EOF symbol and F equals 3 for instance. If so, step S545 is performed. If not, step S547 is performed.

In step S545, a data item starting from a SOF or COF symbol with Block_Length=T is inserted into the current ALE block's data field. If a starting portion of the current DL layer data frame is being processed in the step S540, the data item in step S545 starts from an SOF symbol; otherwise, the data item in step S545 starts from a COF symbol. This approach to a SOF or COF symbol is also applied to other steps such as step S547, S553, and S555. In addition, the available space of the current ALE block's data field (MA) is decreased by a sum of the block length threshold value (T) and number of data bytes for an EOF symbol (F), for example, expressed by an assignment statement MA=MA−(T+F). Further, the number of un-transmitted data bytes of the current data frame (NR) is decreased by the block length threshold value (T), for example, expressed by an assignment statement NR=NR−T. After that, the method proceeds to step S390 as shown in FIGS. 9C and 7.

In step S547, a data item starting from a SOF or COF symbol with Block_Length=MA−F is inserted into the current ALE block's data field. Further, the number of un-transmitted data bytes of the current data frame (NR) is decreased by the quantity of the available space of the current ALE block's data field (MA) minus the number of data bytes for an EOF symbol (F), for example, expressed by an assignment statement NR=NR−(MA−F). After that, the available space of the current ALE block's data field (MA) is set to zero. After that, the method proceeds to step S390 as shown in FIGS. 9C and 7.

In step S551, it is checked whether the available space of the current ALE block's data field (MA) is greater than the number of un-transmitted data bytes of the current data frame, for example, expressed by a criterion of MA≥(NR+F), where F indicates number of data bytes for an EOF symbol and F equals 3 for instance. If so, step S553 is performed. If not, step S555 is performed.

In step S553, a data item starting from a SOF or COF symbol with Block_Length=NR is inserted into the current ALE block's data field. In addition, the available space of the current ALE block's data field (MA) is decreased by a sum of the number of un-transmitted data bytes of the current data frame (NR) and number of data bytes for an EOF symbol (F), for example, expressed by an assignment statement MA=MA−(NR+F). Further, the number of un-transmitted data bytes of the current data frame (NR) is set to zero. After that, the method proceeds to step S390 as shown in FIGS. 9C and 7.

In step S555, a data item starting from a SOF or COF symbol with Block_Length=MA−F is inserted into the current ALE block's data field. In addition, the number of un-transmitted data bytes of the current data frame (NR) is decreased by the quantity of the available space of the current ALE block's data field (MA) minus the number of data bytes for an EOF symbol (F), for example, expressed by an assignment statement NR=NR−(MA−F). Further, the available space of the current ALE block's data field (MA) is set to zero. After that, the method proceeds to step S390 as shown in FIGS. 9C and 7.

Figure 10B:
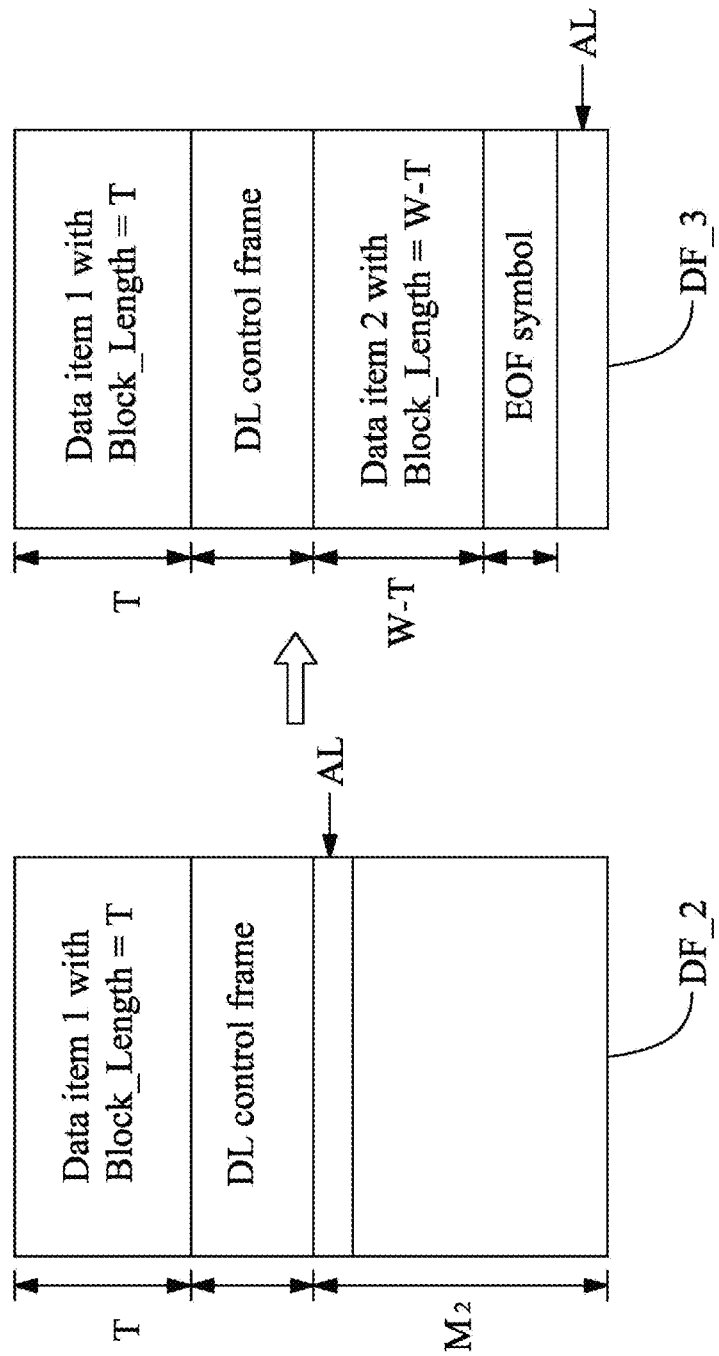
FIG. 10B is a schematic diagram illustrating examples of performing data item insertion.

Referring to FIGS. 10A-10B, some examples of performing data item insertions are illustrated by using the method based on FIGS. 5-9C. In this example, a communication system based on FIG. 1 is realized according to the interconnection protocol as described above, based on FIG. 2 to generate ALE blocks based on FIGS. 3 and 4 for data communication between the first device 10 and the second device 20. Each of the first device 10 and the second device 20 has its associated data link layer to generate DL layer frames for ALE and its associated physical adapter layer to generate ALE blocks based on the DL layer frames. The data link layer generates DL layer frames, such as DL layer data frames or DL layer control frames such as AFC or NAC frames, according to step S10 of FIG. 5. The physical adapter layer generates ALE blocks based on the DL layer frames, according to step S20 of FIG. 5. The physical layer then transmits the ALE blocks through a link, according to step S30 of FIG. 5.

For example, it is assumed that a block length threshold value T for a DL layer data frame for a specific traffic class is set to a specific value (e.g., 64). A DL layer data frame with a Block_Length=W (e.g., W=128) is generated and then a DL layer control frame such as an AFC frame is generated. It is to demonstrate how the method based on FIG. 5 can facilitate control frame transmission. As shown in FIG. 10A, a data field (denoted by DF_0) which is blank without any item from the DL layer in an initial state with the number of available space MA=$M_0$ (e.g., 242 bytes) and an arbitration location AL indicated at the first location of the data field DF_0 (e.g., location of Data_Byte0 as shown in FIG. 4). A DL layer data frame with a Block_Length=W (e.g., W=128) is generated by the DL layer and received by the PA layer. Based on step S500 of FIG. 7, step S540 of FIG. 9A, steps S541, S543 of FIG. 9C, steps S545 is performed to insert a data item 1. In addition, the number of available space MA becomes $M_1$ (e.g., (242−(64+3)) bytes) and the number of un-transmitted data bytes of the current data frame (NR) becomes 128−64=64 bytes. As illustrated in FIG. 10A, the data field after insertion of the data item 1 with Block_Length=T is denoted by DF_1 with the number of available space MA=$M_1$ and an arbitration location AL indicated after the end (or boundary) of the data item 1.

Meanwhile, a DL layer control frame such as an AFC frame is generated by the DL layer and received by the PA layer. Based on step S400 of FIG. 7 and FIG. 8, step S430 is performed to insert the AFC frame into the data field and the number of available space of the current data field (MA) is decreased by the number of data bytes of an AFC frame (e.g., which can be expressed by an assignment statement MA=MA−4). As illustrated in FIG. 10B, the data field after insertion of the data item of the AFC frame is denoted by DF_2 with the number of available space MA=$M_2$ (e.g., 242−(64+3)−4=171 bytes) and an arbitration location AL indicated after the end (or boundary) of the AFC frame. After that, based on step S500 of FIG. 7, step S540 of FIG. 9A, steps S541, S543 of FIG. 9C, steps S545 is performed to insert a data item 2. In addition, the number of available space MA becomes 171−64=107 bytes and the number of un-transmitted data bytes of the current data frame (NR) becomes 64−64=0 bytes. Afterward, based on step S500 of FIG. 7, step S520 of FIG. 9A, steps S525 of FIG. 9B is performed to insert an EOF symbol into the data field. In addition, the number of available space of the current data field (MA) is decreased by two (e.g., which can be expressed by an assignment statement MA=MA−2) and the number of available space MA becomes 105 bytes. As illustrated in FIG. 10B, the data field after insertion of the data item 2 with Block_Length=W−T (e.g., 128−64=64) and the EOF symbol is denoted by DF_3 and the arbitration location AL indicates a location after the end (or boundary) of the EOF symbol.

For data frame transmission, for example, when sending a DL layer data frame to the peer side, the interconnector controller (e.g., 11 or 21) stores the data of the DL layer data frame in a buffer temporarily in case that re-transmission (or called replay) of the DL layer data frame is needed. For example, the re-transmission is needed if a timer associated with the DL layer data frame expires or a NAC frame is received. Before the timer expires or a NAC frame is received, if an AFC frame associated with the DL layer data frame is received, the data of the DL layer data frame can be released from the buffer; otherwise, the data of the DL layer data frame retains in the buffer. The similar operations are performed for another DL layer frame to be sent. If the buffer is full, the transmission of DL layer frames will be paused until an AFC or NAC frame is received or expiration of a timer, for example.

Accordingly, with the use of the block length threshold value in the generation of data fields for ALE blocks as illustrated in FIG. 10B, the interconnection controller 21 of the remote device can send the DL layer data frames consecutively without substantial time gaps among them because of AFC frame transmission of the host device with shorter latency. The interconnection controller 21, after receiving an AFC frame, can be informed that a DL layer data frame associated with the AFC frame has been received by its peer side (e.g., the host device) shortly after the interconnection controller 21 sends the DL layer data frame. Specifically, in the DL layer of the interconnection controller 21, the buffer for storing data for re-transmission can be prevented from being full because of the informing of the reception of the AFC frame. In this manner, the interconnection controller 21 can send a series of data without gaps of time.

In another scenario of frame transmission, the block length threshold value is not used and the method based on FIG. 5 and FIG. 7 for facilitating control frame transmission. In contrast to the situation shown in FIG. 10B, AFC frames are transmitted to the remote device with a longer latency because the functionality of the block length threshold value is not used. As compared to the scenario of FIG. 10B, the interconnection controller 21 obtains the AFC frames later so the interconnection controller 21 sends the data with longer gaps of time.

Likewise, the scenario shown in FIG. 10B can also facilitate transmission of NAC frames. In a scenario, the interconnection controller 21 transmits data (such as data symbols of DL layer data frames) to the interconnection controller 11 but the interconnection controller 11 receives some erroneous data. Thus, the DL layer of the interconnection controller 11 sends NAC frames associated with the erroneous data to the interconnection controllers 21. Accordingly, the interconnection controller 21 of the remote device can re-transmit the DL layer data frames with a little amount of time gap because of NAC frame transmission of the host device with shorter latency under the method for facilitating control frame transmission. The interconnection controller 21, after receiving a NAC frame, can be informed that a DL layer data frame associated with the NAC frame has not been received by its peer side (e.g., the host device) shortly after the interconnection controller 21 sends the DL layer data frame. In this manner, the interconnection controller 21 can re-transmit a series of data quickly with a little amount of time gap.

In another scenario of frame transmission, the block length threshold value is not used. In contrast to the scenario of using the block length threshold value and the method based on FIG. 5 and FIG. 7 for facilitating control frame transmission, NAC frames are transmitted to the remote device with a longer latency because the block length threshold value is not used. The interconnection controller 21 obtains the NAC frame later so the interconnection controller 21 re-transmits the data with a greater amount of time gap.

The following provides various embodiments for implementation of the interconnection protocol with the ALE according to FIG. 1-2.

In some embodiments, the proposed ALE block is a data structure with 256 bytes in length. The ALE block is constructed by 3 fields: data field, CRC field, and ECC field, as shown in FIG. 4.

The data field keeps the information bytes to be transported between the host and associated device. The CRC field is the CRC checksum for the data field of the ALE block. The value of CRC field is used to secure the integrity of content on the data field. The value of the ECC field is the error correction code used to perform the limited error correction to the content on the data field and CRC field.

In some embodiments, PA or DL layer frame structures can be defined for the interconnection protocol so that the PA layer's PACP frames and DL layer control or data frames can be inserted into ALE blocks. The PACP frame structure and DL layer frame structure for the interconnection protocol can be derived from some modifications to the current UniPro specification. In addition, some rules can be established to regulate the construction of an ALE block. Certainly, the implementations of the PACP frame structure and DL layer frame structure of the present disclosure are not limited to the embodiments and examples.

In some embodiments, the following are rules for PA or DL layer frame structures in the interconnection protocol:
(1) DL layer frames and PACP frames for the interconnection protocol can be derived from the UniPro specification (e.g., UniPro version 2.0), wherein the CRC field on the DL layer frames and PACP frames which are defined in the UniPro specification (e.g., UniPro version 2.0) can be removed. In the interconnection protocol, the integrity of a DL layer frame or PACP frame is secured by the CRC field and ECC field of an ALE block that may include a DL layer frame or PACP frame.
(2) The control bit defined on the DL layer frames and PA layer frames in the current UniPro specification (e.g., UniPro version 2.0) is removed from the construction of modified DL layer frames and PA layer frames for the interconnection protocol.
(3) A new field is introduced to construct the DL layer's SOF symbol and COF symbol for the interconnection protocol to indicate how many data bytes follows the associated SOF or COF symbols immediately.

In some embodiments, for constructing the ALE block, the following rules (1)-(4) can be followed.
(1) The leading byte of the data field on the ALE block starts from the following specific symbol only: (a) ESC_DL, if the DL layer data or control frames follow; or (b) ESC_PA, if the PACP frames follows.
(2) The PACP frame and DL layer frames are mutually exclusive on a data field of an ALE block. In other words, if the data field of an ALE block is with the DL layer data or control frames, no PACP frames are allowed to exist on the same data field, vice versa.

(3) If the ALE block is used to convey the PACP frame, only one PACP frame is allowed for a single ALE block. This rule is provided based on the following description which is based on the UniPro specification (e.g., UniPro version 2.0). (a) Before PA layer frames can be transmitted, PA layer asserts a primitive PA_DL_ PAUSE.ind to DL layer for requesting the ownership of transmitting path. (b) The DL layer will grant the request by asserting PA_DL_PAUSE.rsp after it is ready to release the usage of transmitting path. (c) After PA layer completes the transmission of PACP frames exchange operations, PA layer releases the usage of transmitting path and informs the DL layer by asserting the PA_DL_RESUME.ind. With the characteristics listed above, the PA layer frame and DL layer frame will not be transmitted at the same time. Thus, PA layer frames and DL layer frames are to be transmitted on dedicated ALE blocks.

(4) The specific value of symbol byte 'FILLER' (FLR) is introduced to fill in the unoccupied space of the data field in the ALE block.

Exemplary rules and detail information for constructing the ALE block will be given later.

Terminology and frames/symbols used for ALE blocks are discussed in the following.

Some terms are defined below to facilitate the understanding of ALE block structure that will be described and exemplified in the subsequent description.

1. The term "1bb encoding" refers to the data mapping from physical adapter (PA) layer data to PHY layer bus signaling data is 1-bit to 1-bit. It means 1-bit data from the PA layer is transformed to 1-bit data signaling on PHY transmission bus, no extra auxiliary bits are inserted for facilitating the information transmission.
2. The term "PAM4" refers to a 4-level Pulse Amplitude Modulation format used for data transmission signaling. Each signal level can represent 2 bits of logic information.
3. The term "PA layer" refers to the Physical (PHY) Adapter layer of UniPro specification.
4. The term "DL layer" refers to the Data Link layer of UniPro specification.
5. The term "N layer" refers to the Network layer of UniPro specification.
6. The term "T layer" refers to the Transport layer of UniPro specification.
7. DME layer refers to the Device Management Entity layer of UniPro specification.
8. PA_DL_PAUSE.ind refers to the control primitive between PA layer and DL layer. PA layer uses it to claim the usage of TX path from DL layer.
9. PA_DL_PAUSE.rsp refers to the control primitive between PA layer and DL layer. DL layer asserts it to grant the usage of TX path claimed by the received PA_DL_PAUSE.ind.
10. PA_DL_RESUME.ind refers to the control primitive between PA layer and DL layer. PA layer asserts it to inform the DL layer the return of TX path usage.
11. PA layer PACP_PWR_req frame refers to the PACP frame used to request the peer side to perform the Power Mode Change or Hibernate Enter operations.
12. PA layer PACP_PWR_cnf frame refers to the PACP frame used by peer side to respond to a received PACP_PWR_req frame with the result of the Power Mode Change or Hibernate Enter request.
13. PA layer PACP_SET_req frame refers to the PACP frame used to request the peer side to perform the write operation on a specific Attribute in the associated Management Information Base (MIB).
14. PA layer PACP_SET_cnf frame refers to the PACP frame used by peer side to respond to a received PACP_SET_req frame with the result of the write operation.
15. PA layer PACP_GET_req frame refers to the PACP frame used to request the peer side to perform the read operation on a specific Attribute in the associated MIB.
16. PA layer PACP_GET_cnf frame refers to the PACP frame used by peer side to respond to a received PACP_GET_req frame with the result of the read operation.
17. PA layer PACP_EPR_ind frame refers to the PACP frame used to notify the peer side to perform the endpoint reset operation.
18. PA layer TRG_UPR0, TRG_UPR1, TRG_UPR2, PACP_CAP_ind, PACP_CAP_EXT1_ind and PACP_CAP_EXT2_ind frames refer to the PACP frames used for link startup sequence.
19. PA layer PACP_TEST_MODE_req frame refers to the PACP frame used to negotiate the entering of PHY test mode when UniPro link is at LinkDown state.
20. PA layer PACP_TEST_DATA_0, PACP_TEST_DATA_1, PACP_TEST_DATA_2 and PACP_TEST_DATA_3 frames refer to the PACP frames that convey the specified test pattern data during PHY test mode.
21. DL layer Acknowledgement and Flow Control (AFC) frame refers to the DL layer control frame for acknowledgement and flow control for DL layer data frames.
22. DL layer Negative Acknowledgement Control (NAC) frame refers to the DL layer control frame for signaling and triggering retransmission.
23. DL layer Traffic Class x (TCx) frame refers to the DL layer data frames with a specific Traffic Class (Traffic Class 0 or Traffic Class 1), wherein x=0 or 1.
24. ALE block refers to the proposed data structure with CRC field and ECC field to secure the integrity of content within the block.
25. ESC_PA refers to the specific byte with a defined value to indicate the following data type is PA layer frame. The value of this byte can be defined to 8'hFE, according to the definition of UniPro specification version 2.0, for example.
26. ESC_DL refers to the specific byte with defined value to indicate the following data type is DL layer frame. The value of this byte follows the definition of UniPro specification version 2.0, 8'h01.
27. Filler (FLR) refers to the data byte with a specific value to fill up the unoccupied space on the data field of an ALE block. For example, the specific value can be set to 8'h00.

UniPro frame modifications and extra MIBs to accommodate with the proposed ALE block structure are exemplified in the following.

In some embodiments, to be fit into the proposed ALE block structure, several new attributes (or MIBs) are introduced; and, some specific PA layer PACP frames and the DL layer control or data frames for the interconnection protocol are revised versions of the frames according to the UniPro specification for improving the flexibility and code efficiency. The following describes the differences between the original frame structure and the revised ones respectively.

The extra new MIBs and the modifications on DL Layer Frames are exemplified below.

In some embodiments, for the New DL Layer MIBs, two new MIBs are introduced to regulate the maximum number of data bytes that follow the SOF symbol or COF symbol. The value of 'Block_Length' field on the proposed SOF symbol and COF symbol will not greater than the values specified in these two MIBs for traffic class 0 (TC0) data frame and traffic class 1 (TC1) data frame respectively. By using these new MIBs, the arbitration location for DL layer control frame insertion is created to provide the possibility for early control frames responding when a long data frame is transmitting.

For example, a block length threshold value for TC0 (denoted by DL_TC0MaxBlockLength) (e.g., 1 byte in length) can be used to regulate the maximum number of data bytes following the SOF symbol or COF symbol for the TC0 data frame. By proper setting or programming the value to this attribute (MIB), the maximum time gap of DL layer control frames insertion can be regulated when an ALE block is under construction.

For example, a block length threshold value for TC1 (denoted by DL_TC1MaxBlockLength) (e.g., 1 byte in length) can be used to regulate the maximum number of data bytes follows the SOF symbol or COF symbol for the TC1 data frame. By proper setting or programming the value to this attribute (MIB), the maximum time gap of DL layer control frames insertion can be regulated when an ALE block is under construction.

In the following, DL layer frames and PA layer frames used in the interconnection protocol are exemplified in FIGS. 11 to 23, where a number of fields (such as ESC_DL, AFC, NAC, TC, CReq, Frame sequence number, Credit value, RReq and so on) of the frames shown in the Figures can be taken according to or derived from the UniPro specification (such as UniPro version 2.0), for examples, and some fields (such as, those denoted by "Reserved" or "Rsvd") indicate reserved fields. In some examples, some of the fields are shown to be assigned specific parameters (such as ESC_DL=8b'0000_0001, ESC_PA=8b'1111_1110, and so on), which are for the sake of illustration. Certainly, the implementation of the present disclosure is not limited to the examples.

FIG. 11 and FIG. 12 show examples of an AFC frame and a NAC frame, which can be used in the interconnection protocol.

As compared to conventional AFC or NAC frame as described in the UniPro specification (e.g., UniPro version 2.0), in the AFC or NAC frame according to the embodiments, the CCITT CRC-16 field is optionally removed; there is no control bit for the proposed AFC or NAC frame structure; no dedicated CRC field for the proposed NAC frame structure. The content of the proposed AFC or NAC frame structure is protected by the CRC field and ECC field of an associated ALE block.

In addition, the proposed AFC frame is with a fixed format and the length is 4 bytes, for example. The proposed NAC frame is with fixed format and the length is 2 bytes, for example.

In some embodiments, DL Layer data frame modifications are exemplified in the following.

According to the UniPro specification, the DL layer data frame is constructed by: an SOF symbol, one or more data bytes, an EOF symbol, a CRC symbol, and optionally, a COF symbol.

Some changes are proposed to these symbols for accommodating the ALE block structure, and, optionally, the CRC symbol is not required for the new scheme.

FIG. 13A is a schematic diagram showing an example of an SOF symbol structure.
1. A new field 'Block_Length' is introduced to the SOF symbol. The number in this field indicates the maximum number of data bytes that follows the SOF symbol.
2. The value of this field will be greater than 0 and the smaller one among the following 3 values: a) the values that are programmed into the proposed new DL layer MIBs DL_TC0_G6_MaxDLBlockLength and DL_TC1_G6_MaxDLBlockLength for TC0 frame and TC1 frame respectively; b) the number of bytes of available space on data field of the ALE block; c) the number of bytes of the un-transmitted data for the associated data frame.
3. There is no control bit for the proposed SOF symbol.

FIG. 13B is a schematic diagram showing an example of an EOF symbol structure. In FIG. 13B, the value of EOF field can be EOF_EVEN or EOF_ODD, and there is no control bit for the proposed EOF symbol.

FIG. 13C is a schematic diagram showing an example of a COF symbol structure. (1) A new field 'Block_Length' is introduced. (2) The value of 'Block_Length' field indicates the number of data bytes following the COF symbol immediately, which has the same function as the 'Block_Length' field on SOF symbol. (3) There is no control bit for the proposed COF symbol.

FIG. 13D is a schematic diagram showing an example of a data bytes structure, wherein DL data bytes are denoted by DL_SDU-Byte 0, DL_SDU-Byte 1, . . . , DL_SDU-Byte N−1. (1) There is no control bit associated with the DL data bytes. (2) The number of data bytes within the data item led by SOF or COF symbols depends on the value of associated with the field 'Block_Length', which can be an odd number or even number, but will not be 0. For example, the value of the 'Block_Length' field is restricted by the following three factors: a) the number of bytes of the data frame still waiting to be transmitted; b) the value programmed into the DL_TC0_G6_MaxDLBlockDataLength and DL_TC1_G6_MaxDLBlockLength for Traffic Class 0 data frame and Traffic Class 1 data frame respectively; and c) the available space of the data field on the associated ALE block. The final value setting to the 'Block_Length' field will be the smaller one met the above restrictions.

FIG. 14 is a schematic diagram showing an example of a data frame structure. FIG. 14 demonstrates the structure of a complete data frame, which can be regarded as a combination of the examples of FIGS. 13A, 13B, and 13D.

FIG. 15 is a schematic diagram showing an example of a data frame structure, including a COF Symbol with N+M Bytes in length. FIG. 15 demonstrates the usage of COF symbol for a single data frame without the preemption by control frames (such as AFC frame, NAC frame, or high priority data frame).

FIG. 16 is a schematic diagram showing an example of a data frame structure, with N+M Bytes in length which is separated by the AFC frame and is continued by the COF Symbol. FIG. 16 demonstrates that a data frame is preempted by an AFC frame and the AFC frame is inserted at the boundary of data item which follows the SOF symbol. After AFC frame insertion is done, the data frame is continued by the COF symbol.

In some embodiments, the proposed data frame structure does not have the CRC checksum field on the EOF symbol.

The integrity of the data frame relays on the protection of the CRC field and ECC field of the associated ALE block.

The modifications on PA layer frames are exemplified in the following.

In some embodiments, the ALE block structuring is applied on a higher speed mode (e.g., high speed gear 6 (HS-G6) mode) only, and the PACP frames related to Link Startup sequence are applied on HS-G1 only. So the PACP frames related to Link Startup Sequence will not be revised. These Link Startup sequence related PACP frames are: TRG_UPR0, TRG_UPR1, TRG_UPR2, PACP_CAP_ind, PACP_CAP_EXT1_ind, PACP_CAP_EXT2_ind.

Besides, the PACP frames related to PHY test mode are not modified at this moment. The reasons are as follows. The PHY test mode entry frame (PACP_TEST_MODE_req) is applied on HS-G1 mode. The PACP test data frames defined on current UniPro specification are applied on HS-G1 to HS-G5 mode only. Optionally, the PACP test data frame for HS-G6 may be re-defined whenever appropriate, and the modifications on the PACP test frames will not be mentioned.

The PACP PHY test mode frames include: PACP_TEST_MODE_req, PACP_TEST_DATA_0, PACP_TEST_DATA_1, PACP_TEST_DATA_2, and PACP_TEST_DATA_3.

The following embodiments describe the PACP frames for the interconnection protocol for the proposed ALE block structure. In the following, the PACP frames for the interconnection protocol are exemplified in FIGS. 17 to 23. A number of fields (such as ESC_PA, EscParam_PA, PACP_FunctionalID, DevID, Adapt, Flags, TxMode, TxLane, TxGear, RxMode, RxLane, RxGear, and PaPowrModeUserData, FC, Status, Cnf, T, MIBattribute, GenSelectorIndex, MIBvalue, ConfigResultCode, and so on) of the PACP frames shown in the Figures can be taken according to or derived from the UniPro specification (such as UniPro version 2.0), for examples, and some fields (such "Reserved" or "Rsvd") indicate reserved fields. In some examples, some of the fields are shown to be assigned specific parameters (such as ESC_PA=8b'1111_1110 and so on), which are for the sake of illustration. Certainly, the implementation of the present disclosure is not limited to the examples.

FIG. 17 is a schematic diagram showing an example of a PACP_PWR_req frame structure. In FIG. 7, there is no CRC field on the proposed PACP_PWR_req frame structure. There is no control bit on the proposed frame structure. The integrity of the content of this frame relies on the CRC field and ECC field of an associated ALE block.

FIG. 18 is a schematic diagram showing an example of a PACP_PWR_cnf frame structure. In FIG. 18, there is no CRC field on the proposed PACP_PWR_cnf frame structure. There is no control bit on the proposed frame structure. The integrity of the content of this frame relies on the CRC field and ECC field of an associated ALE block.

FIG. 19 is a schematic diagram showing an example of a PACP_SET_req frame structure. In FIG. 19, there is no CRC field on the proposed PACP_SET_req frame structure. There is no control bit on the proposed frame structure. The integrity of the content of this frame relies on the CRC field and ECC field of an associated ALE block.

FIG. 20 is a schematic diagram showing an example of a PACP_SET_cnf frame structure. In FIG. 20, there is no CRC field on the proposed PACP_SET_cnf frame structure. There is no control bit on the proposed frame structure. The integrity of the content of this frame relies on the CRC field and ECC field of an associated ALE block.

FIG. 21 is a schematic diagram showing an example of a PACP_GET_req frame structure. In FIG. 21, there is no CRC field on the proposed PACP_GET_req frame structure. There is no control bit on the proposed frame structure. The integrity of the content of this frame relies on the CRC field and ECC field of an associated ALE block.

FIG. 22 is a schematic diagram showing an example of a PACP_GET_cnf frame structure. In FIG. 22, there is no CRC field on the proposed PACP_GET_cnf frame structure. There is no control bit on the proposed frame structure. The integrity of the content of this frame relies on the CRC field and ECC field of associated ALE block.

FIG. 23 is a schematic diagram showing an example of a PACP_EPR_ind frame structure. In FIG. 23, there is no CRC field on the proposed PACP_EPR_ind frame structure. There is no control bit on the proposed frame structure. The integrity of the content of this frame relies on the CRC field and ECC field of associated ALE block.

The exemplary rules to deploy the DL layer frames into the ALE block are provided in the following.

In some embodiments, specific basic rules are followed when constructing the ALE block by using the DL layer frame components as follows:

The value of leading byte (byte 0) of the ALE block is ESC_DL. This implies the leading bytes of ALE data field can be AFCx frame, NAC frame, SOF symbol, COF symbol or EOF symbol.

The number of bytes in the data item following the SOF symbol or COF symbol will be exactly match the value indicated by the 'Block_Length' field on these two symbols.

The SOF symbol and its associated data bytes and the COF symbol and its associated data bytes can be considered as an atomic unit, which means that the data bytes follow the SOF symbol or COF symbol immediately and the atomic unit will not be separated by other control frames or data frames.

The insertion of AFC frames, NAC frame, SOF symbol and the associated data item, COF symbol and associated data item, and the EOF symbol into the ALE block will be atomic respectively, which means that if some parts of these frames or symbols is placed into the ALE block, the reset portions of these frames or symbols will be placed in the ALE block. If no enough space for the specific atomic unit to be placed on the current ALE block, the new ALE block will be constructed for conveying this atomic unit and the available space on the current ALE block will be filled with FLR symbols.

The arbitration location is the position in the data field of the ALE block to determine which DL layer atomic unit, following the previous one, will be placed into the ALE block structure. The arbitration location can be the very beginning of data field or after the end of the DL layer atomic unit. With the arbitration location, the maximum latency between the AFC frames transmission to answer the received data frame can be regulated.

Intentional gap space is allowed between the DL control frames and the specific symbols inside the ALE block. The gap space will be filled with FLR symbols.

If no DL layer frames or symbols are needed to be transmitted and the space of data field of the current ALE block is not exhausted, the FLR symbols will be inserted.

Only the data frame is allowed to be placed across the ALE block boundary, and the control frames are not.

The exemplary rules to deploy the PA layer frames into the ALE block are provided in the following embodiments.

In some embodiments, below are the basic rules to follow for placing the PACP frame into the ALE block:

The values of leading 4 bytes of the ALE block are ESC_PA (byte 0), EscParam_PA (byte 1), and PACP_FunctionID (byte 2 and byte 3).

One ALE block contains one PACP frame only.

The unoccupied space of the ALE block for a specific PACP frame will be covered by the FLR symbols.

In the following, the examples of various DL layer frames and PA layer frames in the ALE block are provided. ALE blocks with respect to DL layer frames and ALE blocks with respect to PA layer frames in the interconnection protocol are exemplified in FIGS. 24 to 40, where a number of field (such as ESC_DL, AFC, NAC, TC, CReq, Frame sequence number, Credit value, RReq and so on) of the frames shown in the Figures can be taken according to or derived from the UniPro specification (such as UniPro version 2.0) and can be associated with or as same as the corresponding fields shown in FIGS. 11 to 23. Certainly, the implementation of the present disclosure is not limited to the examples.

Examples for DL layer frame combinations inside the ALE block will be provided below.

Figure 24:
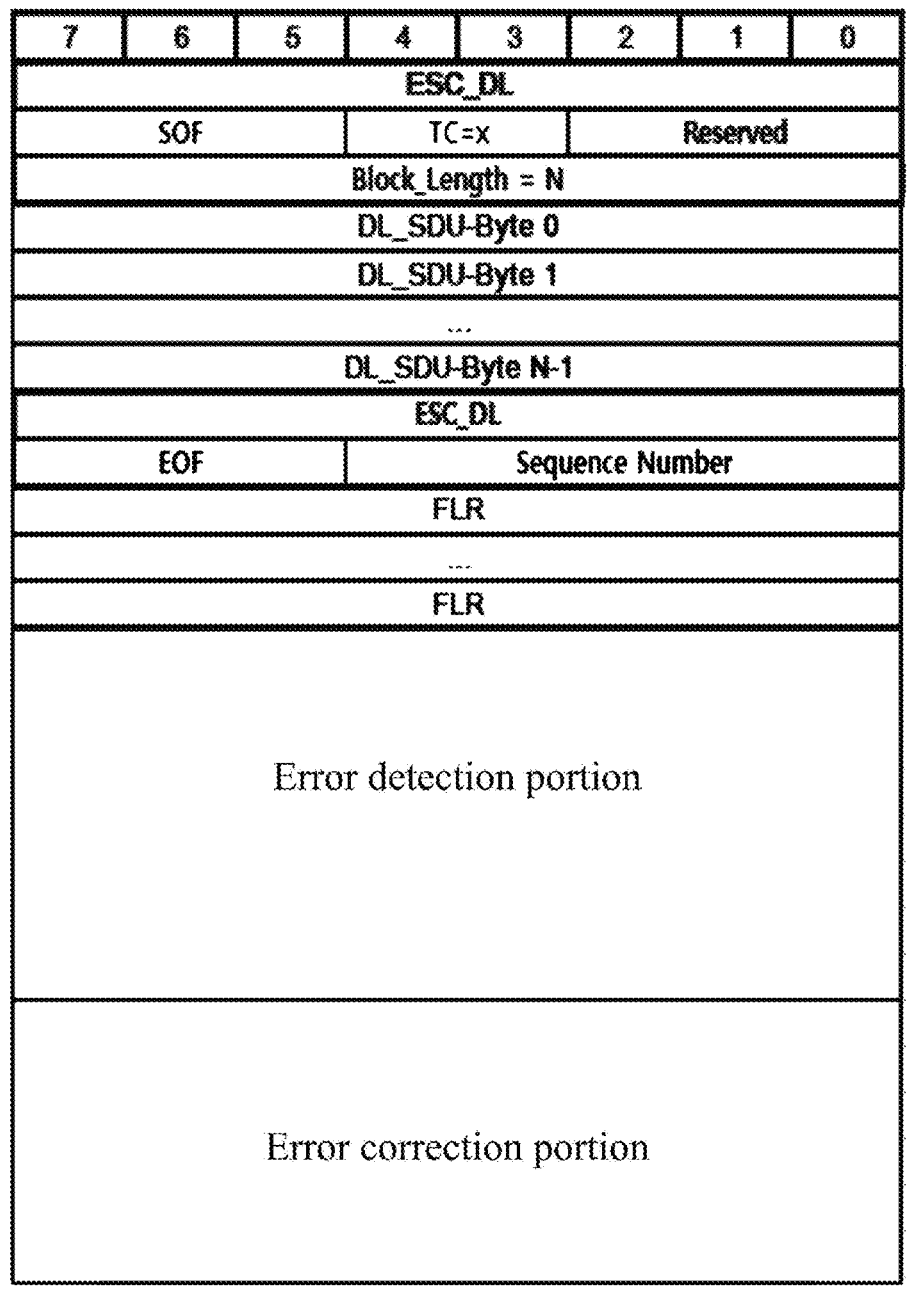
FIG. 24 is a schematic diagram showing an example of a data frame in an ALE block.

FIG. 24 is a schematic diagram showing an example of a data frame in an ALE block. FIG. 24 shows that a possible layout of a DL layer data frame can be fit into an ALE block. The SOF symbol leads the data field of the ALE block. The number of data bytes follows the SOF symbol is indicated by the value of 'Block_Length' field. The value of this field is N. The N-byte data information follows the SOF symbol. The EOF symbol follows the N byte data and the whole data frame is presented. The FLR symbols are used to cover the unoccupied space of data field of the ALE block. An error detection portion (e.g., 8-byte CRC field) of the ALE block follows. An error correction portion (e.g., 6-byte ECC field) of the ALE block follows and thus the whole ALE block is constructed.

Figure 25:
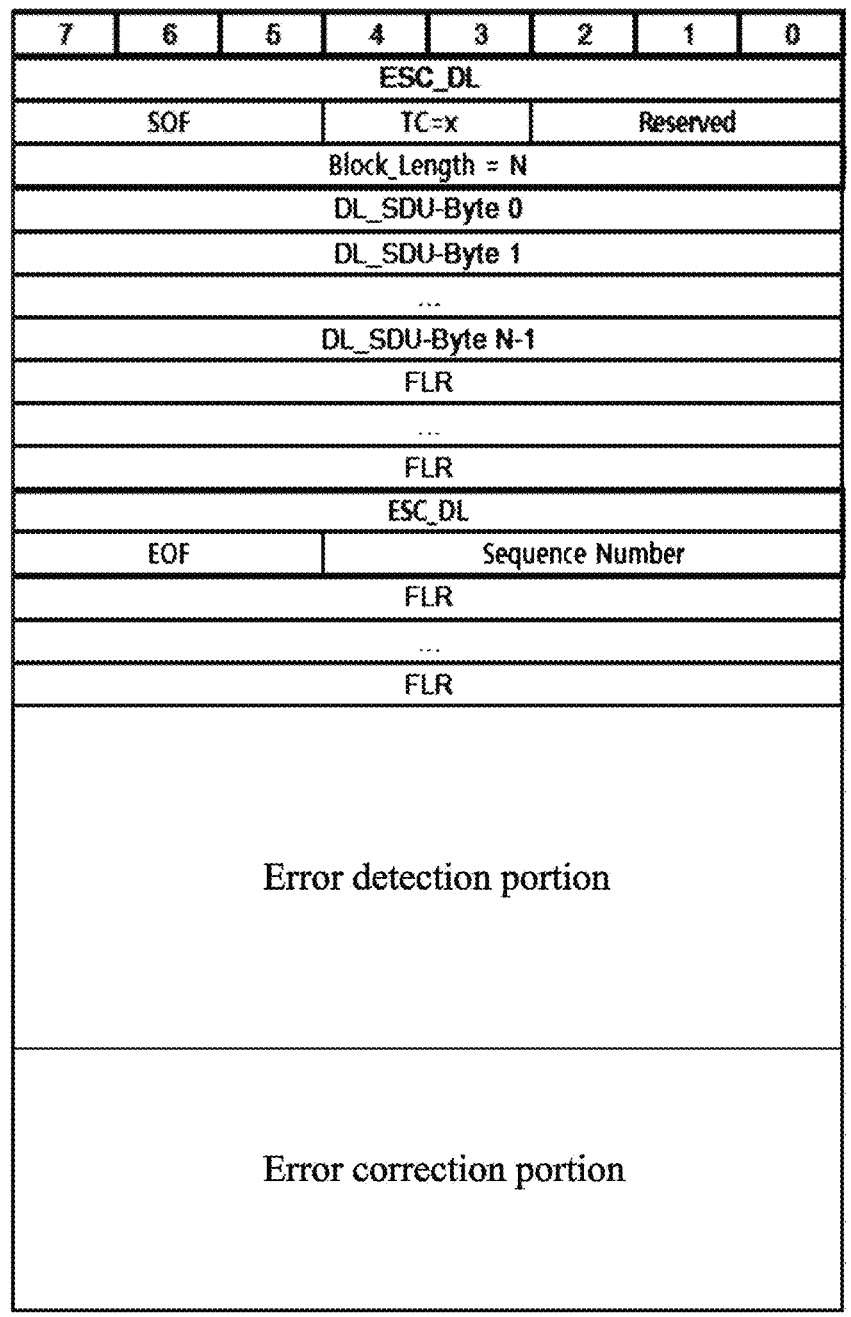
FIG. 25 is a schematic diagram showing another example of a data frame in an ALE block.

FIG. 25 is a schematic diagram showing another example of a data frame in an ALE block. FIG. 25 shows that another possible layout of a DL layer data frame can be fit into an ALE block. The SOF symbol leads the data field of the ALE block. The number of data bytes follows the SOF symbol is indicated by the 'Block_Length' field. The value of this field is N. The N-byte data item follows the SOF symbol. Some FLR symbols are allowed to be inserted between the data item and following EOF symbol. The EOF symbol follows the FLR symbols and the whole data frame is presented. The FLR symbols are used to cover the unoccupied space of data field of the ALE block. An error detection portion (e.g., 8-byte CRC field) of the ALE block follows. An error correction portion (e.g., 6-byte ECC field) of the ALE block follows and thus the whole ALE block is constructed.

Figure 26:
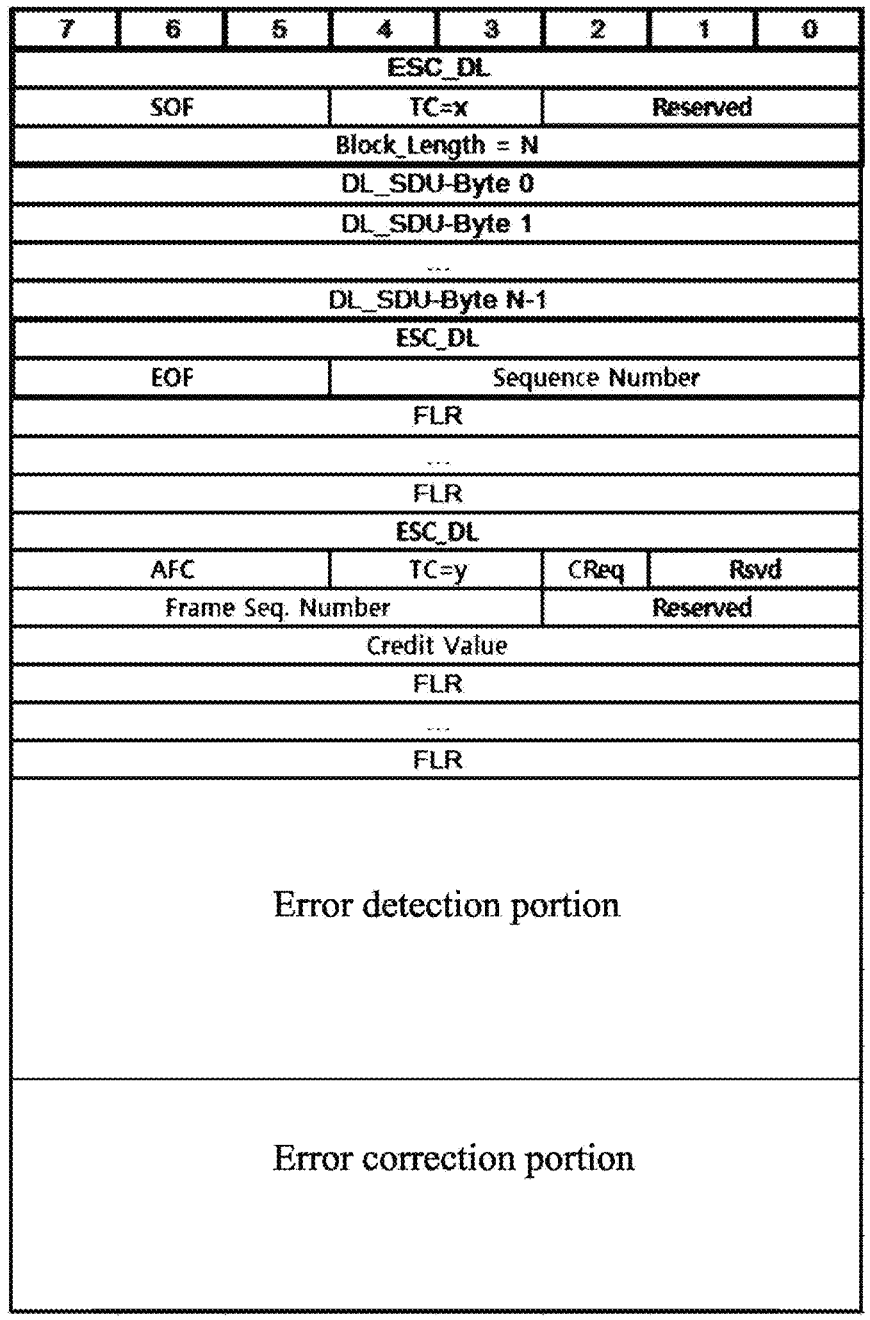
FIG. 26 is a schematic diagram showing an example of an AFC frame following a data frame in an ALE block.

FIG. 26 is a schematic diagram showing an example of an AFC frame following a data frame in an ALE block. The SOF symbol leads the data field of the ALE block. The value of 'Block_Length' field of the SOF symbol is N. N-byte data item follows the SOF symbol. The EOF symbol follows the N-byte data and the whole data frame is presented. Some FLR symbols are inserted. The AFC frame follows the FLR symbols above. The FLR symbols are used to cover the unoccupied space of data field of the ALE block. An error detection portion (e.g., 8-byte CRC field) of the ALE block follows. An error correction portion (e.g., 6-byte ECC field) of the ALE block follows and thus the whole ALE block is constructed.

Figure 27:
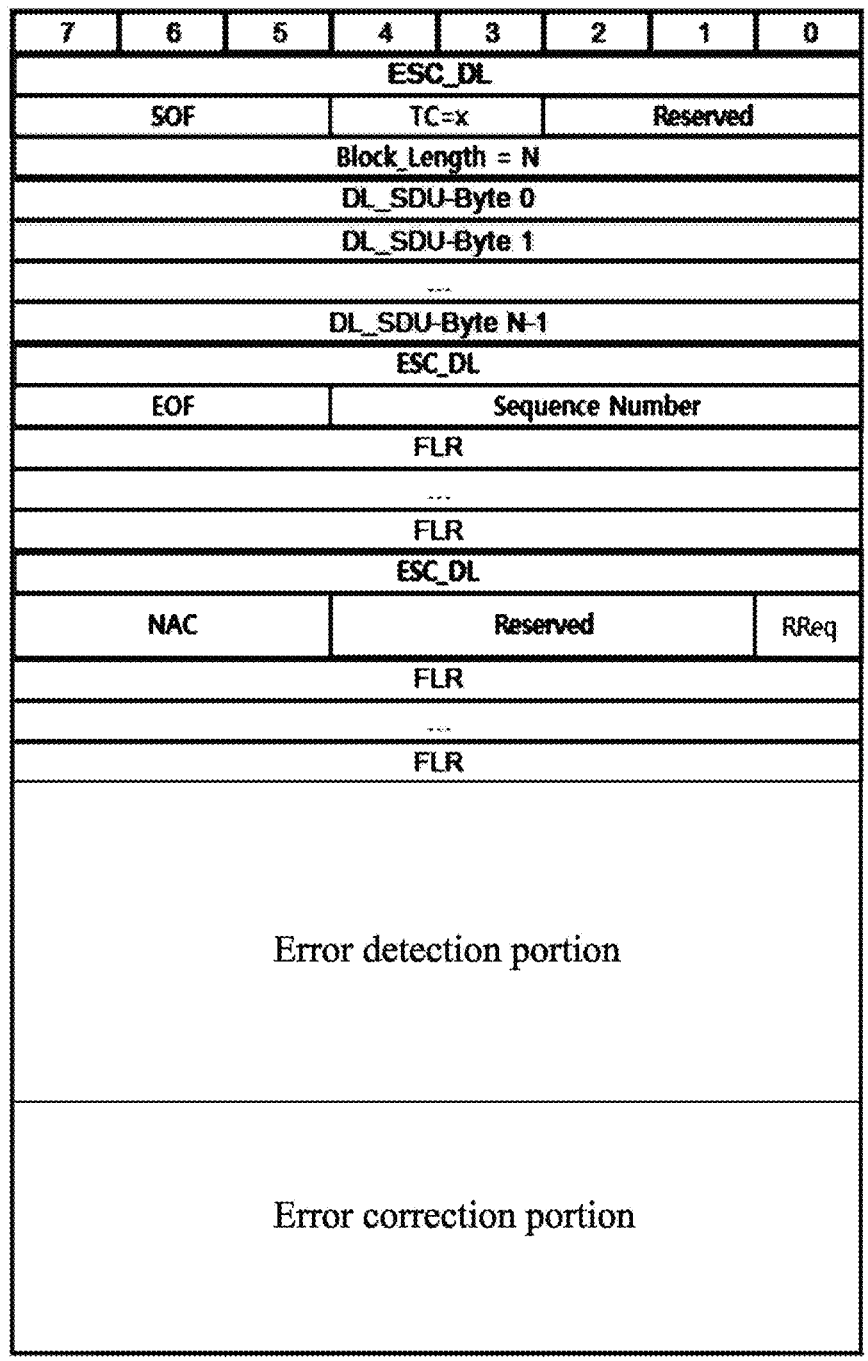
FIG. 27 is a schematic diagram showing an example of a NAC frame following a data frame in an ALE block.

FIG. 27 is a schematic diagram showing an example of a NAC frame following a data frame in an ALE block. The SOF symbol leads the data field of the ALE block. The value of 'Block_Length' field of the SOF symbol is N. N-byte data item follows the SOF symbol. The EOF symbol follows the N-byte data and the whole data frame is presented. Some FLR symbols are inserted. The NAC frame follows the FLR symbols above. The FLR symbols are used to cover the unoccupied space of data field of the ALE block. An error detection portion (e.g., 8-byte CRC field) of the ALE block follows. An error correction portion (e.g., 6-byte ECC field) of the ALE block follows and thus the whole ALE block is constructed.

Figure 28:
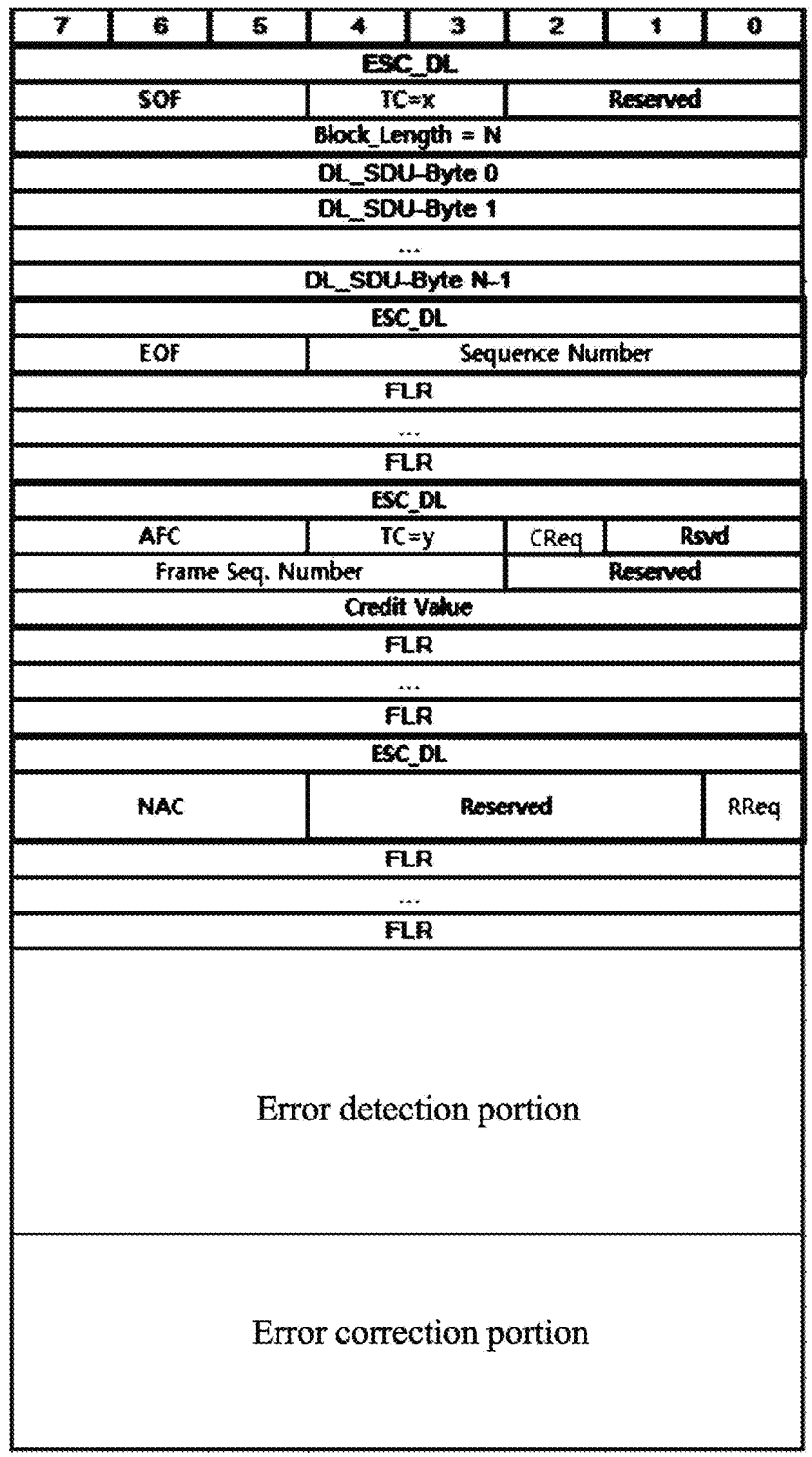
FIG. 28 is a schematic diagram showing an example of an AFC frame and a NAC frame following a data frame in an ALE block.

FIG. 28 is a schematic diagram showing an example of an AFC frame and a NAC frame following a data frame in an ALE block. FIG. 28 demonstrates an AFC frame and an NAC frame that follow the data frame within an ALE block. The SOF symbol leads the data field of the ALE block. The value of 'Block_Length' field of the SOF symbol is N. N-byte data item follows the SOF symbol. The EOF symbol follows the N-byte data and the whole data frame is presented. Some FLR symbols are inserted. The AFC frame is inserted. Some FLR symbols are inserted. The NAC frame is inserted. Some FLR symbols are inserted until the end of the data field of the ALE block. An error detection portion (e.g., 8-byte CRC field) of the ALE block is padded. An error correction portion (e.g., 6-byte ECC field) of the ALE block is padded. The ALE block construction is done.

Figure 29:
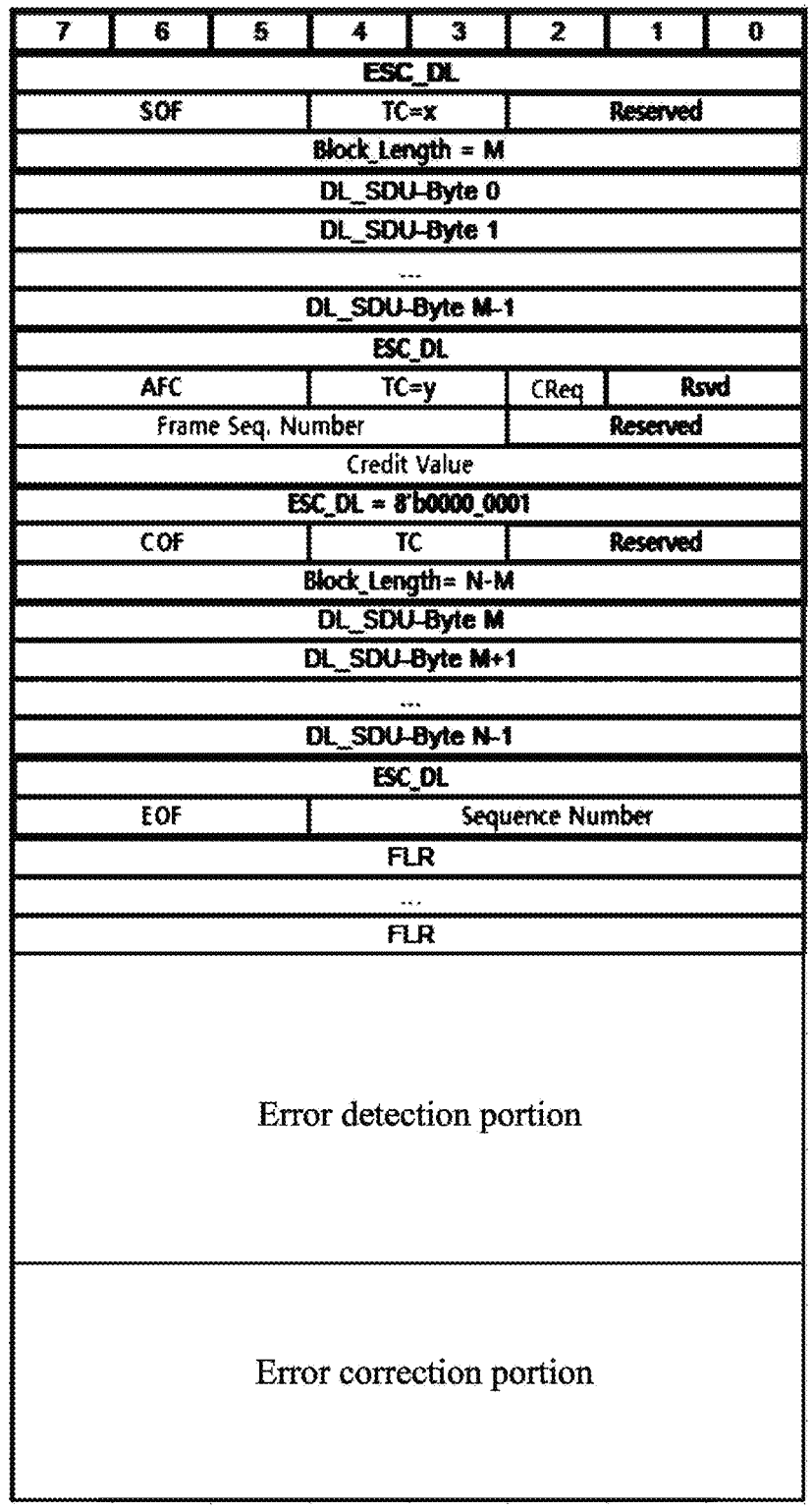
FIG. 29 is a schematic diagram showing an example of an AFC frame preempting a data frame in an ALE block.

FIG. 29 is a schematic diagram showing an example of an AFC frame preempting a data frame in an ALE block. FIG. 29 demonstrates an AFC frame that preempts the data frame with N data bytes within an ALE block. The SOF symbol leads the data field of the ALE block. The value of 'Block_Length' field of the SOF symbol is M (M<N). M bytes data item follows the SOF symbol. The AFC frame preempts the data frame. The COF symbol with a value of (N-M) in the 'Block_Length' field follows the AFC frame. (N-M) bytes data follows the COF symbol. The EOF symbol follows the above (N-M) bytes indicates the end of the data frame. Some FLR symbols are inserted. An error detection portion (e.g., 8-byte CRC field) of the ALE block is padded. An error correction portion (e.g., 6-byte ECC field) of the ALE block is padded. The ALE block construction is done.

Figure 30:
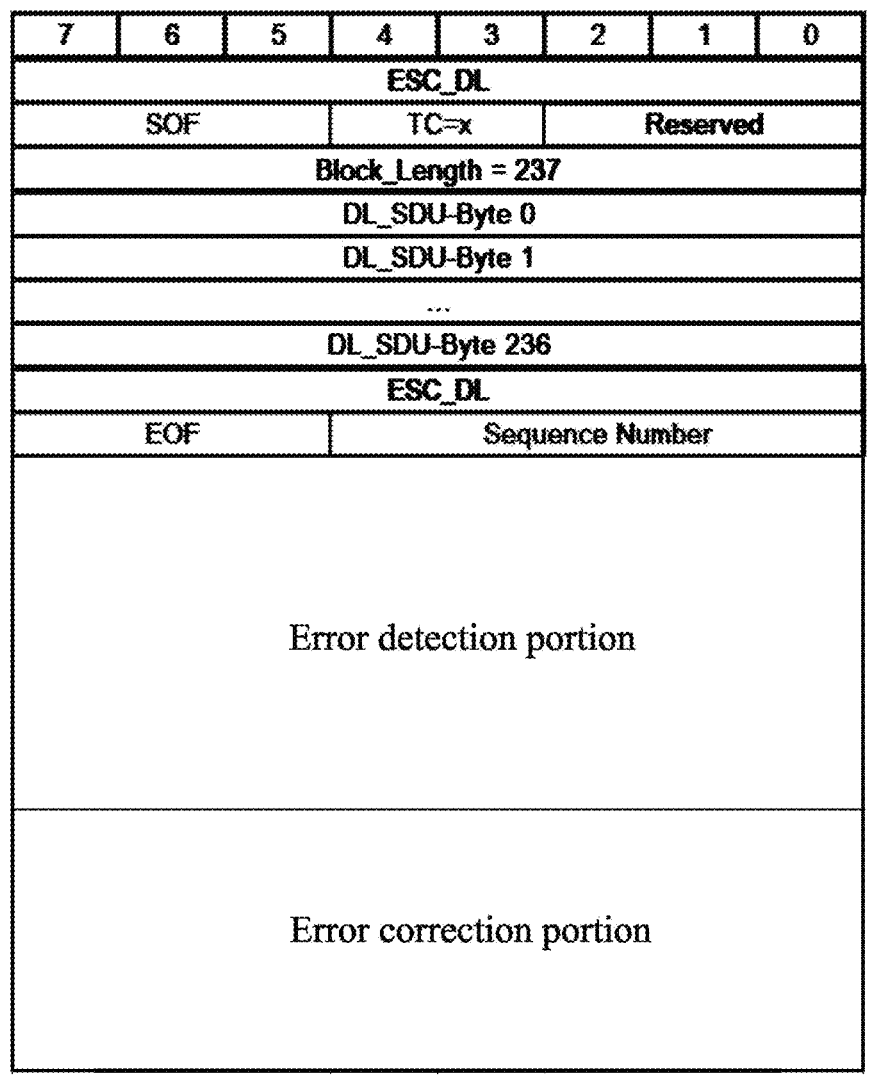
FIG. 30 is a schematic diagram showing an example of a data frame with 237 data bytes in an ALE block.

FIG. 30 is a schematic diagram showing an example of a data frame with 237 data bytes in an ALE block. The SOF symbol leads the data field of the ALE block. The value of 'Block_Length' field of the SOF symbol is 237. 237 bytes data item follow the SOF symbol, and the EOF symbol follows the data item. All data field space is occupied. An error detection portion (e.g., 8-byte CRC field) of the ALE block is padded. An error correction portion (e.g., 6-byte ECC field) of the ALE block is padded. The ALE block construction is done.

Figure 31A:
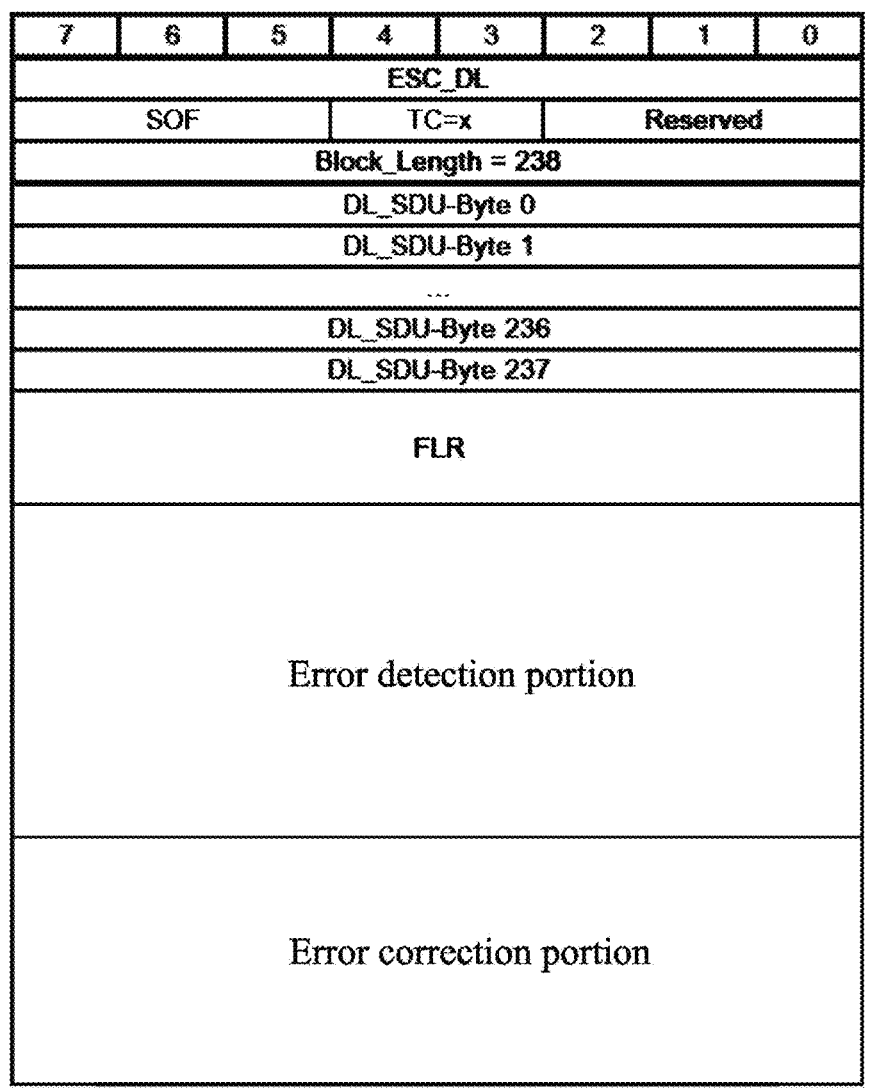
FIG. 31A is a schematic diagram showing an example of a data frame with 238 data bytes in an ALE block.
Figure 31B:
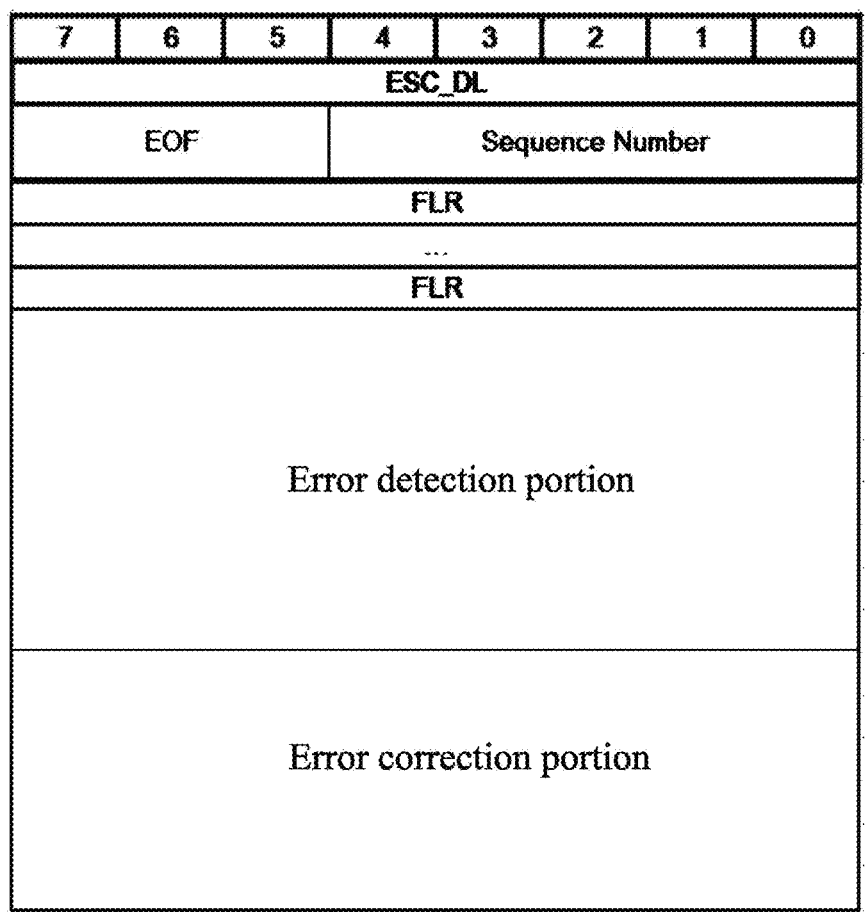
FIG. 31B is a schematic diagram showing the example of a data frame with 238 data bytes in an ALE block.

FIGS. 31A and 31B are schematic diagrams showing an example of a data frame with 238 data bytes in an ALE block. The SOF symbol leads the data field of the ALE block. The value of 'Block_Length' field of the SOF symbol is 238. 238 bytes data item follows the SOF symbol, and thus one byte space of the data field of the ALE block is spared. Since one byte space is not enough for the associated EOF symbol, the FLR symbol is inserted to the last available byte space of the data field. An error detection portion (e.g., 8-byte CRC field) of the ALE block is padded. An error correction portion (e.g., 6-byte ECC field) of the ALE block is padded. The very first ALE block construction is done. It further needs to pad the EOF symbol in another ALE block to complete the ALE block construction for the data frame. That is, the second ALE block construction is required. The EOF symbol leads the second ALE block. The FLR symbols are inserted to the rest of the data field of the second ALE block. An error detection portion (e.g., 8-byte CRC field) of the second ALE block is padded. An error correction portion (e.g., 6-byte ECC field) of the second ALE block is padded. The construction of the second ALE block is completed.

Figure 32A:
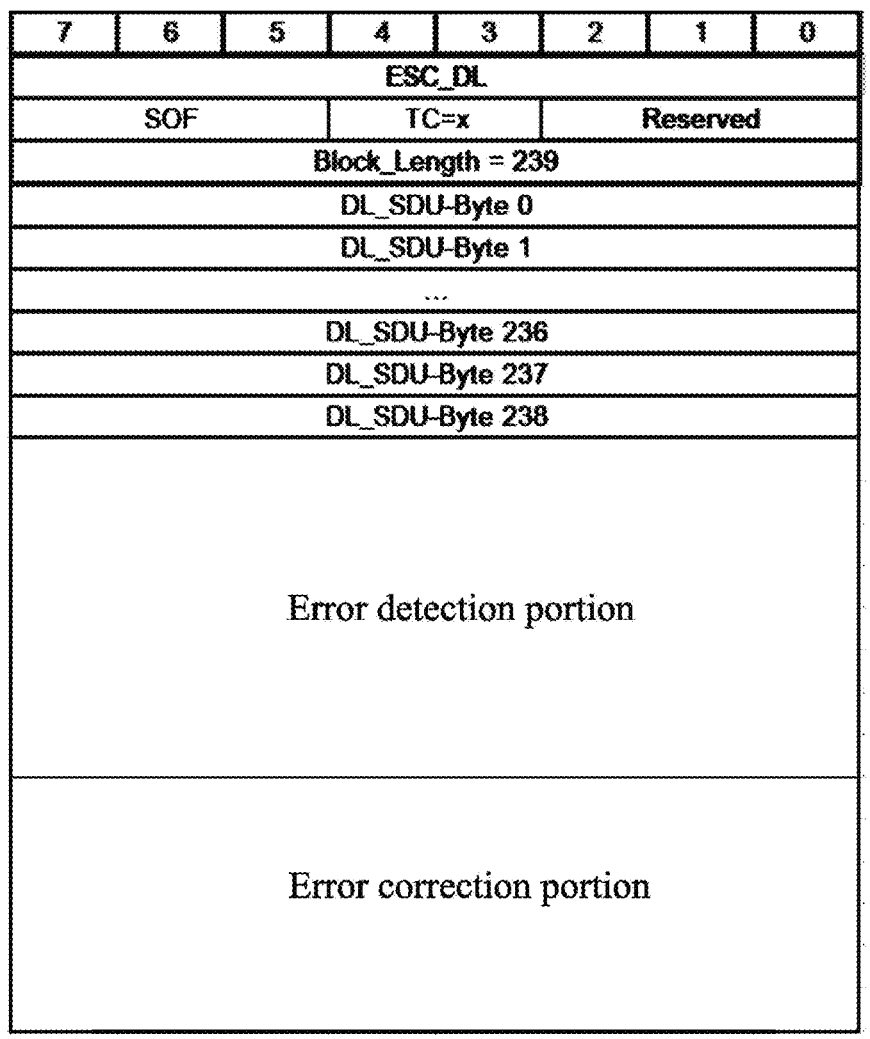
FIG. 32A is a schematic diagram showing an example of a data frame with 239 data bytes in an ALE block.
Figure 32B:
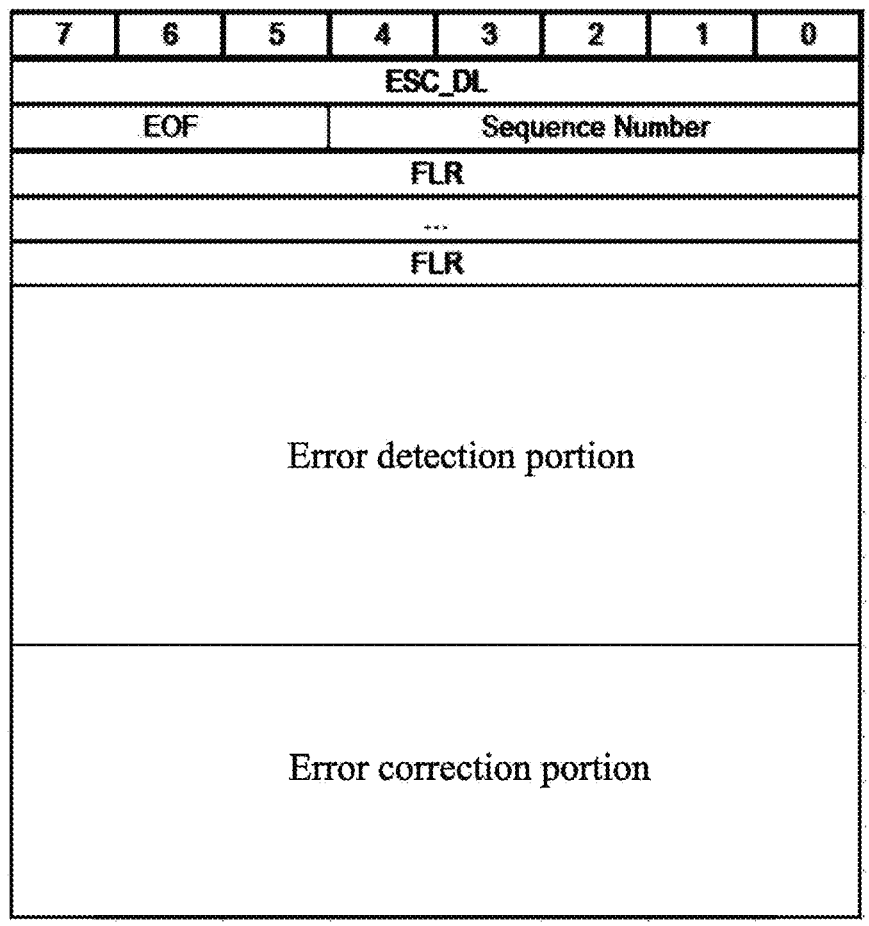
FIG. 32B is a schematic diagram showing the example of a data frame with 239 data bytes in an ALE block.

FIGS. 32A and 32B are schematic diagrams showing an example of a data frame with 239 data bytes in an ALE block. The SOF symbol leads the data field of the ALE block. The value of 'Block_Length' field of the SOF symbol is 239. 239 bytes data item follows the SOF symbol. The whole data field of the first ALE block is occupied by the data item of the data frame. An error detection portion (e.g., 8-byte CRC field) of the first ALE block is padded. An error correction portion (e.g., 6-byte ECC field) of the first ALE block is padded. The very first ALE block construction is done. It further needs to pad the EOF symbol in another ALE block to complete the ALE block construction for the data frame. That is, the second ALE block construction is required. The EOF symbol leads the second ALE block. The FLR symbols are inserted to the rest of data field of the second ALE block. An error detection portion (e.g., 8-byte CRC field) of the second ALE block is padded. An error correction portion (e.g., 6-byte ECC field) of the second ALE block is padded. The construction of the second ALE block is completed.

Figure 33A:
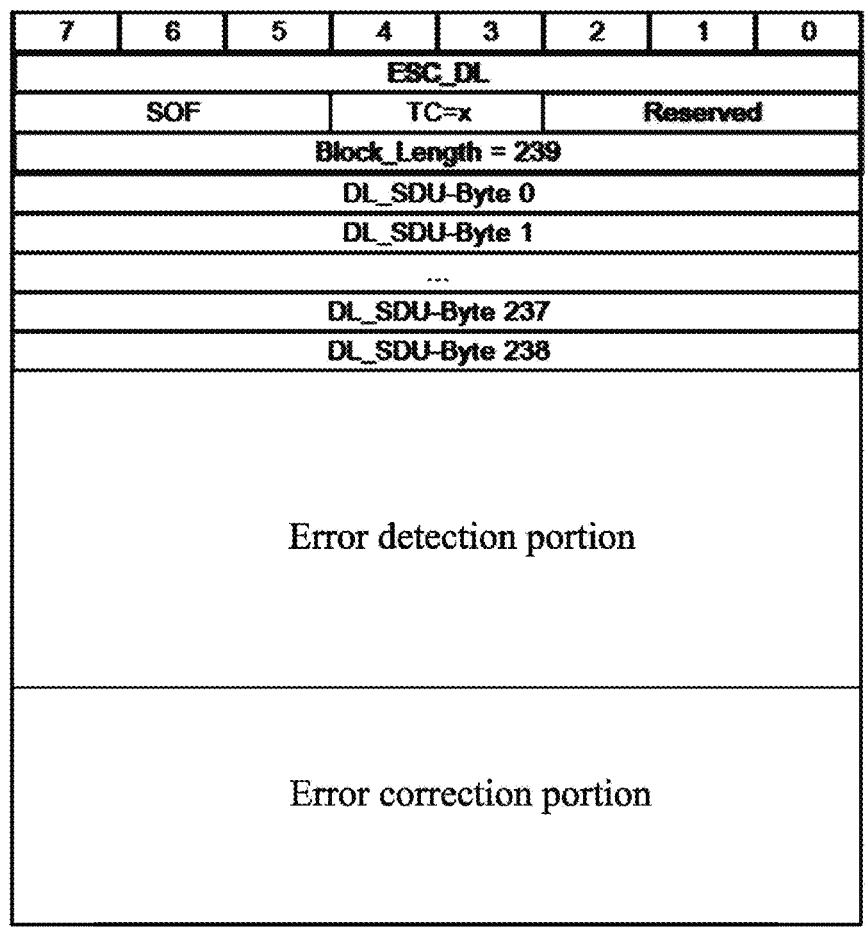
FIG. 33A is a schematic diagram showing an example of a data frame with N data bytes in an ALE block, where N>239.
Figure 33B:
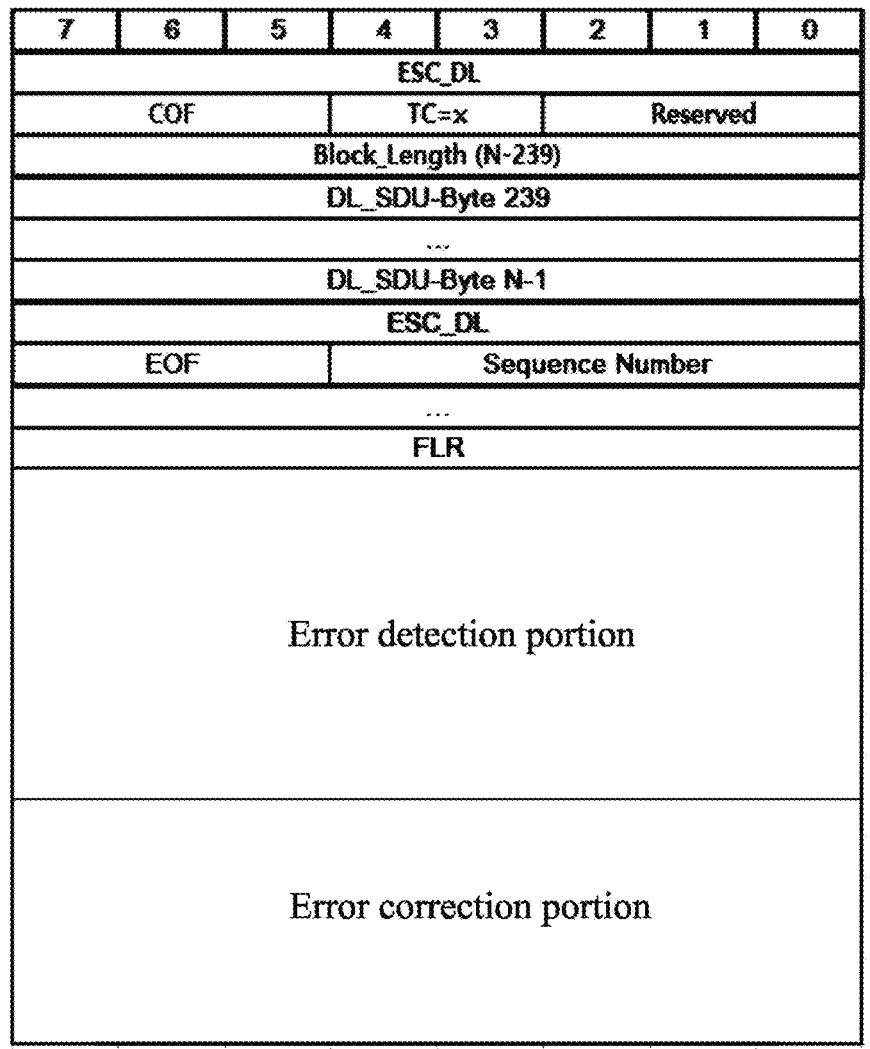
FIG. 33B is a schematic diagram showing the example of a data frame with N data bytes in an ALE block, where N>239.

FIGS. 33A and 33B are schematic diagrams showing an example of a data frame with more than 239 data bytes in an ALE block. It is assumed that the size of the data frame is N, where N>239 bytes. The SOF symbol leads the data field of the ALE block. The value of 'Block_Length' field of the SOF symbol is 239. 239 bytes data item follows the SOF symbol. The whole data field of the first ALE block is occupied by the data item of the data frame. An error detection portion (e.g., 8-byte CRC field) of the first ALE block is padded. An error correction portion (e.g., 6-byte ECC field) of the first ALE block is padded. The very first ALE block construction is done. There is still remaining data of the data frame to be transmitted. The second ALE block construction is required. The COF symbol with 'Block_Length' field value equal to (N−239) leads the second ALE block. The (N−239) bytes data item follows the COF symbol. It is assumed that the data frame does not exhaust the whole data field of the second ALE block. The EOF symbol is padded to indicate the completion of the data frame. Some FLR symbols are inserted to the rest of the data field of the second ALE block. An error detection portion (e.g., 8-byte CRC field) of the second ALE block is padded. An error correction portion (e.g., 6-byte ECC field) of the second ALE block is padded. The construction of the second ALE block is completed.

Figure 34A:
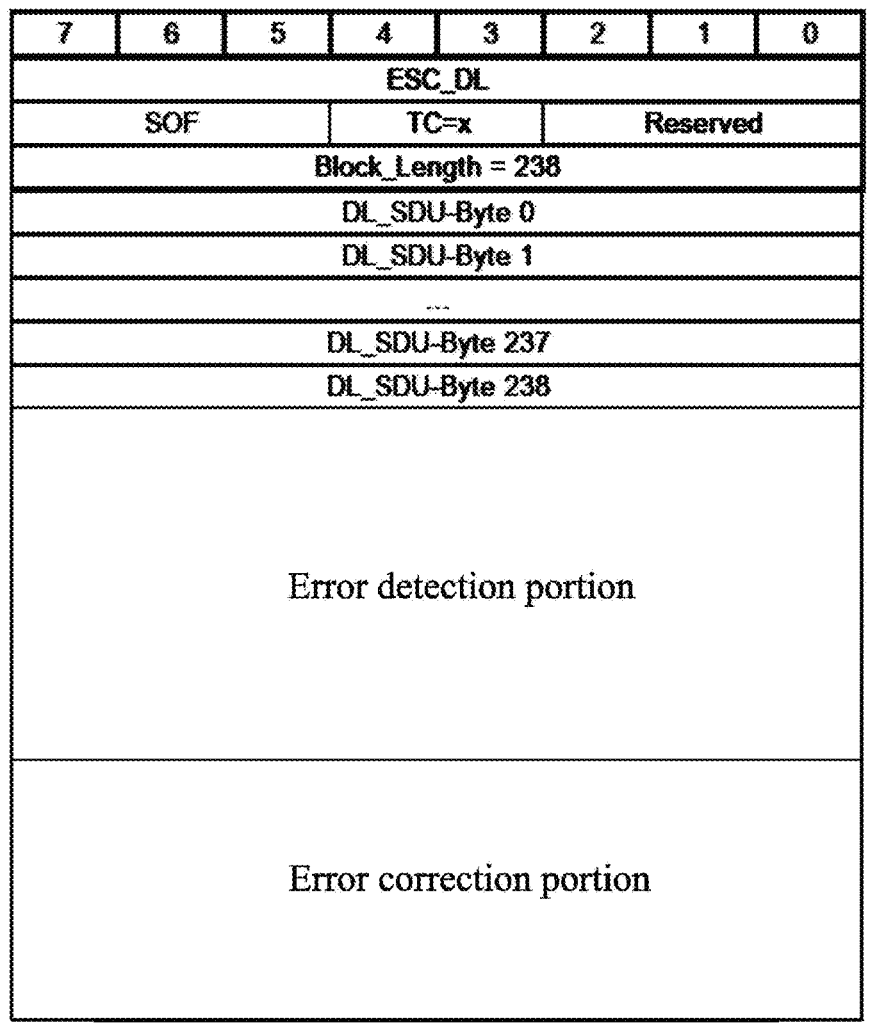
FIG. 34A is a schematic diagram showing an example of a data frame with more than 239 data bytes and being preempted by an AFC frame in an ALE block.
Figure 34B:
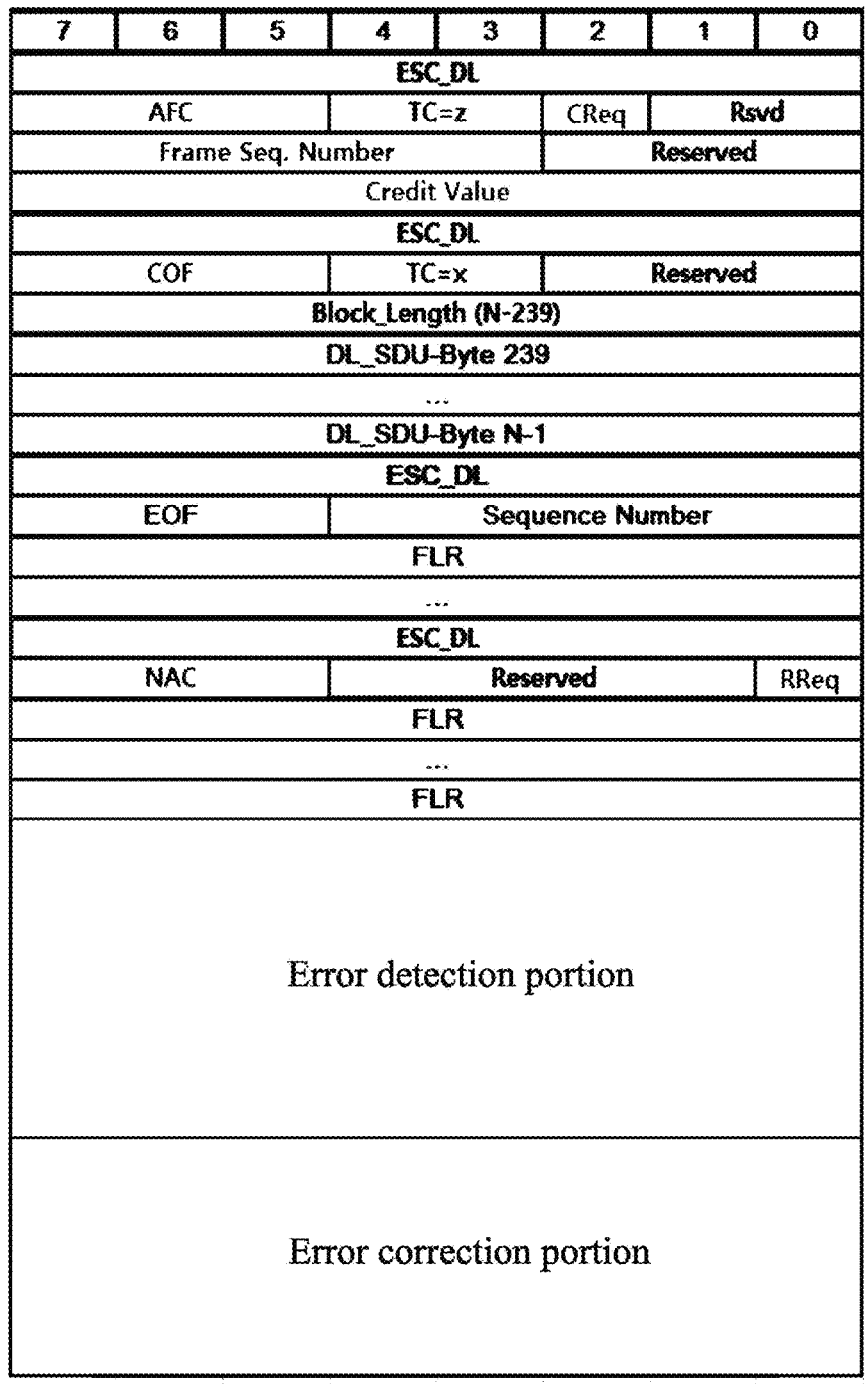
FIG. 34B is a schematic diagram showing the example of a data frame with more than 239 data bytes and being preempted by an AFC frame in an ALE block.

FIGS. 34A and 34B are schematic diagrams showing an example of a data frame with more than 239 data bytes and being preempted by an AFC frame in an ALE block. It is assumed that the size of the data frame is N, where N>239 bytes. The SOF symbol leads the data field of the ALE block. The number of 'Block_Length' field of the SOF symbol is 239. 239 bytes data item follows the SOF symbol. The whole data field of the first ALE block is occupied by the data item of a data frame. An error detection portion (e.g., 8-byte CRC field) of the first ALE block is padded. An error correction portion (e.g., 6-byte ECC field) of the first ALE block is padded. The very first ALE block construction is done. There is still remaining data of the data frame to be transmitted. The second ALE block construction is required. An AFC frame is determined to be transmitted. The preemption of the AFC frame occurs at the very beginning of the second ALE block. The AFC frame leads the second ALE block. The COF symbol with 'Block_Length' field value equal to (N−239) follows the AFC frame. The (N−239) bytes data item follows the COF symbol. Assumes the data frame does not exhaust the rest of the data field of the second ALE block. The EOF symbol is padded to indicate the completion of the data frame. Some FLR symbols are inserted to the rest of the data field of the second ALE block. An error detection portion (e.g., 8-byte CRC field) of the second ALE block is padded. An error correction portion (e.g., 6-byte ECC field) of the second ALE block is padded. The construction of the second ALE block is completed.

Figure 35:
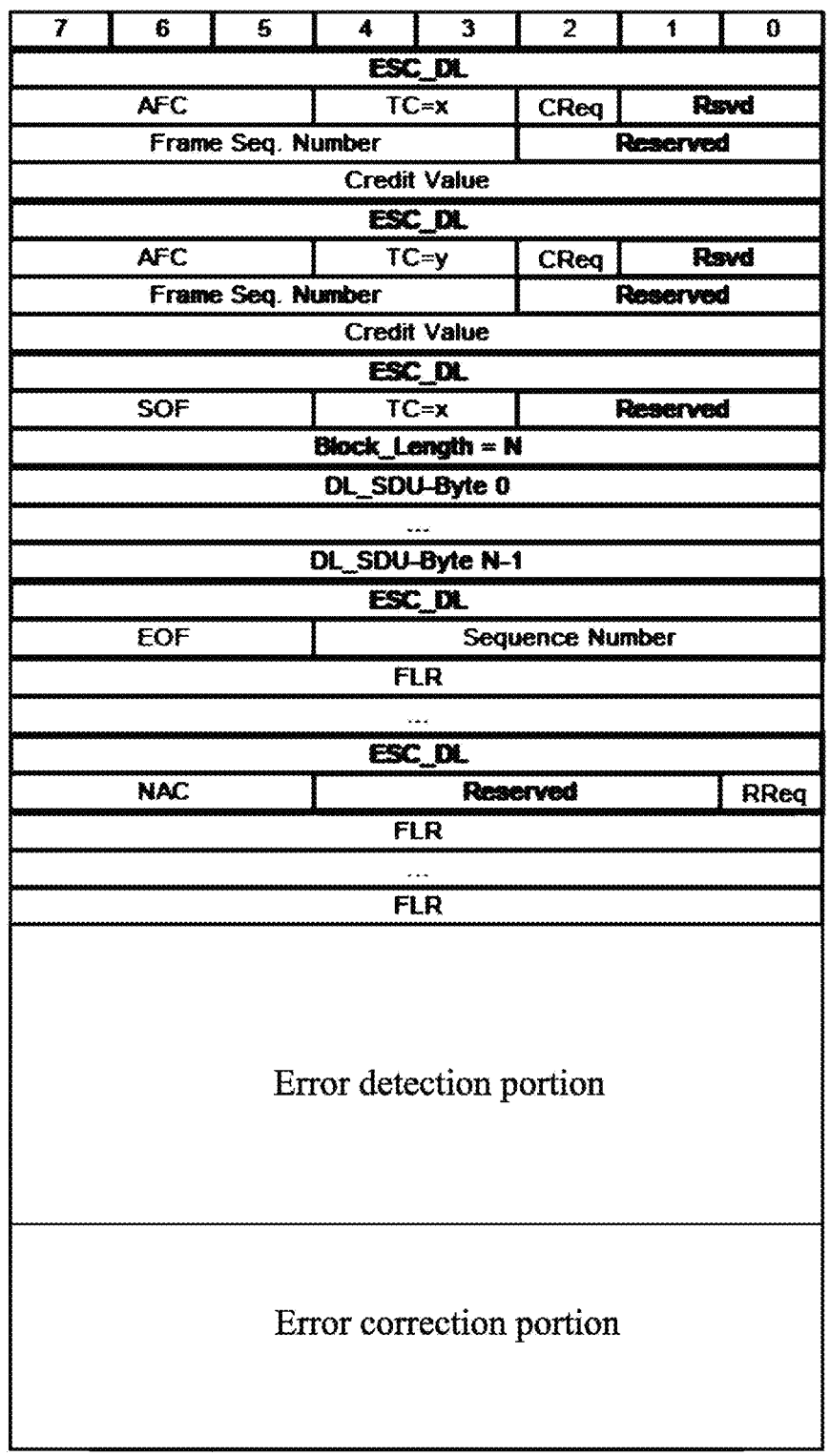
FIG. 35 is a schematic diagram showing an example of having multiple AFC frames, data frame and NAC frame in an ALE block.

FIG. 35 is a schematic diagram showing an example of having multiple AFC frames, data frame and NAC frame in an ALE block. The ALE block is led by AFC frame (TC=x). Another AFC frame (TC=y) follows the previous AFC frame. The SOF symbol with 'Data_Length' field value equal to N follows the second AFC frame and starts the data frame to be transmitted. The N bytes data item follows the SOF symbol. The EOF symbol follows the data item above to indicate the end of the data frame. Some FLR symbols are inserted when no valid DL layer frames are required to transmitted. A NAC frame is inserted as desired. Some FLR symbols are inserted until the end of data field of the ALE block if no valid DL layer frames required to be transmitted. An error detection portion (e.g., 8-byte CRC field) of the ALE block is padded. An error correction portion (e.g., 6-byte ECC field) of the ALE block is padded. The ALE block construction is completed.

Figure 36:
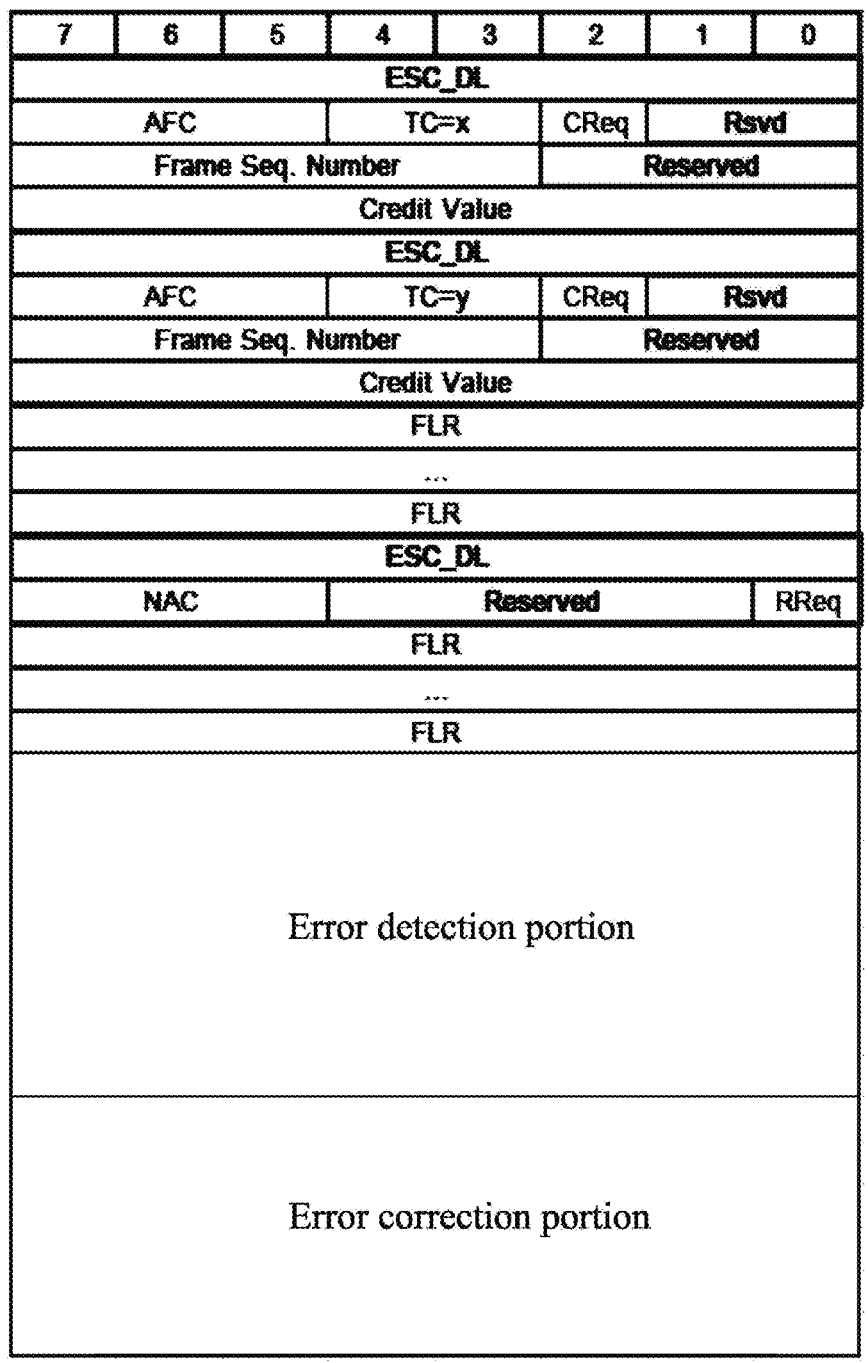
FIG. 36 is a schematic diagram showing an example of having multiple AFC frames, and a NAC frame in an ALE block.

FIG. 36 is a schematic diagram showing an example of having multiple AFC frames, and a NAC frame in an ALE block. In FIG. 36, multiple AFC frames and a NAC frame are within the ALE block, without data frame. The ALE block is led by AFC frame (TC=x). Another AFC frame (TC=y) follows the previous AFC frame. Some FLR symbols are inserted when no valid DL layer frames are required to transmitted. A NAC frame is inserted as desired. Some FLR symbols are inserted until the end of data field of the ALE block if no valid DL layer frames required to be transmitted. An error detection portion (e.g., 8-byte CRC field) of the ALE block is padded. An error correction portion (e.g., 6-byte ECC field) of the ALE block is padded. The ALE block construction is completed.

Figure 37:
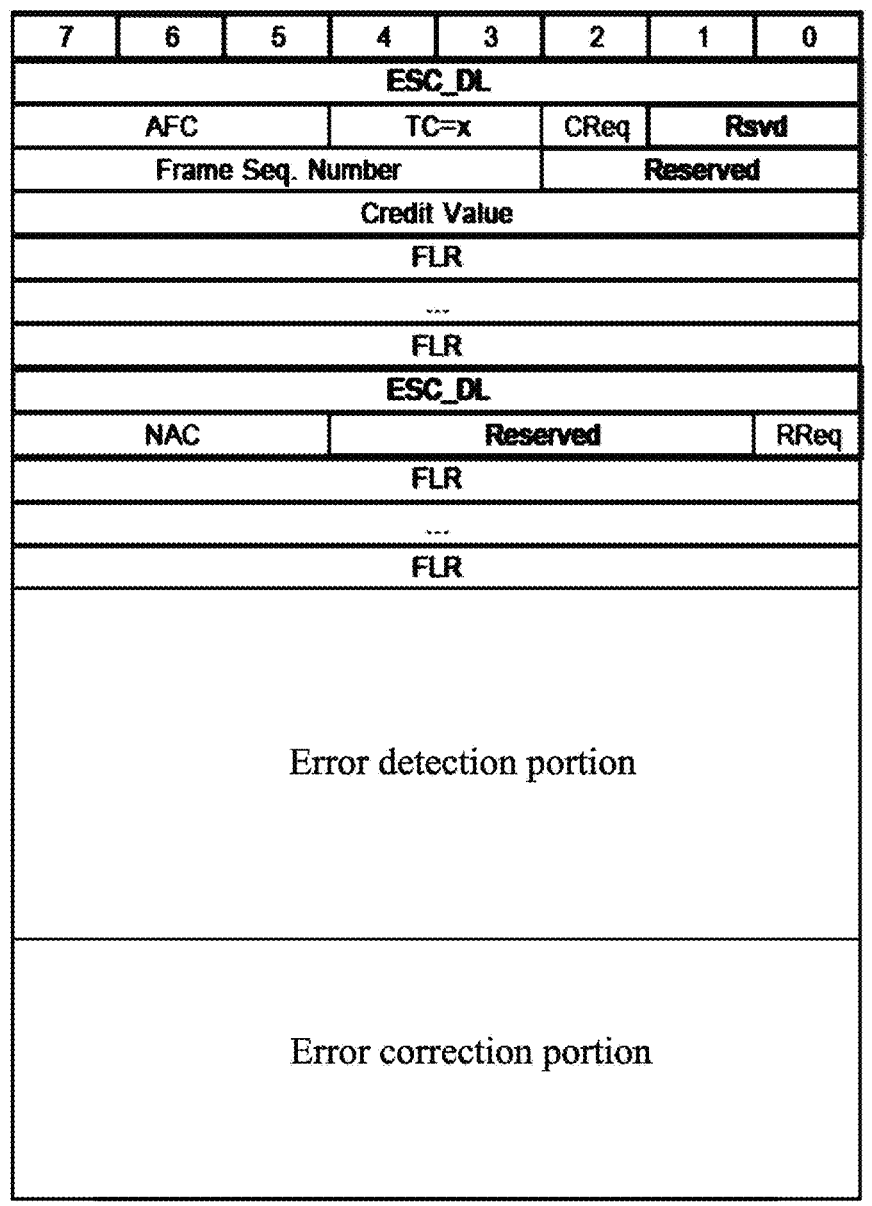
FIG. 37 is a schematic diagram showing an example of having AFC frame and a NAC frame in an ALE block.

FIG. 37 is a schematic diagram showing an example of having two AFC frames and a NAC frame in an ALE block. In FIG. 37, AFC frames and a NAC frame are within the ALE block, without data frame. The ALE block is led by AFC frame (TC=x). Some FLR symbols are inserted when no valid DL layer frames are required to transmitted. A NAC frame is inserted as desired. Some FLR symbols are inserted until the end of data field of the ALE block if no valid DL layer frames required to be transmitted. An error detection portion (e.g., 8-byte CRC field) of the ALE block is padded. An error correction portion (e.g., 6-byte ECC field) of the ALE block is padded. The ALE block construction is completed.

Figure 38:
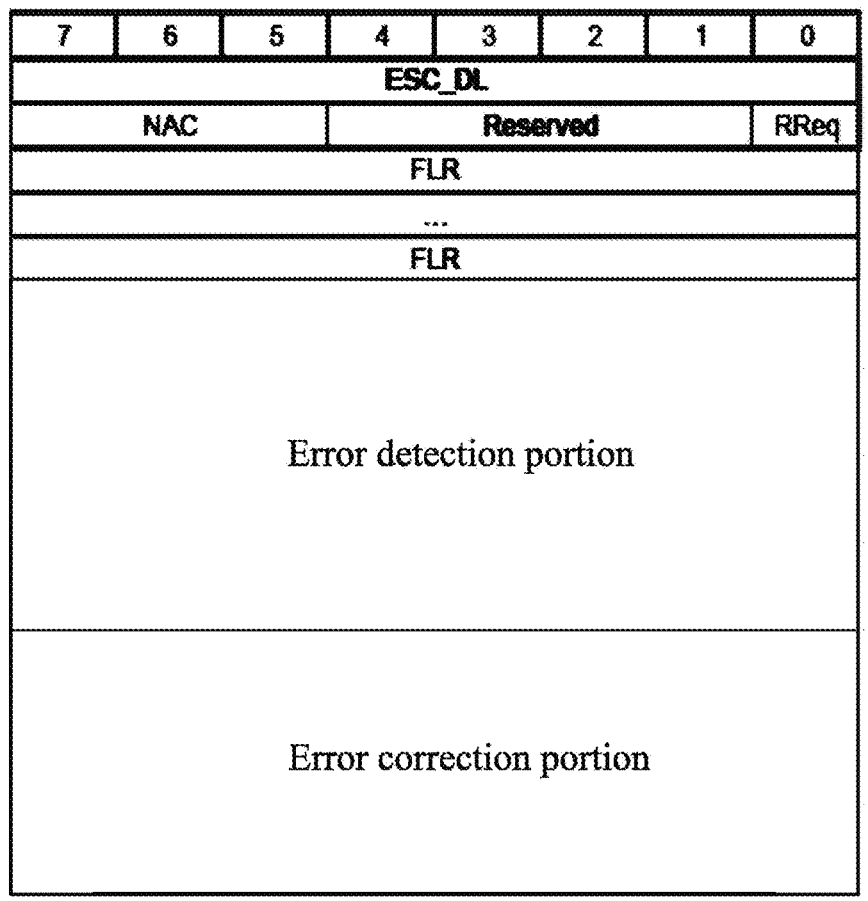
FIG. 38 is a schematic diagram showing an example of a NAC frame in an ALE block.

FIG. 38 is a schematic diagram showing an example of a NAC frame in an ALE block. In FIG. 38, an ALE block contains a NAC frame only. The NAC frame leads the ALE block. Some FLR symbols are inserted until the end of data field of the ALE block if no valid DL layer frames required to be transmitted. An error detection portion (e.g., 8-byte CRC field) of the ALE block is padded. An error correction portion (e.g., 6-byte ECC field) of the ALE block is padded. The ALE block construction is completed.

Examples for PACP Frame inside the ALE block are provided below.

Since the length of current defined PACP frames is less than 238 bytes, the whole PACP frame can be fit into a single ALE block. The reason is related to modifications on PA layer frames, as mentioned above, and the discussion here does not include the PACP_TEST_DATA* frames. The following embodiments show the generic layout of PACP frame inside the ALE block.

Figure 39:
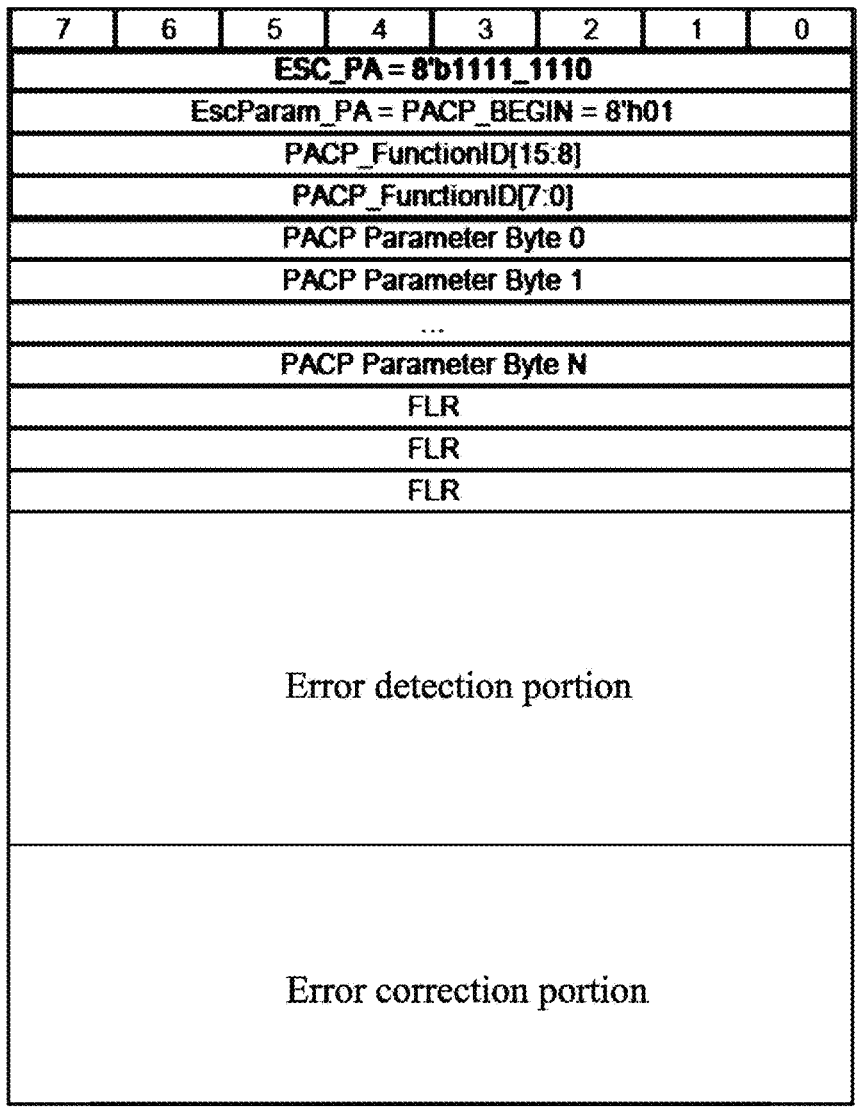
FIG. 39 is a schematic diagram showing an example of a PACP Frame in an ALE block.

FIG. 39 is a schematic diagram showing an example of a PACP Frame in an ALE block, which is the generic format for PACP Frame in the ALE block. In FIG. 39, the PACP frame is inside the ALE block. The data field of the ALE block is led by ESC_PA on byte 0, EscParam_PA on byte 1 and the PACP_FunctionID on byte 2 and byte 3. The PACP frame parameter bytes are for specific PACP frames. The unoccupied space of the data field is covered by FLR symbol. An error detection portion (e.g., 8-byte CRC field) of the ALE block follows. An error correction portion (e.g., 6-byte ECC field) of the ALE block follows.

Figure 40:
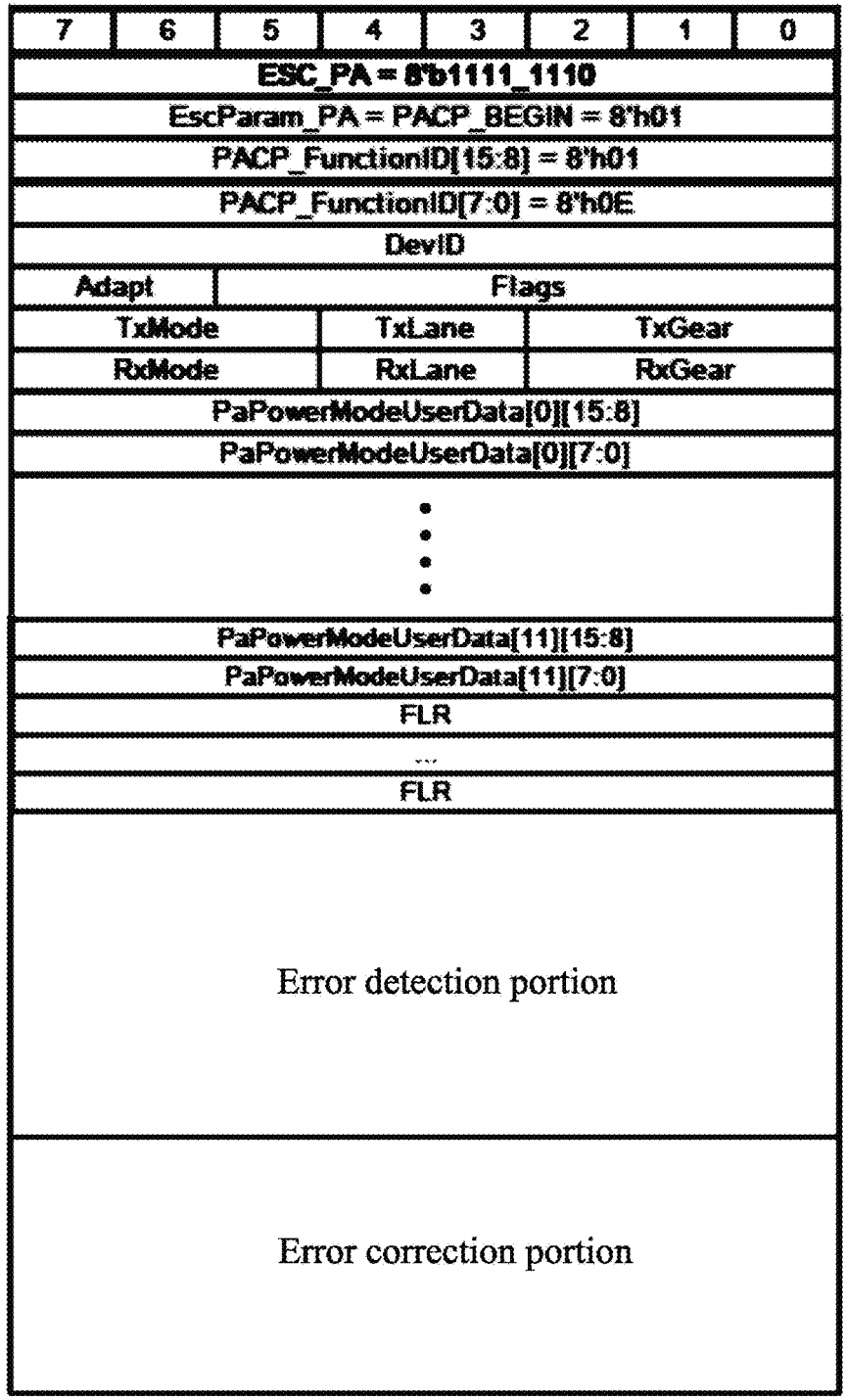
FIG. 40 is a schematic diagram showing an example of a PACP_PWR_req Frame in an ALE block.

FIG. 40 is a schematic diagram showing an example of a PACP_PWR_req Frame in an ALE block. The ESC_PA plus EscParam_PA leads the ALE block. The PACP_PWR_req frame content padded into the ALE block. Since the whole PACP_PWR_req frame occupied 32 bytes, the rest part of the data field of the ALE block is padded with FLR symbols. An error detection portion (e.g., 8-byte CRC field) of the ALE block is inserted. An error correction portion (e.g., 6-byte ECC field) of the ALE block is inserted. The whole ALE block construction is completed.

Effective data rate is discussed by using the proposed ALE block structure in the following.

The effective data rate will be calculated based on the following characteristics of an example of the ALE block structure. The ALE block length is 256 bytes. The CRC field of the ALE block is 8 bytes. The ECC field of the ALE block is 6 bytes. The data field is 256−6−8=242 bytes. The optimized effective data rate will be (242/256) *100%=94.531%.

Since the DL layer data frames transmission dominates the usage of transmission path, the analysis focuses on the cases of DL layer data frames transmission only to simplify the effective data rate measurement.

The following is the cost to transmit the data frame:
(1) The SOF symbol, which is a constant cost for every data frame;
(2) The possible COF symbols to be inserted when transmitting the specific data frame, wherein the factors which affects the insertion of COF symbol are: (a) the length of payload of the data frame which can be defined by DL_SDU number; and (b) the number defined on the 'Block_Length' field of the SOF symbol and COF symbol, wherein the value of this field can be regulated by the number setting on DL_TC0MaxBlockLength or DL_TC1MaxBlockLength respectively;
(3) The EOF symbol, which is a constant cost for every data frame; and
(4) The CRC field and ECC field of the number of ALE blocks to transmit the whole data frame.

The basic formula to calculate the cost for transmitting a data frame is:

One $SOF$ symbol +

The number of $COF$ symbols required + One $EOF$ symbol +

The required $ALE$ blocks * (the $CRC$ field and the $ECC$ field).

For example, when the value of DL_TC0MaxBlockLength is 64 and a TC0 data frame with 288 bytes payload:
(1) It needs 2 ALE blocks to transmit the whole TC0 data frame, wherein (a) the CRC field is 8 bytes for each ALE block; and (b) the ECC field is 6 bytes for each ALE block; and (c) then each ALE block has the constant cost 14 bytes;
(2) The first ALE block contains: (a) one SOF symbol (the SOF symbol is 3 bytes in length); (b) 3 COF symbols (the COF symbol is 3 bytes in length); and (c) 230 data bytes of TC0 frame; and
(3) The second ALE block contains: (a) one COF symbol; (b) one EOF symbol (the EOF symbol is 2 bytes in length); and (c) 58 data bytes of TC0 frame.

Following the above, the total cost to transmit this: (the number of SOF symbol and COF symbols)+(the number of EOF symbol)+(the number of CRC field and ECC field for required ALE block)=5*3+2+2*14=45 bytes. The effective data rate is:

$$\%100 * (288/(288 + 45)) = 86.486\%.$$

The following TABLE 1 demonstrates the summary of effective data rate based on the factors listed above, wherein DL_SDU is the length of the specific data frame.

TABLE 1

|  | DL_SDU = 288 | DL_SDU = 1160 |
| --- | --- | --- |
| DL_TCxMaxBlockLength = 1 | 23.376% | 23.387% |
| DL_TCxMaxBlockLength = 32 | 82.758% | 85.482% |
| DL_TCxMaxBlockLength = 64 | 84.486% | 88.617% |
| DL_TCxMaxBlockLength = 128 | 88.073% | 91.917% |
| DL_TCxMaxBlockLength = 239 | 88.888% | 93.023% |

According to the above TABLE 1, the larger the value of 'Block_Length' field for transmitted data frame, it seems to be more code rate effective. It is noted that the large value of 'Block_Length' will cause the longer time gap for transmitting the necessary DL layer control frames. This may cause the traffic stall and resource exhausting on the associated counterpart.

In some embodiments, the following components are used. In these embodiments, an ALE block structure has 256 bytes, and the new DL layer MIBs (e.g., DL_TC0MaxBlockLength and DL_TC1MaxBlockLength) are used. The proposed DL layer control frames structure and the SOF symbol, COF symbol, EOF symbols' structure are fit in the ALE block. Besides the data frame, the DL layer control frames are with fixed format and length. The proposed PA layer PACP frames' structure can be inserted into an ALE block. A flexible way with better code efficiency can be provided for the 1b1b encoding combined with PAM4 signaling.

The following provides some embodiments for implementing the ALE block in an ALE block Transmission Path and an ALE block receiving path.

Figure 41:
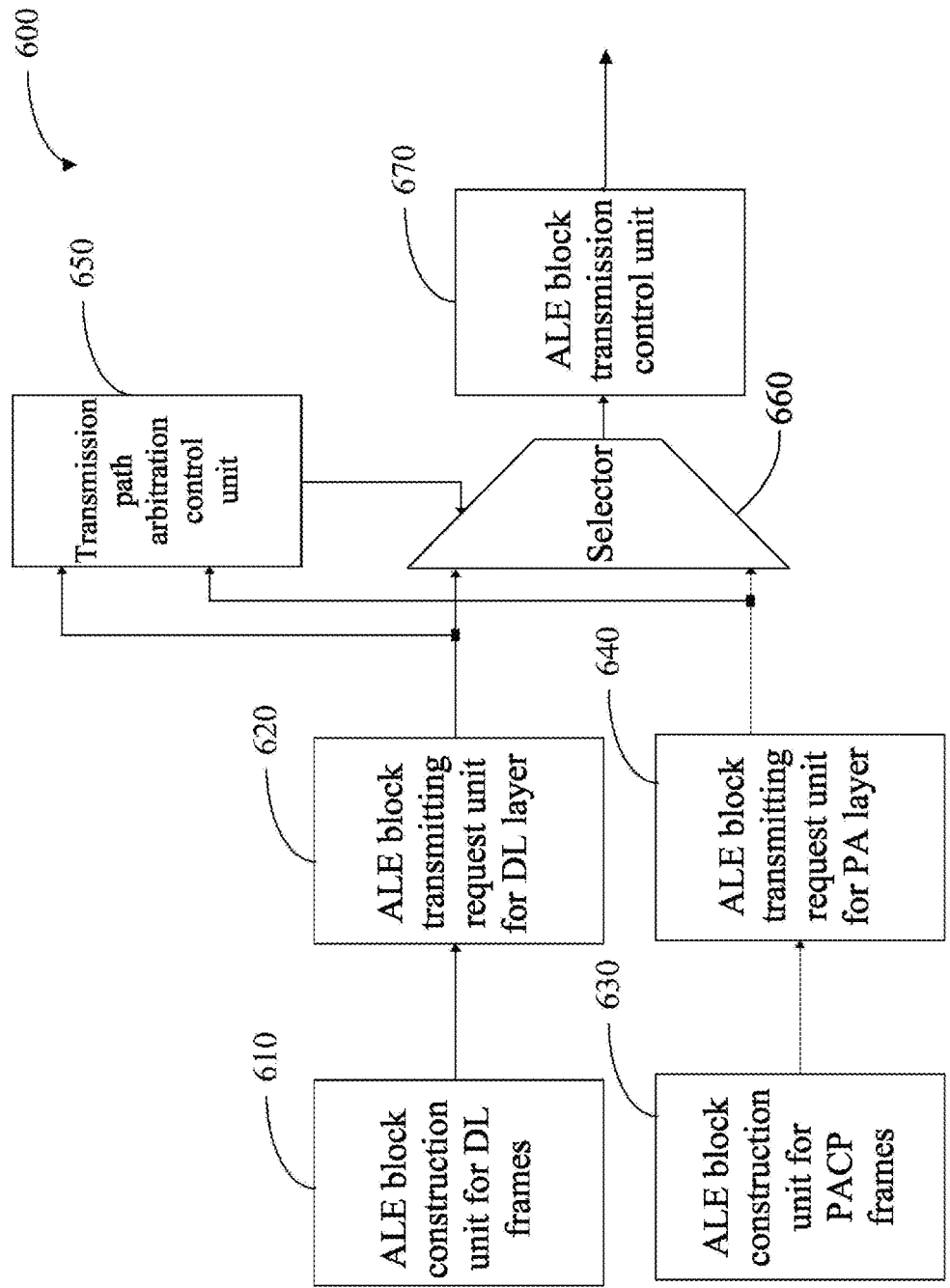
FIG. 41 is a schematic diagram showing an embodiment of a circuit architecture for an ALE block transmitting path.

FIG. 41 is a schematic diagram showing an embodiment of a circuit architecture for an ALE block transmitting path. In FIG. 41, an ALE block transmitting path 600 includes an ALE block construction unit for DL frames 610, ALE block transmitting request unit for DL layer 620, ALE block construction unit for PACP frames 630, ALE block transmitting request unit for PA layer 640, transmission path arbitration control unit 650, selector 660, and ALE block transmission control unit 670.

In FIG. 41, the ALE block construction unit for DL frames 610 and ALE block transmitting request unit for DL layer 620 manage the construction of ALE blocks for DL layer frames. The construction of ALE blocks for DL layer frames follows the method (or rules) illustrated on one or more embodiments or examples based on FIG. 5 to FIG. 9C, or so on. For example, the ALE block construction unit for DL frames 610 receives DL layer frames from the DL layer and generates ALE blocks based on the DL layer frames, for example, based on the method of FIG. 5 to FIG. 9C. After the ALE block construction is done, the ALE block transmitting request unit for DL layer 620 outputs a transmission request for the usage of transmission bus. For example, the ALE block transmitting request unit for DL layer 620, in response to an ALE block, outputs the transmission request to the transmission path arbitration control unit 650 to request for the usage of transmission bus. The ALE block transmitting request unit for DL layer 620 can also include a buffer to temporarily store the ALE block or passes the ALE block for transmission.

The ALE block construction unit for PACP frames 630 and ALE block transmitting request unit for PA layer 640 are responsible to construct the ALE block for PACP frames. The construction of ALE blocks for PA layer frames follows the method (or rules) illustrated on one or more embodiments or examples above. For example, the ALE block construction unit for PA frames 630 receives PA layer frames from the PA layer and generates ALE blocks based on the PA layer frames, for example, based on the method of FIG. 5 to FIG. 9C. After the ALE block construction is done, the ALE block transmitting request unit for PA layer 630 outputs a transmission request for the usage of transmission bus. For example, the ALE block transmitting request unit for PA layer 640, in response to an ALE block, outputs the transmission request to the transmission path arbitration control unit 650 to request for the usage of transmission bus. The ALE block transmitting request unit for PA layer 640 can also include a buffer to temporarily store the ALE block or passes the ALE block for transmission.

The transmission path arbitration control unit 650 is responsible to grant the transmitting request to DL layer frame or PA layer frame.

The selector 660 is coupled to output data of the ALE block transmitting request unit for PA layer 630 and the output data of the ALE block transmitting request unit for PA layer 640. In response to a signal from the transmission path arbitration control unit 650, the selector 660 selects one of the output data and outputs the selected one.

The ALE block transmission control unit 670 is coupled to a physical layer (e.g., modified M-PHY layer), for coordinating the signaling to a transmission bus (e.g., M-PHY transmission bus) between the PA layer and the physical layer.

Figure 42:
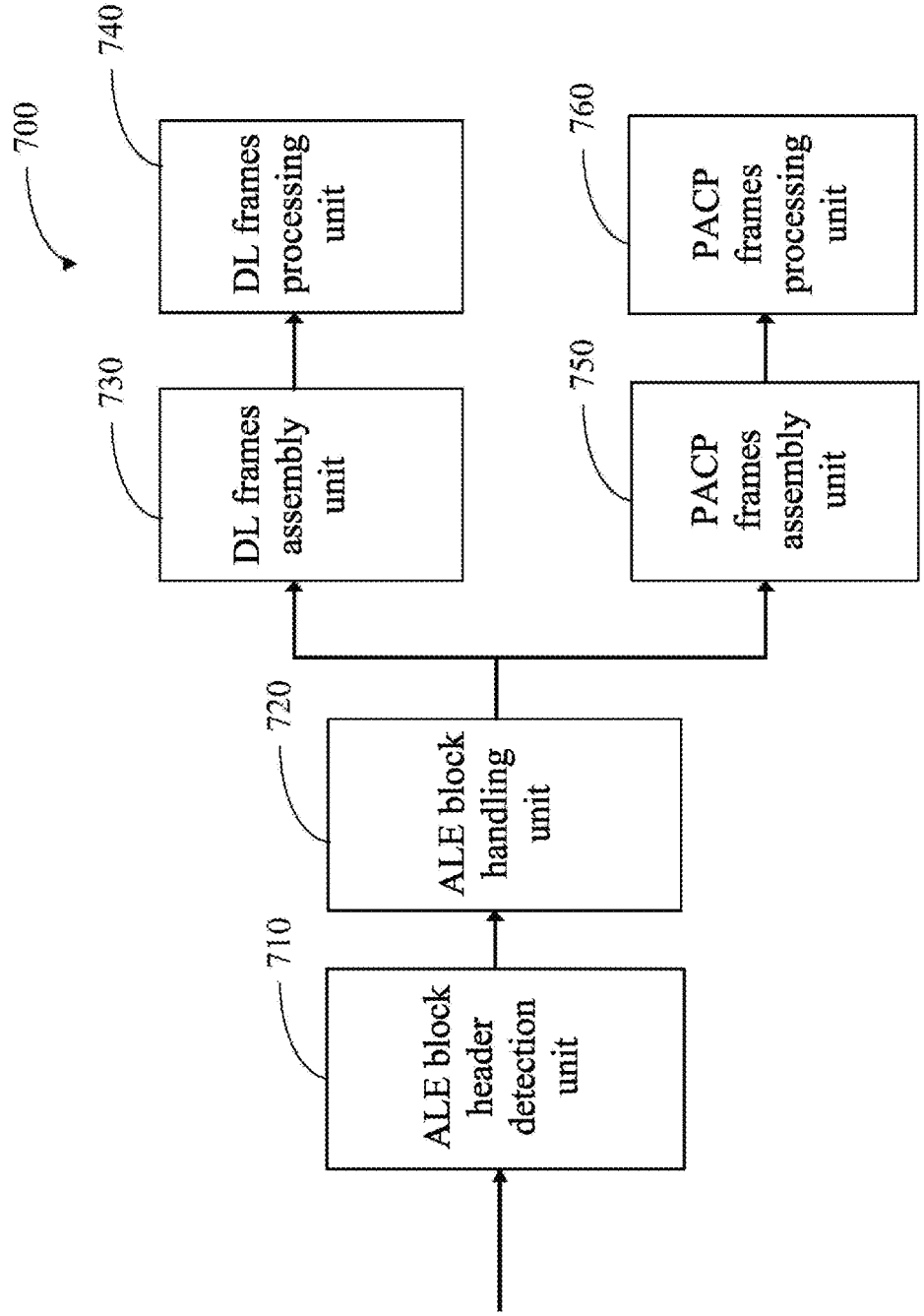
FIG. 42 is a schematic diagram showing an embodiment of a circuit architecture for an ALE block receiving path.

FIG. 42 is a schematic diagram showing an embodiment of a circuit architecture for an ALE block receiving path.

In FIG. 42, logic or circuit blocks related to ALE block integrity checking and DL layer frame and PA layer frame re-construction are demonstrated. In FIG. 42, an ALE block receiving path 700 includes an ALE block header detection unit 710, ALE block handling unit 720, DL frames assembly unit 730, DL frames processing unit 740, PACP frames assembly unit 750, and PACP frames processing unit 760.

The ALE block header detection unit 710 is coupled to the physical layer for receiving data. Since the ALE block received by the physical layer may not align with the byte 0 of M-PHY RX bus, the ALE block header detection unit 710 is responsible to locate the header symbol of an ALE block. The header symbol of the ALE block can be ESC_PA for PACP frames and ESC_DL for DL layer frames. After the header symbol is located, the ALE block header detection unit 710 aligns the header symbol to the byte 0 data which is passed to the ALE block handling unit 720.

The ALE block handling unit 720 is used for ALE block organization, identification and integrity validation. For example, the ALE block handling unit 720 constructs an ALE block from the data received from the physical layer, extracts the data field, CRC field and ECC field from the constructed ALE block. For example, the ALE block handling unit 720 can further perform the error correction operation for correcting possible errors (e.g., by using ECC bytes), and perform error detection verification (e.g., by using CRC bytes) to secure the integrity of the data field. If the error detection verification fails, the ALE block handling unit 720 informs the PA layer or DL layer for performing error recovery (e.g., based on the mechanism for error recovery of the UniPro specification (e.g., version 2.0)).

The DL frames assembly unit 730 is responsible to extract DL layer frames from received ALE blocks. Since the data frame may be divided into several sub-blocks within or on different ALE blocks, the DL frames assembly unit 730 has the capability to buffer the uncompleted data frames and transfer the completed one to the subsequent unit, for example, the DL frames processing unit 740.

The DL frames processing unit 740 is used for classifying the DL layer frames received and performing required data movement and flow control according to the received frames for the interconnection protocol.

The PACP frames assembly unit 750 is used for extracting the PACP frame from the received ALE block and passing the PACP frame to the subsequent unit, for example, the PACP frames processing unit 760.

The PACP frames processing unit 760 is used for classifying the received PACP frame, generating the required signaling to other UniPro layers, performing operations that are requested, and responding necessary confirmation frame that is required for the interconnection protocol.

The following provides various embodiments for implementation of the interconnection protocol with the ALE according to FIG. 1.

Figure 43A:
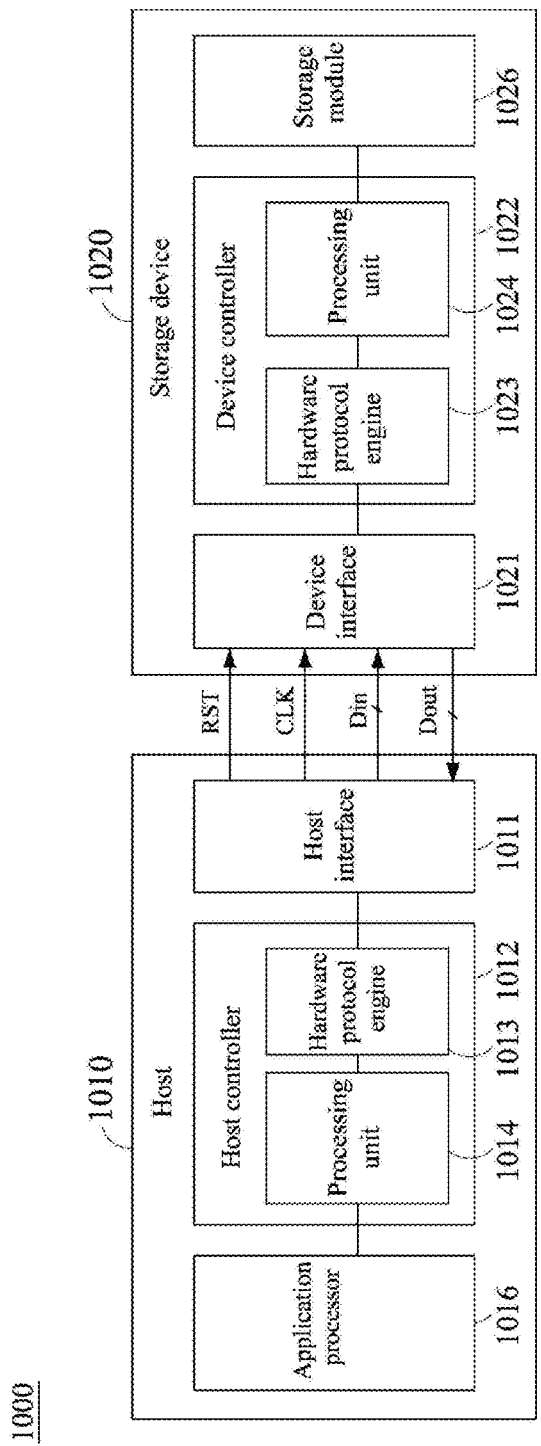
FIG. 43A is a diagram illustrating circuit architecture of a storage system for an interconnection protocol with an ALE according to an embodiment of the present disclosure.
Figure 43B:
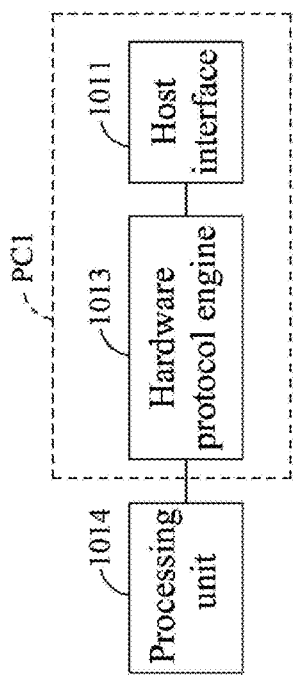
FIG. 43B is a block diagram illustrating circuit architecture applicable to the controller in FIG. 43A for the interconnection protocol according to an embodiment of the present disclosure.
Figure 43C:
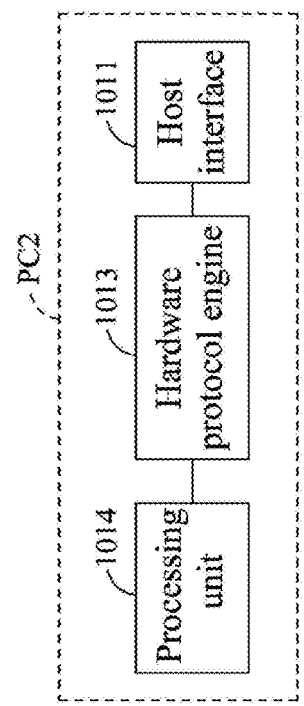
FIG. 43C is a block diagram illustrating circuit architecture applicable to the controller in FIG. 43A for the interconnection protocol according to an embodiment of the present disclosure.

Referring to FIG. 43A, a diagram of circuit architecture is shown according to an embodiment of the present disclosure. As shown in FIG. 43A, a storage system 1000 includes a host 1010 and a storage device 1020. The host 1010 and the storage device 1020 communicate through an interconnection protocol in between, thereby allowing the host 1010 to perform data access of the storage device 1020. The interconnection protocol is capable of performing an ALE scheme as mentioned above based on FIG. 1 or any one or more of the embodiments above. According to the circuit architecture in FIG. 43A, the foregoing technique is applicable to a first device 10 of one or more of the embodiments above capable of communicating with a second device 20 of one or more of the embodiments above according to the interconnection protocol, wherein the host 1010 and storage device 1020 can be used to implement the first device 10 and second device 20 respectively, or vice versa. In the circuit architecture of FIG. 43A, a controller in the host 1010 or the storage device 1020 used to implement the interconnection protocol may be implemented by various configurations. As shown in FIG. 43A, the controller (for example, a host controller 1012) in the host 1010 used to implement the interconnection protocol or the controller (for example, a device controller 1022) in the storage device 1020 used to implement the interconnection protocol can be implemented as circuit architecture including a hardware protocol engine and a processing unit, wherein the processing unit of the controller is optional. In another example, as shown in FIG. 43B, the controller in the host 1010 used to implement the interconnection protocol is referred to as, for example, a protocol controller PC1, which can be configured to include a host interface 1011 and a hardware protocol engine 1013 and be implemented as a single chip, wherein a processing unit 1014 may be regarded as an external circuit of the protocol controller PC1. Moreover, similarly, the controller (or referred to as a protocol controller of the storage device 1020) in the storage device 1020 used to implement the interconnection protocol can be configured to include a device interface 1021 and a hardware protocol engine 1023 and be implemented as a single chip, wherein a processing unit 1024 may be regarded as an external circuit of the protocol controller. For another example, as shown in FIG. 43C, the controller in the host 1010 used to implement the interconnection protocol, for example, a protocol controller PC2, can be configured to include the host interface 1011, the hardware protocol engine 1013 and the processing unit 1014, and be implemented as a single chip. Moreover, similarly, the controller (or referred to as a protocol controller of the storage device 1020) in the storage device 1020 used to implement the interconnection protocol can be configured to include the device interface 1021, the hardware protocol engine 1023, and the processing unit 1024, and be implemented as a single chip. Thus, according to the circuit architecture in FIG. 43A, the controller used to implement the interconnection protocol in the host 1010 or the storage device 1020 can be regarded to cover or represent the embodiment based on FIG. 43A, FIG. 43B, or FIG. 43C. The description of other examples related to FIG. 43A is also suitable for the embodiments based on FIG. 43A, FIG. 43B, or FIG. 43C.

The circuit architecture shown in FIG. 43A has sufficient flexibilities and can be efficiently configured to meet requirements of different products, so as to adapt to diversified designs of manufacturers for better product development. The host 1010 is, for example, a computing device such as a smartphone, a tablet computer, a multimedia device, or other electronic devices. The storage device 1020 is, for example, a storage device inside or outside the computing device, and is such as a storage device based on a non-volatile memory. The storage device 1020 is capable of being written with data under control of the host 1010 or providing written data to the host 1010. The storage device 1020 can be implemented as an internal memory device, memory card, solid state drive (SSD), or so on; however, the implementation of the present disclosure is not limited to the examples above.

The host 1010 includes the host interface 1011, the host controller 1012, and an application processor 1016.

The host interface 1011 implements a physical layer of the interconnection protocol so as to link to the storage device 1020. For example, the host interface 1011 implements a modified version of physical (M-PHY) layer as exemplified above.

The host controller 1012 is coupled between the host interface 1011 and the application processor 1016. When the application processor 1016 needs to perform data access of the storage device 1020, it outputs a corresponding access operation command or write data to the host controller 1012 and communicates with the storage device 1020 through the interconnection protocol, thereby completing data access of the storage device 1020.

The host controller 1012 includes, for example, the hardware protocol engine 1013 and the processing unit 1014, wherein the processing unit 1014 is optional.

The hardware protocol engine 1013 implements a link layer of the interconnection protocol. The link layer can be implemented according to a modified version of UniPro as exemplified above. The hardware protocol engine 1013 communicates with the host interface 1011 and the processing unit 1014 and performs data conversion according to the specification of the link layer. In addition, the hardware protocol engine 1013 (or the host controller 1012) can be regarded as an embodiment of the link controller 100 of the first device 10 shown in FIG. 1.

The processing unit 1014 is coupled to the hardware protocol engine 1013, and communicates with the application processor 1016. The processing unit 1014 can execute one or more pieces of firmware. For example, an access operation command or write data output by an operating system, a driver, or an application executed by the application processor 1016 is converted into a command or data in a format compliant with the link layer of the interconnection protocol by the firmware executed by the processing unit 1014, and is then output to the hardware protocol engine 1013 for processing according to specification of the link layer. Alternatively, read data returned by the storage device 1020 in response to a read command of the host 1010 is returned to the hardware protocol engine 1013 according to the specification of the link layer of the interconnection protocol, and is converted by the corresponding firmware executed by the processing unit 1014 into data in a format that is compliant with and readable by the operating system, driver, or application executed by the application processor 1016. The firmware can be stored, for example, in an internal memory of the processing unit 1014, or be stored in an internal memory of the host controller 1012, wherein the internal memory can include a volatile memory and a non-volatile memory. The processing unit 1014 is optional; that is, the task of the firmware above may be implemented at the hardware protocol engine 1013 in hardware.

The storage device 1020 includes the device interface 1021, the device controller 1022, and a storage module 1026.

The device interface 1021 implements a physical layer of the interconnection protocol to link to the host 1010. For example, the device interface 1021 is for implementing a modified version of physical (M-PHY) layer as exemplified above.

The device controller 1022 is coupled between the device interface 1021 and the storage module 1026. The device controller 1022 has functions corresponding to or similar to those of the host controller 1012 described above, with respect to the interconnection protocol. When the host 1010 issues and outputs an access operation command or write data to the storage device 1020 through the interconnection protocol, the device controller 1022 converts the received data into a corresponding access operation command or write data through the interconnection protocol so as to facilitate data access to be performed by the storage module 1026. Alternatively, the device controller 1022 returns, according to the link layer of the interconnection protocol, read data returned by the storage device 1020 in response to the read command of the host 1010 to the host 1010. The storage module 1026 includes, for example, a memory chip of one or more non-volatile memories, and is, for example, a flash memory chip. In one example, the storage device 1020 may further include a flash memory controller. The flash memory controller is coupled between the device controller 1022 and the storage module 1026, and can be configured to control write, read, or erase operations of the storage module 1026, and is capable of performing data exchange with the storage module 1026 through an address bus or a data bus. In another example, the flash memory controller may be further provided in the device controller 1022.

The device controller 1022 includes, for example, the hardware protocol engine 1023 and the processing unit 1024, wherein the processing unit 1024 is optional.

The hardware protocol engine 1023 implements a link layer of the interconnection protocol. The link layer can be implemented according to a modified version of UniPro as exemplified above. The hardware protocol engine 1023 communicates with the device interface 1021 and the processing unit 1024 and performs data conversion according to the specification of the link layer. In addition, the hardware protocol engine 1023 (or the device controller 1022) can be regarded as an embodiment of the link controller 200 of the second device 20 shown in FIG. 1.

The processing unit 1024 is coupled to the hardware protocol engine 1023, and communicates with the host 1010 through the device interface 1021. The processing unit 1024 can execute one or more pieces of firmware. For example, the processing unit 1024 executes one or more pieces of firmware to communicate with the above flash memory controller, so as to exchange data such as an access operation command, write data or read data between the interconnection protocol and the flash memory controller. The firmware can be stored, for example, in an internal memory of the processing unit 1024, an internal memory of the device controller 1022, or a predetermined storage region of the storage module 1026, wherein the internal memory can include a volatile memory and a non-volatile memory.

As shown in FIG. 43A, the host interface 1011 can be coupled to the device interface 1021, for example, through data lines Din and Dout for transmitting and receiving data, a reset line RST for transmitting a hardware reset signal, and a clock line CLK for transmitting a clock signal. The data lines Din and Dout can be implemented in multiple pairs, wherein one pair of data lines Din or one pair of data lines Dout can be referred to as a lane for transmitting differential signals, for example. The host interface 1011 can communicate with the device interface 1021 by using at least one interface protocol based on an advanced line encoding scheme, such as 1b/1b coding scheme or so on; however, the implementation of the disclosure is not limited to the examples above. Under a modified version of the UFS standard, the host 1010 and the storage device 1020 may also be configured with multiple lanes in between to improve transmission efficiency, wherein either of the directions from the host 1010 to the storage device 1020 or from the storage device 1020 to the host 1010 can support one or more lanes, and the multiple lanes can be selectively set to be active or inactive.

A modified version of the UFS standard is taken as an example of the interconnection protocol with the ALE for illustration. The UFS standard includes a UFS command set (UCS) layer, a UFS transport (UTP) layer, and a UFS interconnect (UIC) layer. The UIC layer includes a link layer and a physical layer. In the interconnection protocol with the ALE, the link layer of the UIC layer can be implemented according to a modified version of the UniPro specification, and the physical layer of the UIC layer can be implemented according to a modified version of the M-PHY specification. Under the interconnection protocol, since the implementations of the modified UniPro and modified M-PHY with respect to the ALE are hidden from the other layers (such as UCS, UTP layers) of the UFS standard, the implementation complexity of the interconnection protocol with the ALE can be reduced.

Figure 44:
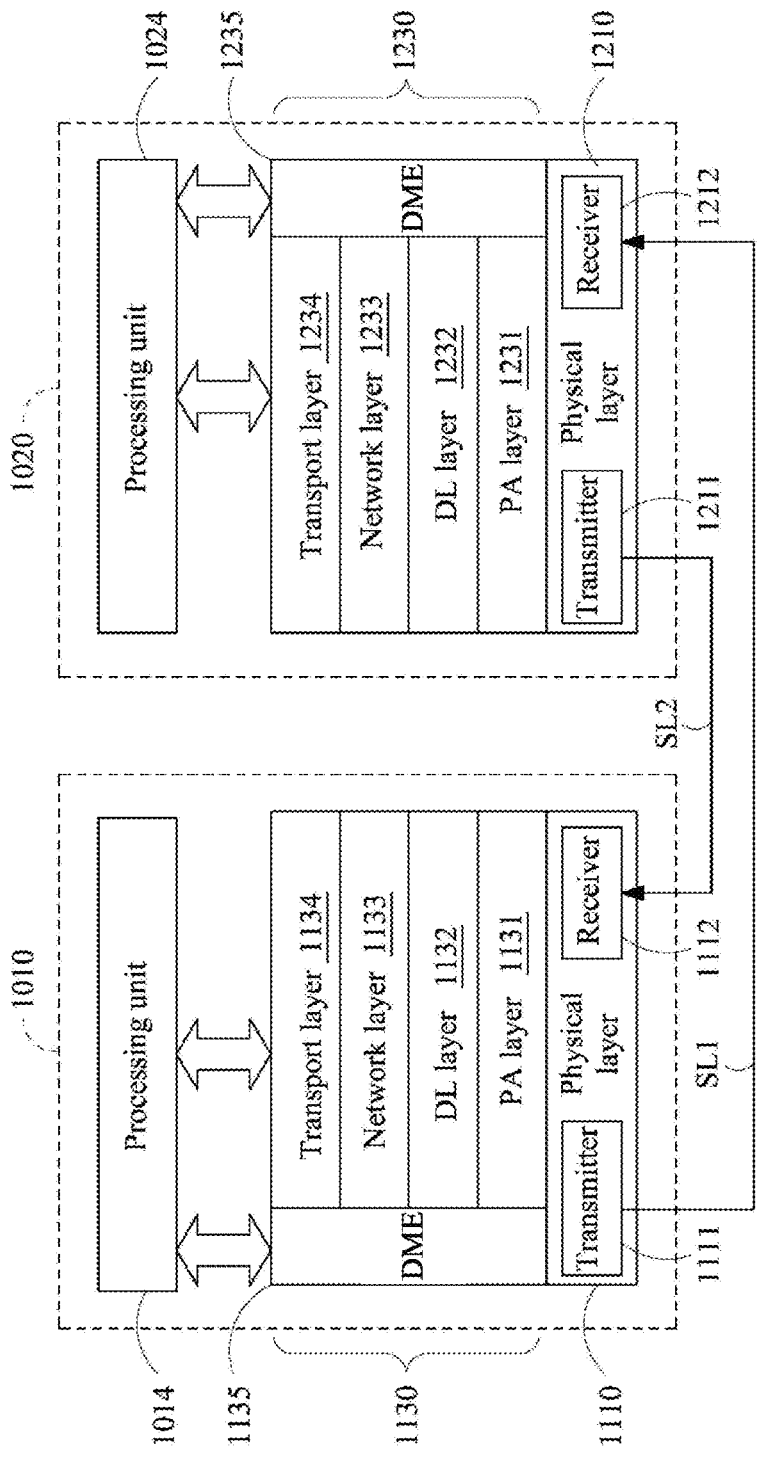
FIG. 44 is a schematic diagram of an embodiment of a layered structure of the storage system in FIG. 43A according to the interconnection protocol with an ALE.

Referring to FIG. 44, a schematic diagram of an embodiment of layered architecture of the storage system in FIG. 43A is shown according to the UFS standard and FIG. 1. Because the UFS standard is based on the MIPI UniPro layer and the MIPI M-PHY layer, the host interface 1011 and the hardware protocol engine 1013 of the host 1010 shown in FIG. 43A are respectively used to implement a modified physical layer 1110 and a modified UniPro layer 1130 in FIG. 44. Also, the device interface 1021 and the hardware protocol engine 1023 of the storage device 1020 in FIG. 43A are respectively used to implement a modified physical layer 1210 and a modified UniPro layer 1230 in FIG. 44.

As shown in FIG. 44, the modified UniPro layer 1130 (or 1230) can include a modified physical adapter (PA) layer 1131 (or 1231), a data link (DL) layer 1132 (or 1232), a network layer 1133 (or 1233), and a transport layer 134 (or 1234). The layers in the modified UniPro layer 1230 of the storage device 1020 can also similarly operate and be implemented.

The modified physical adapter layer (1131 or 1231) couples the modified physical layer (1110 or 1210) to the data link layer (1132 or 1232). The modified physical adapter layer (1131 or 1231) is capable of performing bandwidth control and power management between the modified physical layer (1110 or 1210) and the data link layer (1132 or 1232). In practice, the modified physical layer 1110 of the host 1010 includes a transmitter (TX) 1111 and a receiver (RX) 1112, and the modified physical layer 1210 of the storage device 1020 includes a transmitter (TX) 1211 and a receiver (RX) 1212, thereby establishing data lanes SL1 and SL2 to perform full duplex communication. The modified UniPro specification may support multiple data lanes for a link in each transmission direction (for example, forward or backward).

The data link layer (1132 or 1232) is capable of performing flow control of data transmission between the host 1010 and the storage device 1020. The data link layer is capable of performing error detection and re-transmission of a frame in case of errors, according to one or more of the embodiments above.

The network layer (1133 or 1233) is used to select a routing function for a transmission path for the packets received from the transport layer (1134 or 1234).

The transport layer (1134 or 1234) can use a command received from the UFS application layer to configure a data segment suitable for the protocol and transmit the data segment to the network layer (1133 or 1233), or can extract a command from packets received from the network layer (1133 or 1233) and transmit the command to the UFS application layer.

Moreover, the modified UniPro layer (1130 or 1230) can be further implemented with a device management entity (DME) (1135 or 1235), which can communicate with the layers in the modified physical layer (1110 or 1210) and the modified UniPro layer (1130 or 1230), for example, the modified physical adapter layer (1131 or 1231), the data link layer (132 or 232), the network layer (1133 or 1233), and the transport layer (1134 or 1234), so as to communicate with the UFS application layer, thereby implementing the modified unified protocol (UniPro) overall functions such as control or configuration functions including power-on, power-off, reset, and power mode change.

In some embodiments, the circuit architecture in FIG. 41 or FIG. 42 can be applied to a controller in FIG. 43A, FIG. 43B, or FIG. 43C to perform operations according to one or more of the embodiments or related examples based on FIGS. 5-9C.

Moreover, in the present disclosure, "asserting" a signal (or other alternative forms such as "asserted" or "assertion") means that a signal is set to be in an active state (or an active voltage level), which may be a high or low level. "De-asserting" a signal (or other alternative forms such as "de-asserted" or "de-assertion") means that a signal is set to be in an inactive state (or an inactive voltage level), which may be a high or low level. If a signal is set to be at a low level to represent active-low, "asserting" the signal means that the signal is set to a low level, and "de-asserting" the signal means that the signal is set to a high level. If a signal is set to be at a high level to represent active-high, "asserting" a signal means that the signal is set to a high level, and "de-asserting" the signal means that the signal is set to a low level.

Moreover, in the embodiments related to the host and the storage device above, the hardware protocol engine in the host controller or the device controller can be designed based on Hardware Description Language (HDL) such as Verilog or techniques of any other design methods of digital circuits generally known to a person skilled in the art, and can be implemented by one or more of circuits based on such as a field programmable gate array (FPGA), an application-specific integrated circuit (ASIC), or a complex programmable logic device (CPLD), or be implemented by a dedicated circuit or module. The host controller or the device controller (or a processing unit or a hardware protocol engine therein) can also be based on a microcontroller, a processor, or a digital signal processor (DSP).

The present disclosure is described by using the multiple embodiments above. A person skilled in the art should understand that, these embodiments are merely for describing the present disclosure are not to be construed as limitations to the scope of the present disclosure. It should be noted that all equivalent changes, replacements and substitutions made to the embodiments are to be encompassed within the scope of the present disclosure. Therefore, the scope of protection of the present disclosure should be accorded with the broadest interpretation of the appended claims.

What is claimed is:

1. A method of operating an electronic device, the method comprising:
generating, at a data link layer of a link controller of the electronic device, a plurality of data items;
generating, at the link controller of the electronic device, an advanced line encoding (ALE) block according to an advanced line encoding scheme, the ALE block including a data field, an error detection field based on the data field, and an error correction field corresponding to the data field and the error detection field, the data field generated using one or more of the plurality of data items selectively based on a threshold value of block length for the plurality of data items;
storing a first data link layer frame of the ALE block in a buffer;
transmitting, at the link controller of the electronic device, the first data link layer frame of the ALE block from the buffer to a peer device;
receiving, from the peer device, an indication that the first data link layer frame is received;
releasing the first data link layer frame from the buffer;
storing a second data link layer frame of the ALE block in the buffer; and
transmitting, at the link controller of the electronic device, the second data link layer frame of the ALE block from the buffer to the peer device;
wherein advanced line encoding indicates a coding scheme having an effective data rate larger than an effective data rate of 8b/10b coding scheme.

2. The method according to claim 1, wherein the data field is generated using one or more of the plurality of data items selectively based on the threshold value of block length for data item, number of remaining data of a particular data item, and number of available spaces of the data field at an arbitration location that indicates a location of the data field for data item insertion.

3. The method according to claim 1, wherein the ALE block includes the data items only from the data link layer of the electronic device.

4. The method according to claim 1, wherein the ALE block includes the data items only from a physical adapter layer of the electronic device.

5. The method according to claim 1, wherein the ALE block is transmitted through a link using an n-level pulse amplitude modulation signaling scheme, wherein n is greater than two.

6. The method according to claim 1, further comprising adding filler symbols inside the ALE block to fill unused space inside the ALE block based on the threshold value of block length.

7. The method according to claim 1, further comprising sending the DL layer data frames consecutively without substantial time gaps between the frames.

8. An electronic device comprising:
an interconnection controller including:
a physical layer circuit configured to transmit signals; and
a link controller, coupled to the physical layer circuit, configured to transmit data;
wherein the interconnection controller is configured to perform a plurality of operations including:
generating a plurality of data items;
generating an advanced line encoding (ALE) block according to an advanced line encoding scheme, the ALE block including a data field, an error detection field based on the data field, and an error correction field corresponding to the data field and the error detection field portion, the data field generated using one or more of the plurality of data items selectively based on a threshold value of block length for the plurality of data items;
storing a first data link layer frame of the ALE block in a buffer;
transmitting the first data link layer frame of the ALE block from the buffer to a peer device;
receiving, from the peer device, an indication that the first data link layer frame is received;
releasing the first data link layer frame from the buffer;
storing a second data link layer frame of the ALE block in the buffer; and
transmitting, at the link controller of the electronic device, the second data link layer frame of the ALE block from the buffer to the peer device;

wherein advanced line encoding indicates a coding scheme having an effective data rate larger than an effective data rate of 8b/10b coding scheme.

9. The electronic device according to claim 8, wherein the data field is generated using one or more of the plurality of data items selectively based on the threshold value of block length for data item, number of remaining data of a particular data item, and number of available spaces of the data field at an arbitration location arbitration location that indicates a location of the data field for data item insertion.

10. The electronic device according to claim 8, wherein the ALE block includes the data items only from a data link layer of the electronic device.

11. The electronic device according to claim 8, wherein the ALE block includes the data items only from a physical adapter layer of the electronic device.

12. The electronic device according to claim 8, wherein the ALE block is transmitted through a link using an n-level pulse amplitude modulation signaling scheme, wherein n is greater than two.

13. The electronic device according to claim 8, wherein the interconnection controller is further configured to add filler symbols inside the ALE block to fill unused space inside the ALE block based on the threshold value of block length.

14. The electronic device according to claim 8, wherein the interconnection controller is further configured to send the DL layer data frames consecutively without substantial time gaps between the frames.

* * * * *